United States Patent
Ware et al.

(10) Patent No.: US 11,604,645 B2
(45) Date of Patent: Mar. 14, 2023

(54) MAC PROCESSING PIPELINES HAVING PROGRAMMABLE GRANULARITY, AND METHODS OF OPERATING SAME

(71) Applicant: Flex Logix Technologies, Inc., Mountain View, CA (US)

(72) Inventors: Frederick A. Ware, Los Altos Hills, CA (US); Cheng C. Wang, San Jose, CA (US)

(73) Assignee: Flex Logix Technologies, Inc., Mountain View, CA (US)

( * ) Notice: Subject to any disclaimer, the term of this patent is extended or adjusted under 35 U.S.C. 154(b) by 62 days.

(21) Appl. No.: 17/376,415

(22) Filed: Jul. 15, 2021

(65) Prior Publication Data

US 2022/0027152 A1 Jan. 27, 2022

Related U.S. Application Data

(60) Provisional application No. 63/054,810, filed on Jul. 22, 2020.

(51) Int. Cl.
*G06F 9/30* (2018.01)
*G06F 9/445* (2018.01)
(Continued)

(52) U.S. Cl.
CPC .......... *G06F 9/3001* (2013.01); *G06F 7/5443* (2013.01); *G06F 7/57* (2013.01); *G06F 9/44505* (2013.01)

(58) Field of Classification Search
CPC ... G06F 7/5443; G06F 9/3001; G06F 9/44505
See application file for complete search history.

(56) References Cited

U.S. PATENT DOCUMENTS

| 4,958,312 | A | 9/1990 | Ang et al. |
| 6,115,729 | A | 9/2000 | Matheny et al. |

(Continued)

FOREIGN PATENT DOCUMENTS

| EP | 0405726 | 3/1999 |
| EP | 2280341 | 6/2013 |
| WO | WO 2018/126073 | 7/2018 |

OTHER PUBLICATIONS

Priyanka Nain, "Multiplier-Accumulator (MAC) Unit", IJDACR, vol. 5, Issue 3, Oct. 2016, 4 pages.
(Continued)

*Primary Examiner* — Zachary K Huson
(74) *Attorney, Agent, or Firm* — Charles Shemwell

(57) ABSTRACT

An integrated circuit comprising a plurality of multiplier-accumulator circuits connected in series in a linear pipeline to perform a plurality of concatenated multiply and accumulate operations, wherein each multiplier-accumulator circuit of the plurality of multiplier-accumulator circuits includes: a multiplier to multiply first data by a multiplier weight data and generate a product data, and an accumulator, coupled to the multiplier of the associated multiplier-accumulator circuit, to add second data and the product data of the associated multiplier to generate sum data. The integrated circuit also includes a plurality of granularity configuration circuits, wherein each granularity configuration circuit is associated with a different multiplier-accumulator circuit of the plurality of multiplier-accumulator circuits to operationally (i) disconnect the multiplier and accumulator of the associated multiplier-accumulator circuit from the linear pipeline during operation or (ii) connect the multiplier and accumulator of the associated multiplier-accumulator circuit to the linear pipeline during operation.

20 Claims, 33 Drawing Sheets

(51) Int. Cl.
G06F 7/544 (2006.01)
G06F 7/57 (2006.01)

(56) References Cited

U.S. PATENT DOCUMENTS

| | | | |
|---|---|---|---|
| 6,148,101 A | 11/2000 | Tanaka et al. | |
| 6,298,366 B1 | 10/2001 | Gatherer et al. | |
| 7,062,526 B1 | 6/2006 | Hoyle | |
| 7,107,305 B2 | 9/2006 | Deng et al. | |
| 7,299,342 B2 | 11/2007 | Nilsson et al. | |
| 7,346,644 B1 | 3/2008 | Langhammer et al. | |
| 7,698,358 B1 | 4/2010 | Langhammer et al. | |
| 8,051,124 B2 | 11/2011 | Salama et al. | |
| 8,645,450 B1 | 2/2014 | Choe et al. | |
| 8,751,551 B2 | 6/2014 | Streicher et al. | |
| 8,788,562 B2 | 7/2014 | Langhammer et al. | |
| 9,059,696 B1 | 6/2015 | Rahman | |
| 2003/0172101 A1 | 9/2003 | Liao et al. | |
| 2007/0239967 A1 | 10/2007 | Dally et al. | |
| 2008/0211827 A1 | 9/2008 | Donovan et al. | |
| 2009/0094303 A1 | 4/2009 | Katayama | |
| 2009/0106719 A1 | 4/2009 | Stevens | |
| 2014/0019727 A1 | 1/2014 | Zhu et al. | |
| 2016/0182014 A1 | 6/2016 | Bhargarva et al. | |
| 2017/0011288 A1 | 1/2017 | Brothers et al. | |
| 2017/0115958 A1 | 4/2017 | Langhammer | |
| 2017/0116693 A1 | 4/2017 | Rae et al. | |
| 2017/0214929 A1 | 7/2017 | Susnow et al. | |
| 2017/0322813 A1 | 11/2017 | Langhammer | |
| 2017/0344876 A1 | 11/2017 | Brothers | |
| 2018/0052661 A1 | 2/2018 | Langhammer | |
| 2018/0081632 A1 | 3/2018 | Langhammer | |
| 2018/0081633 A1 | 3/2018 | Langhammer | |
| 2018/0189651 A1 | 7/2018 | Henry et al. | |
| 2018/0300105 A1 | 10/2018 | Langhammer | |
| 2018/0321909 A1 | 11/2018 | Langhammer | |
| 2018/0321910 A1 | 11/2018 | Langhammer et al. | |
| 2018/0341460 A1 | 11/2018 | Langhammer | |
| 2018/0341461 A1 | 11/2018 | Langhammer | |
| 2019/0042191 A1 | 2/2019 | Langhammer | |
| 2019/0079728 A1 | 3/2019 | Langhammer et al. | |
| 2019/0196786 A1 | 6/2019 | Langhammer | |
| 2019/0207609 A1 | 7/2019 | Wang | |
| 2019/0243610 A1 | 8/2019 | Lin et al. | |
| 2019/0250886 A1 | 8/2019 | Langhammer | |
| 2019/0286417 A1 | 9/2019 | Langhammer | |
| 2019/0310828 A1 | 10/2019 | Langhammer et al. | |
| 2019/0324722 A1 | 10/2019 | Langhammer | |
| 2019/0341091 A1* | 11/2019 | Sity | G11C 11/1675 |
| 2020/0004506 A1 | 1/2020 | Langhammer et al. | |
| 2020/0026493 A1 | 1/2020 | Streicher et al. | |
| 2020/0076435 A1 | 3/2020 | Wang | |
| 2020/0174750 A1 | 6/2020 | Langhammer | |
| 2020/0184378 A1* | 6/2020 | Chamberlain | G06F 21/85 |
| 2020/0192971 A1* | 6/2020 | Lue | G06F 7/5443 |
| 2020/0326948 A1 | 10/2020 | Langhammer | |

OTHER PUBLICATIONS

Jebashini et al., "A Survey and Comparative Analysis of Multiply-Accumulate (MAC) Block for Digital Signal Processing Application on ASIC and FPGA", Journal of Applied Science, vol. 15, Issue 7, pp. 934-946, Jul. 2015.

Agrawal et al., "A 7nm 4-Core AI Chip with 25.6TFLOPS Hybrid FP8 Training, 102.4TOPS INT4 Inference and Workload-Aware Throttling", ISSCC, pp. 144-145,2021.

Linley Gwennap, "IBM Demonstrates New AI Data Types", Microprocessor Report, Apr. 2021.

Choi et al., "Accurate and Efficient 2-Bit Quantized Neural Networks", Proceedings of $2^{th}$ SysML Conf, 2019, 12 pages.

Sun et al., "Hybrid 8-bit Floating Point (HFP8) Training and Inference for Deep Neural Networks", NeurIPS 2019, 10 pages.

"NVidia A100 Tensor Core GPU Architecture", v1.0, 2020, 82 pages.

Papadantonakis et al., "Pipelining Saturated Accumulation", IEEE, vol. 58, No. 2, pp. 208-219, Feb. 2009.

Kung et al., "Maestro: A memory-on-logic architecture for coordinated parallel use of many systolic arrays", 2019 IEEE $30^{th}$ International Conf. Application-Specific Systems, Architectures and Processors, vol. 2160, IEEE 2019, Jul. 15, 2019.

International Search Report and Written Opinion of International Searching Authority re: PCT/US2021/041744, dated Oct. 20, 2021, 15 pages.

\* cited by examiner

In one embodiment, each single m-MAC execution pipeline has its own L0 SRAM memory, and each 16 x m-MAC cluster includes a shared L1 SRAM memory. The shift-in and shift-out paths of each m-MAC execution pipeline is coupled to the L2 SRAM memory. The L2 memory also couples to the L1/L0 memories. In one embodiment m=64, as illustrated.

A network-on-chip (NOC) couples the L2 memory to the PHY (physical interface) for the L3 memory (external DRAM component(s)). The NOC also couples to a PCIe PHY which, in turn, couples to an external host. Notably, in one embodiment, the NOC also couples to GPIO input/output PHYs, which allow multiple X1 components to be operated concurrently.

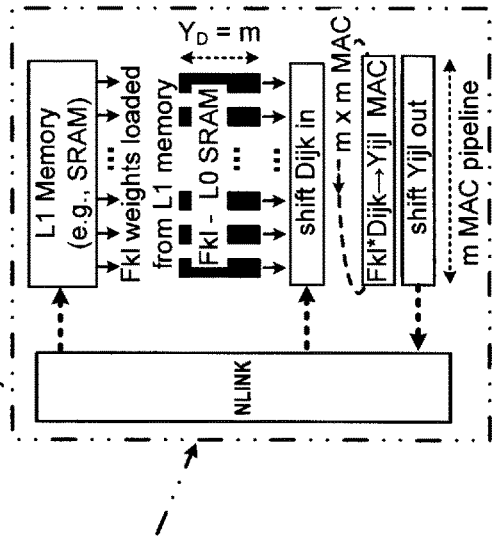

FIG. 1D

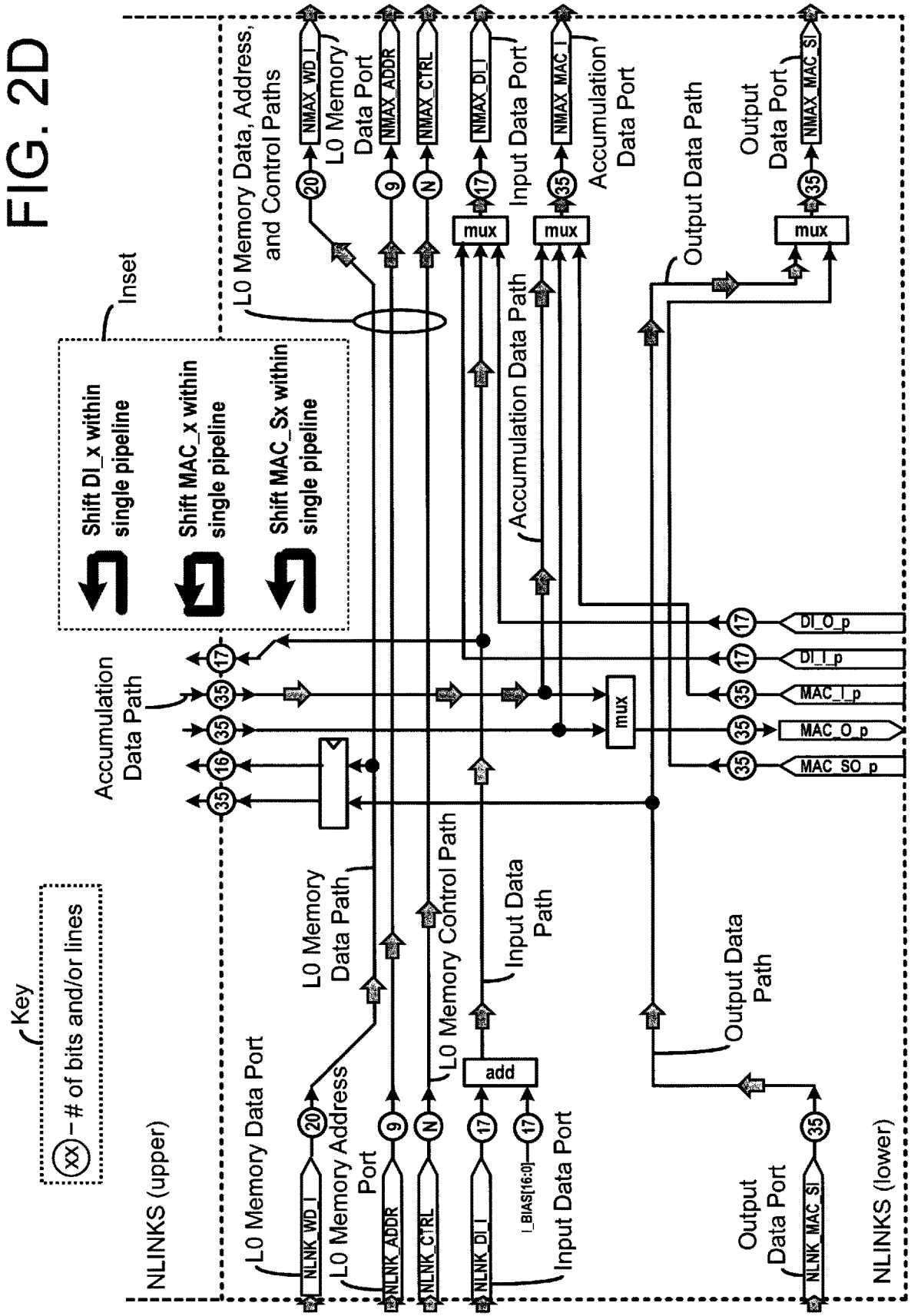

FIG. 7A

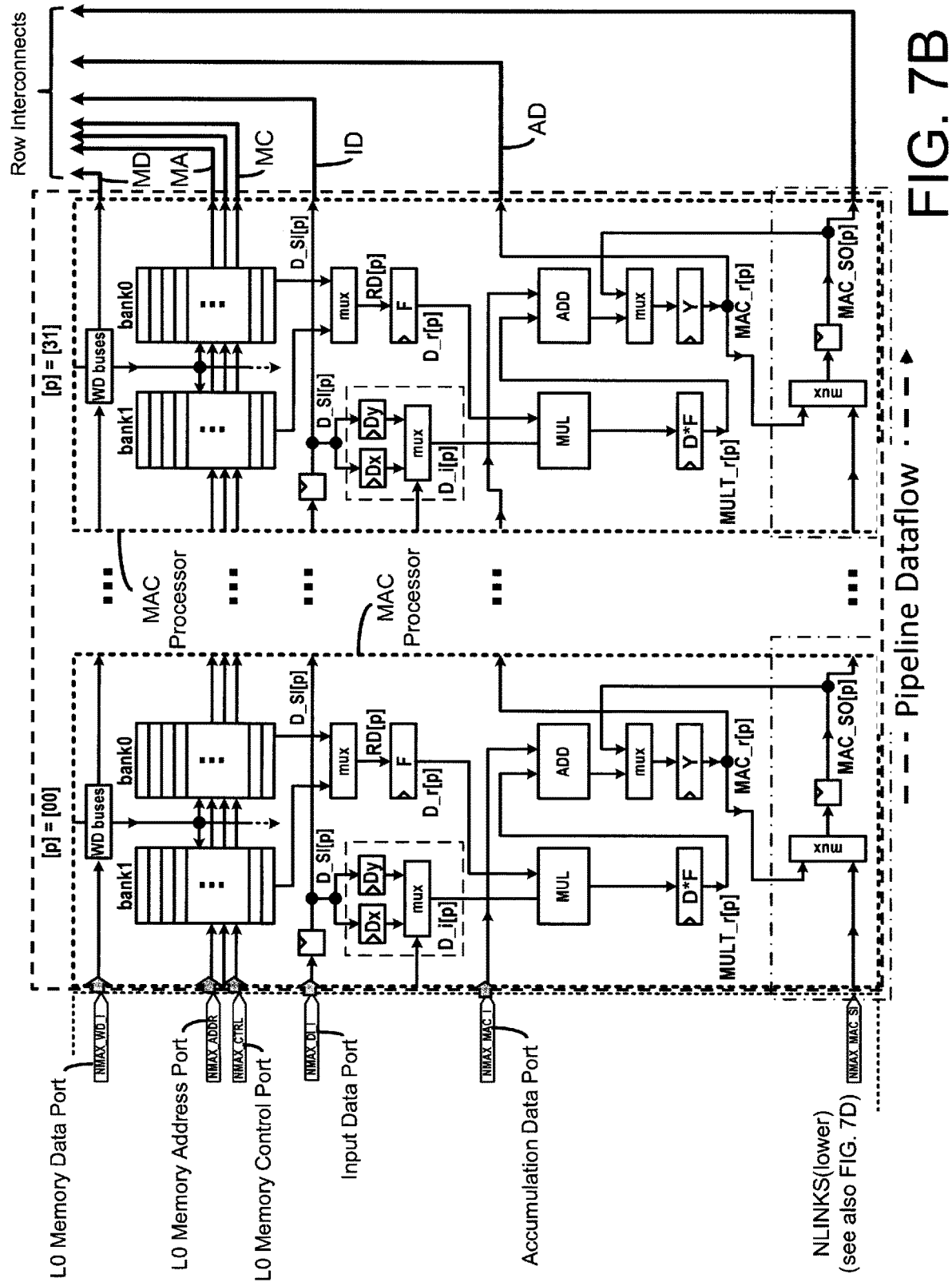

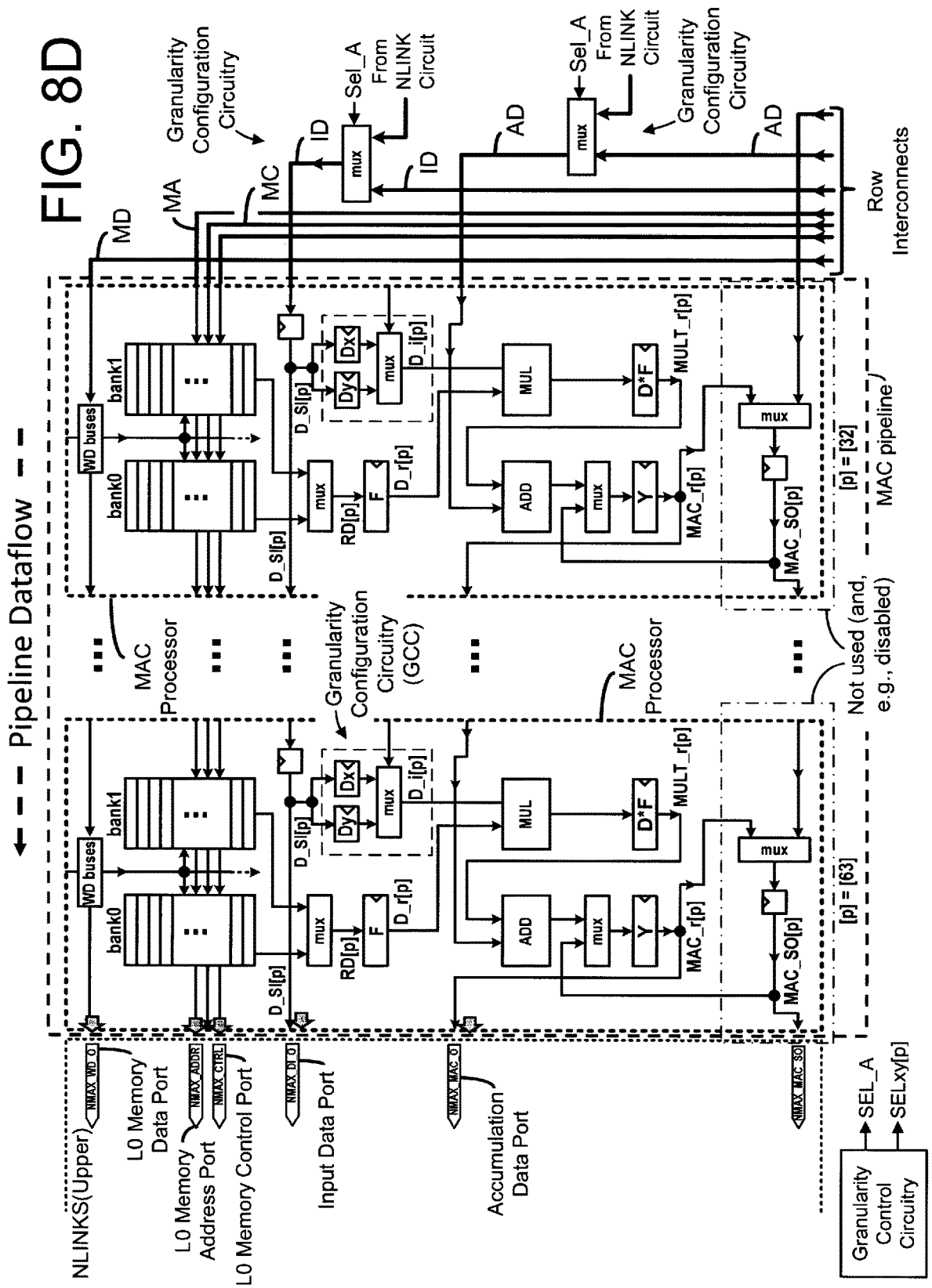

US 11,604,645 B2

MAC PROCESSING PIPELINES HAVING PROGRAMMABLE GRANULARITY, AND METHODS OF OPERATING SAME

RELATED APPLICATION

This non-provisional application claims priority to and the benefit of U.S. Provisional Application No. 63/054,810, entitled "MAC Processing Pipelines having Programmable Granularity, and Methods of Operating Same", filed Jul. 22, 2020. The '810 provisional application is hereby incorporated herein by reference in its entirety.

INTRODUCTION

There are many inventions described and illustrated herein. The present inventions are neither limited to any single aspect nor embodiment thereof, nor to any combinations and/or permutations of such aspects and/or embodiments. Importantly, each of the aspects of the present inventions, and/or embodiments thereof, may be employed alone or in combination with one or more of the other aspects of the present inventions and/or embodiments thereof. All combinations and permutations thereof are intended to fall within the scope of the present inventions.

In one aspect, the present inventions are directed to circuitry to configure the granularity of the processing and/or output of the multiplier-accumulator circuitry (and methods of operating and configuring such circuitry) including one or more multiplier-accumulator circuit execution or processing pipelines (e.g., pipeline(s) having linear architectures). The granularity configuration circuitry of the present inventions configures (e.g., one-time or more than one-time) the multiplier-accumulator circuit processing pipeline (s) to provide a predetermined granularity (from a plurality of predetermined granularities) of the output data of the MAC pipeline, for example, granularity of the processed image data. In one embodiment, the granularity configuration circuitry may interconnect multiplier-accumulator circuits (referred to herein, at times, as "MAC", MACs, "MAC circuit" and/or "MAC circuits") or by-pass multiplier-accumulator circuits of the image processing pipeline to implement a predetermined granularity of the processing pipeline (s) and thereby process input data (e.g., image data) and generate a plurality of m×n data/pixel (e.g., m×n image data/pixel) outputs (wherein m and n are positive whole numbers). Here, a plurality of MAC circuits employed in the multiply and accumulate operations of the execution pipeline are connected in series to form a linear pipeline to facilitate concatenating the multiply and accumulate operations. Those MAC circuit(s) not enabled or not incorporated in the multiply and accumulate operations of the execution pipeline, albeit electrically/physically connected or coupled to those MAC circuits employed in the execution pipeline, do not contribute to or participate in the concatenation of the multiply and accumulate operations of the execution pipeline, in response to or based on control of the granularity configuration circuitry associated with such MAC circuits (i.e., those MAC circuits not enabled or not incorporated in the processing).

In one embodiment, n equals m—such as, for example, 16×16, 32×32, 64×64, 128×128, etc. In another embodiment, n does not equal m—such as, for example, 16×32, 16×64, 32×16, 32×64, 128×64, 96×128, etc.

In one embodiment, the granularity configuration circuitry programs, configures and/or controls a plurality of separate multiplier-accumulator circuits or rows/banks of interconnected (in series) multiplier-accumulator circuits to implement a particular granularity (selected or configured from a plurality of predetermined granularities) and pipeline multiply and accumulate operations (e.g., in a linear pipeline architecture) to generate and output a plurality of m×n data/pixels. The granularity configuration circuitry may configure and/or re-configure the granularity of the MAC processing pipeline, for example, in situ (i.e., during normal operation of the integrated circuit) and/or at or during power-up, start-up, initialization, re-initialization, configuration, re-configuration or the like. In one embodiment, memory (e.g., a configuration register) may store granularity configuration data, including the granularity of the image processing of, for example, the MAC pipeline (which may be configured from and/or include one or more rows/banks of interconnected (in series) multiplier-accumulator circuits). Such memory may be programmed at or during power-up, start-up, initialization, re-initialization and/or in situ.

Thus, the granularity of the processing and/or output of the MAC processing pipeline may be user or system defined and/or may be one-time programmable (e.g., at manufacture) or more than one-time programmable (e.g., (i) at or via power-up, start-up or performance/completion of the initialization sequence/process sequence, and/or (ii) in situ or during normal operation). That is, the granularity configuration circuitry may be programmed and/or re-programmed in situ and/or prior to normal operation of the integrated circuit (e.g., the programmable MAC image processing pipeline) so that the MAC pipeline processes and outputs image data/pixels in a m×n data/pixels format.

Notably, the present inventions may employ one or more the multiplier-accumulator circuits that are described and illustrated in the exemplary embodiments of FIGS. 1A-1C of U.S. patent application Ser. No. 16/545,345 and U.S. Provisional Patent Application No. 62/725,306, and the text associated therewith. Here, the multiplier-accumulator circuitry described and/or illustrated in the '345 and '306 applications facilitate concatenating the multiply and accumulate operations, and reconfiguring the circuitry thereof and operations performed thereby. The plurality of multiplier-accumulator circuits may also include a plurality of registers (including a plurality of shadow registers) wherein the circuitry also controls such registers to implement or facilitate the pipelining of the multiply and accumulate operations performed by the multiplier-accumulator circuits to increase throughput of the multiplier-accumulator execution or processing pipelines in connection with processing the related data (e.g., image data). The '345 and '306 applications are incorporated by reference herein in their entirety.

In one embodiment, the granularity control circuitry programs, configures and/or controls the granularity configuration circuitry (such circuitry may collectively be referred to, at times, as granularity control/configure circuitry) to incorporate or by-pass one or more multiplier-accumulator circuits of the MAC processing or execution pipeline(s). For example, in one embodiment, the granularity control circuitry may program the granularity configuration circuitry (e.g., one or more multiplexers associated with one or more multiplier-accumulator circuits or rows/banks of multiplier-accumulator circuits) to, among other things, enable or incorporate a predetermined multiplier-accumulator circuits in the execution or processing pipeline to process and output image data/pixels in a predetermined m×n data/pixels format. Here, the granularity control circuitry may configure or determine which multiplier-accumulator circuits or which multiplier-accumulator circuits of one or more rows/banks of interconnected multiplier-accumulator circuits, for example, via control of one or more by-pass circuits (e.g., multiplexers), are interconnected (in series) and/or employed to perform the multiply and accumulate operations of the pipelining architecture or configuration. Thus, in one embodiment, the granularity control circuitry configures or implements an architecture of the execution or processing pipeline by controlling or programming the granularity configuration circuitry (e.g., programmable by-pass circuits such as multiplexers) to provide connection(s) between multiplier-accumulator circuits and/or between multiplier-accumulator circuits of one or more rows of interconnected multiplier-accumulator circuits of MAC pipeline (e.g., linear pipeline) or by-pass predetermined multiplier-accumulator circuits and/or by-pass predetermined multiplier-accumulator circuits of one or more rows of interconnected multiplier-accumulator circuits of MAC pipeline.

Notably, the MAC processing or execution pipelines may be organized from or disposed on one or more integrated circuits. In one embodiment, the integrated circuit is a discrete field programmable gate array (FPGA) or embedded FPGA (herein after collectively "FPGA" unless indicated otherwise). Briefly, an FPGA is an integrated circuit that is configured and/or reconfigured (hereinafter, unless stated otherwise, collectively "configured" or the like (e.g., "configure" and "configurable")) by a user, operator, customer and/or designer before and/or after manufacture. The FPGA may include programmable logic components (often called "logic cells", "configurable logic blocks" (CLBs), "logic array blocks" (LABs), or "logic tiles"—hereinafter collectively "logic tiles")).

In one embodiment of the present inventions, one or more (or all) logic tiles of an FPGA include a plurality of multiplier-accumulator circuits to implement multiply and accumulate operations, for example, in a pipelining manner. The control/configure circuitry may be included in or may include a switch interconnect network in the logic tiles. The switch interconnect network may be configured as a hierarchical and/or mesh interconnect network. The logic tiles may include data storage elements associated with the switch interconnect network, input pins and/or look-up tables (LUTs) that, when programmed, determine the configuration and/or operation of the switches/multiplexers and, among other things, the communication between circuitry (e.g., logic components) within a logic tile (including the MAC circuits and/or MAC processing pipelines) and/or between circuitry of multiple logic tiles (e.g., between MAC circuits and/or MAC processing pipelines of a plurality of logic tiles).

In one embodiment, the switch interconnect network may provide a connection to/from logic circuitry of the associated logic tile or a different logic tile to/from multiplier-accumulator circuits (individually) of the multiplier-accumulator circuits of the processing or execution pipelines. In this way, MAC circuits and/or MAC processing pipelines of a plurality of logic tiles may be employed, for example, concurrently, to processes related data (e.g., related image data). Indeed, such connections may be configurable and/or re-configurable—for example, in situ (i.e., during normal operation of the integrated circuit) and/or at or during power-up, start-up, initialization, re-initialization, configuration, re-configuration or the like. In one embodiment, the switch interconnect network may employ one or more embodiments, features and/or aspects of the interconnect network described and/or illustrated in the '345 and '306 applications. Moreover, the switch interconnect network may interface with and/or include one or more embodiments, features and/or aspects of the interface connector described and/or illustrated in the '345 and '306 applications (See, e.g., FIGS. 7A-7C of the '345 application; notably, certain details of the NLINKS circuits described and illustrated herein may correlate to circuitry described and/or illustrated in the '345 and '306 applications which is spelled as "NLINX" (e.g., NLINX conductors, NLINX interface, NLINX interface connector, etc.)). As mentioned above, the '345 and '306 applications are hereby incorporated by reference herein in their entirety.

Notably, the integrated circuit(s) may be, for example, a processor, controller, state machine, gate array, system-on-chip (SOC), programmable gate array (PGA) and/or FPGA and/or a processor, controller, state machine and SoC including an embedded FPGA. A field programmable gate array or FPGA means both a discrete FPGA and an embedded FPGA.

In one embodiment, the present inventions may also be employed or implemented in the concurrent and/or parallel processing techniques of the multiplier-accumulator execution or processing pipelines (and methods of operating such circuitry) which increase throughput of the pipelines, as described and/or illustrated in U.S. patent application Ser. No. 16/816,164 and U.S. Provisional Patent Application No. 62/831,413; both of which are incorporated by reference herein in their entirety.

Briefly, with reference to FIG. 1A, in one embodiment, the multiplier-accumulator circuitry in the execution pipeline is configured in a linearly connected pipeline architecture including, for example, serially interconnected MAC circuits (see, e.g., FIG. 1B). In this embodiment, Dijk data is "fixed" in place during execution and Yijl data "rotates" during execution of the multiply and accumulate operations. The "m×m" Fkl filter weights are distributed across L0 memory (in one exemplary embodiment, m=64 such that 64 L0 SRAMs are employed—wherein one L0 SRAM in each MAC processing circuit of the 64 MAC processing circuit of the pipeline). In each execution cycle, m Fkl values will be read from memory and provided/output to the MAC elements or circuits. Again, in one exemplary embodiment, m=64. Notably, an embodiment of a multiplier-accumulator circuit is illustrated in schematic block diagram form in Inset A.

The Dijk data values may be stored in the processing element/circuit during the m execution cycles after being loaded from the Dijk shifting chain/path which is connected to DMEM memory (here, L2 memory—such as SRAM). Further, during multiply and accumulate processing, via the m MAC circuits, the Yijlk MAC values are rotated through all m MAC circuits during the m execution cycles after being loaded from the Yijk shifting chain/path (see $Y_{MEM}$ memory), and will be unloaded with the same shifting chain/path. Here, the plurality of MAC circuits are connected in series to form a linear pipeline to facilitate concatenating the multiply and accumulate operations. The extent or length of the concatenation (i.e., number of multiplier-accumulator circuits interconnected to implement or perform the multiply and accumulate operations) may be adjusted (i.e., increased or decreased), for example, in situ (i.e., during operation of the integrated circuit), for example, to meet system requirements or constraints (e.g., temporal-based requirements of system performance).

Further, in this exemplary embodiment, "m" (e.g., 64 in one embodiment) MAC processing circuits in the execution pipeline operate concurrently whereby the MAC processing circuits perform m×m (e.g., 64×64) multiply-accumulate operations in each m (e.g., 64) cycle interval (here, a cycle may be nominally 1 ns). Thereafter, a next set of input pixels/data (e.g., 64) is shifted-in and the previous output pixels/data is shifted-out during the same m cycle interval (e.g., 64). Notably, each m cycle interval (e.g., 64) processes a Dd/Yd (depth) column of input and output pixels/data at a particular (i,j) location (the indexes for the width Dw/Yw and height Dh/Yh dimensions). The m cycle execution interval (e.g., 64) is repeated for each of the Dw*Dh depth columns for this stage. In this exemplary embodiment, the filter weights or weight data are loaded into memory (e.g., the L1/L0 SRAM memories) from, for example, an external memory or processor before the stage processing started (see, e.g., the '345 and '306 applications). In this particular embodiment, the input stage has Dw=512, Dh=256, and Dd=128, and the output stage has Yw=512, Yh=256, and Yd=64. Note that only 64 of the 128 Dd input are processed in each 64×64 MAC execution operation.

With continued reference to FIG. 1A, the method implemented by the circuit configuration illustrated may accommodate arbitrary image/data plane dimensions (Dw/Yw and Dh/Yh) by simply adjusting the number of iterations of the basic m×m MAC accumulation operation that are performed. The loop indices "I" and "j" are adjusted by control and sequencing logic circuitry to implement the dimensions of the image/data plane. Moreover, the method may also be adjusted and/or extended to handle a Yd column depth larger than the number of MAC processing elements (e.g., 64 in this illustrative example) in the execution pipeline. In one embodiment, this may be implemented by dividing the depth column of output pixels into blocks (e.g., 64), and repeating the MAC accumulation of FIG. 1A for each of these blocks.

Indeed, the method intimated in FIG. 1A may be further extended to handle a Dd column depth smaller or larger than the number of MAC processing elements/circuits (64 in one exemplary embodiment) in the execution pipeline. In the context of larger than the number of MAC circuits, this may be implemented, in one embodiment, by initially performing a partial accumulation of a first block of 64 data of the input pixels Dijk into each output pixel Yijl. Thereafter, the partial accumulation values Yijl are read (from the memory $Y_{mem}$) back into the execution pipeline as initial values for a continuing accumulation of the next block of 64 input pixels Dijk into each output pixel Yijl. Where memory is employed to store or hold the continuing accumulation values, the memory (e.g., L2 memory) may be organized, partitioned and/or sized to accommodate any extra read/write bandwidth to support the processing operation.

With reference to FIGS. 1B and 1C, in one embodiment, a plurality of multiplier-accumulator circuits (e.g., 64) are configured in a linear multiplier-accumulator execution or processing pipeline. Each multiplier-accumulator circuit (labeled "MAC x") may include one or more "local" memory/register banks (two banks are depicted in the embodiment of FIG. 1B), which are associated with and dedicated to a particular multiplier-accumulator circuit, to store a plurality of different sets of filter weights, to be employed in connection with the multiply operations associated with the processing a given set of input data.

In one illustrated embodiment, multiplier-accumulator circuit includes two memory/register banks (e.g., L0 such as SRAM) that are independent banks such that in each execution cycle, one of the banks for each MAC may be read (using the shared read address bus), placing the read data on an associated RD[p] signal line that is input into the multiplexer (often times referred to as "mux"). The read data is moved/written into the F register (D_r[p]) to be used in the execution cycle. The F register (D_r[p]) is written with a new filter weights (Fkl value) for each execution cycle. That is, during the execution cycle, the other memory/register bank (i.e., the bank that is not being read from during the current execution cycle) is available to store filter weights (e.g., filter weights to be employed in the next or a subsequent execution cycle) via write operations (using a WA address bus that, in one embodiment, is shared/common between the memory/register banks).

With continued reference to FIG. 1B, each multiplier-accumulator circuit (which may also be referred to as "processing element" or "MAC processor") includes the shifting chain (D_SI[p]) for the data input (Dijk data). In one embodiment, during the processing, the next Dijk data is shifted in while the current Dijk data is used in the current set of execution cycles. The current Dijk data is stored in the D_i[p] register during the current set of execution cycles without changing.

Further, each multiplier-accumulator circuit includes a shifting chain (MAC_SO[p]) for preloading the Yijl sum. The next set of Yijl sums are shifted in while the current set of Yijl sums are calculated/generated during the current set of execution cycles. In this embodiment, each multiplier-accumulator circuit also uses the shifting chain (MAC_SO[p]) for unloading or outputting the Yijl sum. The previous Yijl sums are shifted out while the current Yijl sums are generated in the current set of execution cycles. Notably, the concurrent use of the Yijl shifting chain (MAC_SO[p]) both preloading and unloading will be discussed in more detail below.

In each execution cycle, the filter weight value (Fkl value) in the D_r[p] register is multiplied by the Dijk value in the D_i[p] register, via the multiplier circuit (MUL), and the result is output to the MULT_r[p] register. In the next pipeline cycle this product (i.e., D*F value) is added to the Yijl accumulation value in the MAC_r[p−1] register (in the previous multiplier-accumulator circuit) and the result is stored in the MAC_r[p] register. This execution process is repeated for the current set of execution cycles. Notably, the Yijl accumulation values move (rotate) during the current set of execution cycles.

With reference to FIG. 1D, the integrated circuit may include a plurality of multi-bit MAC execution pipelines which are organized as one or more clusters of a processing component. Here, the component may include "resources" such as a bus interfaces (e.g., a PHY and/or GPIO) to facilitate communication with circuitry external to the component and memory (e.g., SRAM and DRAM) for storage and use by the circuitry of the component. For example, with reference to FIG. 1D, in one embodiment, four clusters are included in the component (labeled "X1") wherein each cluster includes a plurality of multi-bit MAC execution pipelines (for example, in this illustrative embodiment 16 64-MAC execution pipelines). Notably, one MAC execution pipeline (which in this illustrative embodiment includes m MAC processing circuits) of FIG. 1A is illustrated at the lower right for reference purposes.

With continued reference to FIG. 1D, the memory hierarchy in this exemplary embodiment includes an L0 memory (e.g., SRAM) that stored filter weights or coefficients to be employed by multiplier-accumulator circuits in connection with the multiplication operations implemented thereby. In one embodiment, each MAC execution pipeline includes an L0 memory to store the filter weights or coefficients associated with the data under processing by the circuitry of the MAC execution pipeline. An L1 memory (a larger SRAM resource) is associated with each cluster of MAC execution pipelines. These two memories may store, retain and/or hold the filter weight values Fijklm employed in the multiply and accumulation operations.

Notably, the embodiment of FIG. 1D may employ an L2 memory (e.g., an SRAM memory that is larger than the SRAM of L1 or L0 memory). A network-on-chip (NOC) couples the L2 memory to the PHY (physical interface) to provide connection to an external memory (e.g., L3 memory—such as, external DRAM component(s)). The NOC also couples to a PCIe PHY which, in turn, couples to an external host. The NOC also couples to GPIO input/output PHYs, which allow multiple X1 components to be operated concurrently. The control/configure circuit (referred to, at times, as "NLINKS" or "NLINKS circuit") connect to multiplier-accumulator circuitry (which includes a plurality (in one exemplary embodiment, 64) multiplier-accumulator circuits or MAC processors) to, among other things, configure the overall execution pipeline by providing or "steering" data between one or more MAC pipeline(s), via programmable or configurable interconnect paths. In addition, the control/configure circuit may configure the interconnection between the multiplier-accumulator circuitry and one or more memories—including external memories (e.g., L3 memory, such as external DRAM)—that may be shared by one or more (or all) of the clusters of MAC execution pipelines. These memories may store, for example, the input image pixels Dijk, output image pixels Yijl (i.e., image data processed via the circuitry of the MAC pipeline(s), as well as filter weight values Fijklm employed in connection with such data processing.

Notably, although the illustrative or exemplary embodiments described and/or illustrated a plurality of different memories (e.g., L3 memory, L2 memory, L1 memory, L0 memory) which are assigned, allocated and/or used to store certain data and/or in certain organizations, one or more of other memories may be added, and/or one or more memories may be omitted and/or combined/consolidated—for example, the L3 memory or L2 memory, and/or the organizations may be changed. All combinations are intended to fall within the scope of the present inventions.

Moreover, in the illustrative embodiments set forth herein (text and drawings), the multiplier-accumulator circuitry and/or multiplier-accumulator pipeline is, at times, labeled in the drawings as "NMAX", "NMAX pipeline", "MAC", or "MAC pipeline".

With continued reference to FIG. 1D, the integrated circuit(s) include a plurality of clusters (e.g., two, four or eight) wherein each cluster includes a plurality of MAC execution pipelines (e.g., 16). Each MAC execution pipeline may include a plurality of separate multiplier-accumulator circuits (e.g., 64) to implement multiply and accumulate operations. In one embodiment, a plurality of clusters may be interconnected to form a processing component, having one or more MAC execution pipelines, (such component is often identified in the figures as "X1" or "X1 component") that may include memory (e.g., SRAM, MRAM and/or Flash), a switch interconnect network to interconnect circuitry of the component (e.g., the multiplier-accumulator circuits and/or MAC execution pipeline(s) of the X1 component) and/or circuitry of the component with circuitry of one or more other X1 components. Here, the multiplier-accumulator circuits of the one or more MAC execution pipelines of a plurality of clusters of a X1 component may be configured to concurrently process related data (e.g., image data). That is, the plurality of separate multiplier-accumulator circuits of a plurality of MAC pipelines may concurrently process related data to, for example, increase the data throughput of the X1 component.

Notably, the X1 component may also include interface circuitry (e.g., PHY and/or GPIO circuitry) to interface with, for example, external memory (e.g., DRAM, MRAM, SRAM and/or Flash memory).

With reference to FIG. 2A, in one exemplary configuration, the control/configure or NLINKS circuit (which, in one embodiment, is dedicated to the associated MAC execution pipeline) connects to the execution pipeline via a plurality of ports including (i) the DI_I, MAC_SI, DI_O, MAC_SO ports, which connect the execution pipeline to memory that is external to the pipeline (e.g., L2 memory such as SRAM), and (ii) the MAC_I, MAC_O ports which connect the plurality of multiplier-accumulator circuits (or the two rows of multiplier-accumulator circuits) into ring configuration or architecture. In this exemplary embodiment, the control/configure or NLINKS circuit is configured to be an interface for an associated MAC execution pipeline to, for example, provide input data to execution pipeline (e.g., from memory) and receive the output/processed data from the execution pipeline (e.g., to output to memory). Moreover, in this particular embodiment, the control/configure or NLINKS circuit is not configured to interface or interact with control/configure or NLINKS circuit(s) and/or adjacent execution pipelines. (Compare the pipeline architectures in U.S. Non-Provisional application Ser. No. 17/212,411 and/or U.S. Provisional Application No. 62/012,111, wherein a plurality of NLINKS circuits are interconnected (and, by extension the MAC pipelines thereof) to form a larger pipeline architecture; the '111 and '411 applications are hereby incorporated by reference herein.)

Notably, a "port" is a physical point of entry to and/or exit from the control/configure or NLINKS circuit; all physical forms of entry to or exit from the control/configure or NLINKS circuit are intended to fall within the scope of the present invention (for example, a conductor or metal routing in/of an integrated circuit).

With reference to FIGS. 2A, 2B, 2E and 2F, the execution pipeline in this embodiment includes a plurality of multiplier-accumulator circuits (each labeled "MAC") that are connected in series to form a linear execution pipeline of a plurality of rows of MACs, that are interconnected via row interconnects. In operation, the execution pipeline receives input data at DI_I (see "Input Data Port" in NLINKS (lower)), processes the data via concatenating the multiply and accumulate operations, and outputs processed data at MAC_SO (see "Output Data Port" in NLINKS(upper)). As noted above, the control/configure or NLINKS circuit configures two rows of multiplier-accumulator circuits into ring configuration or architecture via connecting the MAC_I, MAC_O ports, and thereby the processing operations of the plurality of multiplier-accumulator circuits of the execution pipeline.

With reference to FIGS. 2A-2F, the signals traversed on the L0 Memory data, address and control paths in the NLINKS circuit and execution pipeline denote the control and address information that manages and controls the execution sequences of the processing. The control and address signals are generated by control logic circuitry (not illustrated—and which, in one embodiment, is external to the NLINKS and execution pipeline). In addition, such control logic also manages or controls write data (i.e., the filter weights) and write sequences in relation to each L0 memory (e.g., SRAM) which is associated with and dedicated to the multiplier-accumulator circuits in the execution pipeline. The write data (filter weights) is read from memory external to the execution pipeline (L1 memory—e.g., SRAM) (see, e.g., FIGS. 1A and 1B). Notably, a sequence to write data into one of the banks of each L0 memory associated with the multiplier-accumulator circuits is performed/completed before the execution process using the filter weights associated with that sequence is initiated.

With continued reference to FIGS. 2A-2F, the signals traversed on the Input Data Path in the NLINKS circuit and execution pipeline denote input data (e.g., image data) applied to or received by the MAC pipeline and processed by/in an execution sequence. The input data may be stored in L2 memory (e.g., SRAM) and provided (i.e., read from memory) to the NLINKS circuit via the control logic circuitry (not illustrated). In one embodiment, this input data are provided to the pipeline in sets or groups (e.g., 64 element groups or sets wherein each element is 17 bits in size/length). A set or group of input data is shifted in serially through the DI_I port and loaded into the pipeline in parallel to the D register in each of the multiplier-accumulator circuits of the execution pipeline. The end of the serial path is the DI_O output port in the NLINKS circuit (see "Input Data Port" in NLINKS(upper)). The input data path in the NLINKS(upper) may not be used in this illustrative pipeline architecture/configuration.

The accumulation data paths in the NLINKS circuit and execution pipeline denote the ongoing MAC accumulation totals generated by multiplier-accumulator circuits during the execution sequence. In each cycle, each multiplier-accumulator circuit multiplies a filter weight value (from L0 memory) by the (static) value in the D register, adds the total to its accumulation register Y, and passes Y to the right for the next cycle. The Y accumulation values (here, 64) rotate counter-clockwise, and at the end of each cycle interval (e.g., 64-cycle interval) the accumulation values are loaded into the output shift register MAC_S. Note that the Accumulation Data Ports (MAC_O port and MAC_I port) in the NLINKS circuit, and the data path therebetween, are configured and enabled to allow the Y value to be rotated through each of the MACs of the execution pipeline (see also FIG. 1B).

With continued reference to FIGS. 2A-2F, the signals on the output data path in the NLINKS circuit and execution pipeline denote output data generated by an execution sequence (the accumulation operation with prior results in a MAC pipeline and one associated NLINKS circuit (notably, "Shift MAC_Sx within single pipeline" refers to the output data path corresponding to the accumulation operation with prior results)). The output data are parallel loaded from the accumulation registers Y (here, 64) into the MAC_SO registers (here, 64). In one embodiment, this output data may be written to memory external to the NLINKS circuit and execution pipeline (e.g., L2 memory (SRAM)) via the control logic circuitry (not illustrated). In one embodiment, the output data are returned as 64 element groups, with each element 35 bits in length/size. A group of output data is shifted out and stored in memory serially through the Output Data Port (MAC_SO port). The serial bus (MAC_SO and MAC_SI) may also be used to preload initial accumulation values/totals before initiation of the first execution cycle of each execution sequence. These initial accumulation totals are provided (e.g., serially shifted in) to the NLINKS circuit and execution pipeline via the MAC_SI port and loaded in parallel to the Y register in each MAC of the execution pipeline (see also FIG. 1B). In one exemplary embodiment, the initial accumulation data are 35 bits in size/length.

In one embodiment, a linear array of N pipelined MACs or MAC processors performs, as its default operation, a vector-matrix multiply. That is, an N-element vector operand is multiplied by an N×N element matrix to give an N-element result. This employs N-pipeline cycles in relation to the N pipelined MACs or MAC processors. Here, while the current execution happens, the previous N element result vector is unloaded and the next N element operand vector is loaded.

A large value of N often reduces the relative size of the pipeline overhead (an overhead of, for example, a fixed delay of about 6 cycles), but a smaller value of N would allow a wider range of applications to be addressed efficiently. The illustrative examples are typically set forth herein include a value of N=64 (i.e., 64 pipelined MACs or MAC processors—see, e.g., FIGS. 2A, 2B, 2E and 2F). For example, where N=64, a linear array of N MAC processors and an N×N matrix size includes an efficiency of approximately 91% (approximately (64*64)/(64*70)). Where the processing application employs only 32 MAC processors (i.e., a 32×32 matrix size), the efficiency to perform a 32×32 matrix-vector multiply implementing the exemplary pipeline embodiment of FIGS. 2A-2F decreases to 23% (approximately (32×32)/(64*70)) because the 64 MACs or MAC processors are in the pipeline and employ 64 pipeline cycles to generate the accumulation totals to flow through the pipelined array. Here, a 100% performance efficiency of the pipeline indicates or means "N×N" multiply-accumulate operations are performed in "N" pipeline cycle, with N=64 for these exemplary performance efficiency calculations.

Notably, in this application, the performance efficiency formula to perform N×N matrix-vector multiply may be calculated as set forth below:

$$\text{Eff} = (N*N)/(Mp*(M\text{cyc} + M\text{ov}))$$

where:
Eff=performance efficiency, where 100% equals Mp MAC operations per pipeline cycle,
N*N=matrix size,
N=operand vector size,
N=result vector size (e.g., N=64 and N=32)
Mp=number of processor elements in linear pipeline array (nominally Np=64),
Mcyc=number of pipeline cycles to perform N×N matrix-vector multiply, (e.g., Mcyc=64 and Mcyc=32), and
Mov=number of overhead cycles for linear pipeline (nominally Mov=6).

The MAC processing or execution pipeline may be any size or length (e.g., 16, 32, 64, 96 or 128 multiplier-accumulator circuits). Indeed, in one embodiment, the size or length of the pipeline may be configurable or programmable (e.g., one-time or multiple times—such as, in situ (i.e., during operation of the integrated circuit) and/or at or during power-up, start-up, initialization, re-initialization, configuration, re-configuration or the like). For example, the MAC pipelines (each pipeline including a plurality of multiplier-accumulator circuits) may be interconnected into larger execution or processing pipelines as described and/or illustrated in U.S. Non-Provisional application Ser. No. 17/212,411 and U.S. Provisional Application No. 63/012,111; as noted above, the '411 and '111 applications are incorporated by reference herein in its entirety. In one embodiment, the circuitry configures and controls a plurality of separate multiplier-accumulator circuits or rows/banks of interconnected (in series) multiplier-accumulator circuits (referred to, at times, as clusters) to pipeline multiply and accumulate operations.

In another embodiment, the interconnection of the pipeline or pipelines are configurable or programmable to provide different forms of pipelining. (See, e.g., the '411 and '111 applications). Here, the pipelining architecture provided by the interconnection of the plurality of multiplier-accumulator circuits may be controllable or programmable. In this way, a plurality of multiplier-accumulator circuits may be configured and/or re-configured to form or provide the desired processing pipeline(s) to process data (e.g., image data). For example, with reference to the '411 and '111 applications, in one embodiment, control/configure circuitry may configure or determine the multiplier-accumulator circuits, or rows/banks of interconnected multiplier-accumulator circuits are connected (in series) to perform the multiply and accumulate operations and/or the linear pipelining architecture or configuration implemented via connection of multiplier-accumulator circuits (or rows/banks of interconnected multiplier-accumulator circuits). Thus, in one embodiment, the control/configure circuitry configures or implements an architecture of the execution or processing pipeline by controlling or providing connection(s) between multiplier-accumulator circuits and/or rows of interconnected multiplier-accumulator circuits.

In yet another embodiment, the one or more integrated circuits include a plurality of components or X1 components (e.g., 2, 4, . . . ), wherein each component includes a plurality of the clusters having a plurality of MAC execution pipelines. For example, in one embodiment, one integrated circuit includes a plurality of components or X1 components (e.g., 4 clusters) wherein each cluster includes a plurality of execution or processing pipelines (e.g., 16, 32 or 64) which may be configured or programmed to process, function and/or operate concurrently to process related data (e.g., image data) concurrently. In this way, the related data is processed by each of the execution pipelines of a plurality of the clusters concurrently to, for example, decrease the processing time of the related data and/or increase data throughput of the X1 components.

As discussed in the '164 and '413 applications, a plurality of execution or processing pipelines of one or more clusters of a plurality of the X1 components may be interconnected to process data (e.g., image data) In one embodiment, such execution or processing pipelines may be interconnected in a ring configuration or architecture to concurrently process related data. Here, a plurality of MAC execution pipelines of one or more (or all) of the clusters of a plurality of X1 components (which may be integrated/manufactured on a single die or multiple dice) may be interconnected in a ring configuration or architecture (wherein a bus interconnects the components) to concurrently process related data. For example, a plurality of MAC execution pipelines of one or more (or all) of the clusters of each X1 component are configured to process one or more stages of an image frame such that circuitry of each X1 component processes one or more stages of each image frame of a plurality of image frames. In another embodiment, a plurality of MAC execution pipelines of one or more (or all) of the clusters of each X1 component are configured to process one or more portions of each stage of each image frame such that circuitry of each X1 component is configured to process a portion of each stage of each image frame of a plurality of image frames. In yet another embodiment, a plurality of MAC execution pipelines of one or more (or all) of the clusters of each X1 component are configured to process all of the stages of at least one entire image frame such that circuitry of each X1 component is configured to process all of the stage of at least one image frame. Here, each X1 component is configured to process all of the stages of one or more image frames such that the circuitry of each X1 component processes a different image frame.

As mentioned above, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated in detail separately herein.

BRIEF DESCRIPTION OF THE DRAWINGS

The present inventions may be implemented in connection with embodiments illustrated in the drawings hereof. These drawings show different aspects of the present inventions and, where appropriate, reference numerals, nomenclature, or names illustrating like circuits, architectures, structures, components, materials and/or elements in different figures are labeled similarly. It is understood that various combinations of the structures, components, materials and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended reflect or indicate the embodiment(s) is/are "example" embodiment(s).

Notably, the configurations, block/data width, data path width, bandwidths, data lengths, values, processes, pseudo-code, operations, and/or algorithms described herein and/or illustrated in the FIGURES, and text associated therewith, are exemplary. Indeed, the inventions are not limited to any particular or exemplary circuit, logical, block, functional and/or physical diagrams, number of multiplier-accumulator circuits employed in an execution pipeline, number of execution pipelines employed in a particular processing configuration, organization/allocation of memory, block/data width, data path width, bandwidths, values, processes, pseudo-code, operations, and/or algorithms illustrated and/or described in accordance with, for example, the exemplary circuit, logical, block, functional and/or physical diagrams. Moreover, although the illustrative/exemplary embodiments include a plurality of memories and/or memory levels (e.g., L3 memory, L2 memory, L1 memory, L0 memory) which are assigned, allocated and/or used to store certain data (e.g., filter weights) and/or in certain organizations. Indeed, the organizations of the memories may be changed and one or more of memories may be added, and/or one or more memories may be omitted and/or combined/consolidated with other memories—for example, (i) the L3 memory or L2 memory and/or (ii) the L1 memory or L0 memory. Again, the inventions are not limited to the illustrative/exemplary embodiments set forth herein.

Figure 1A:
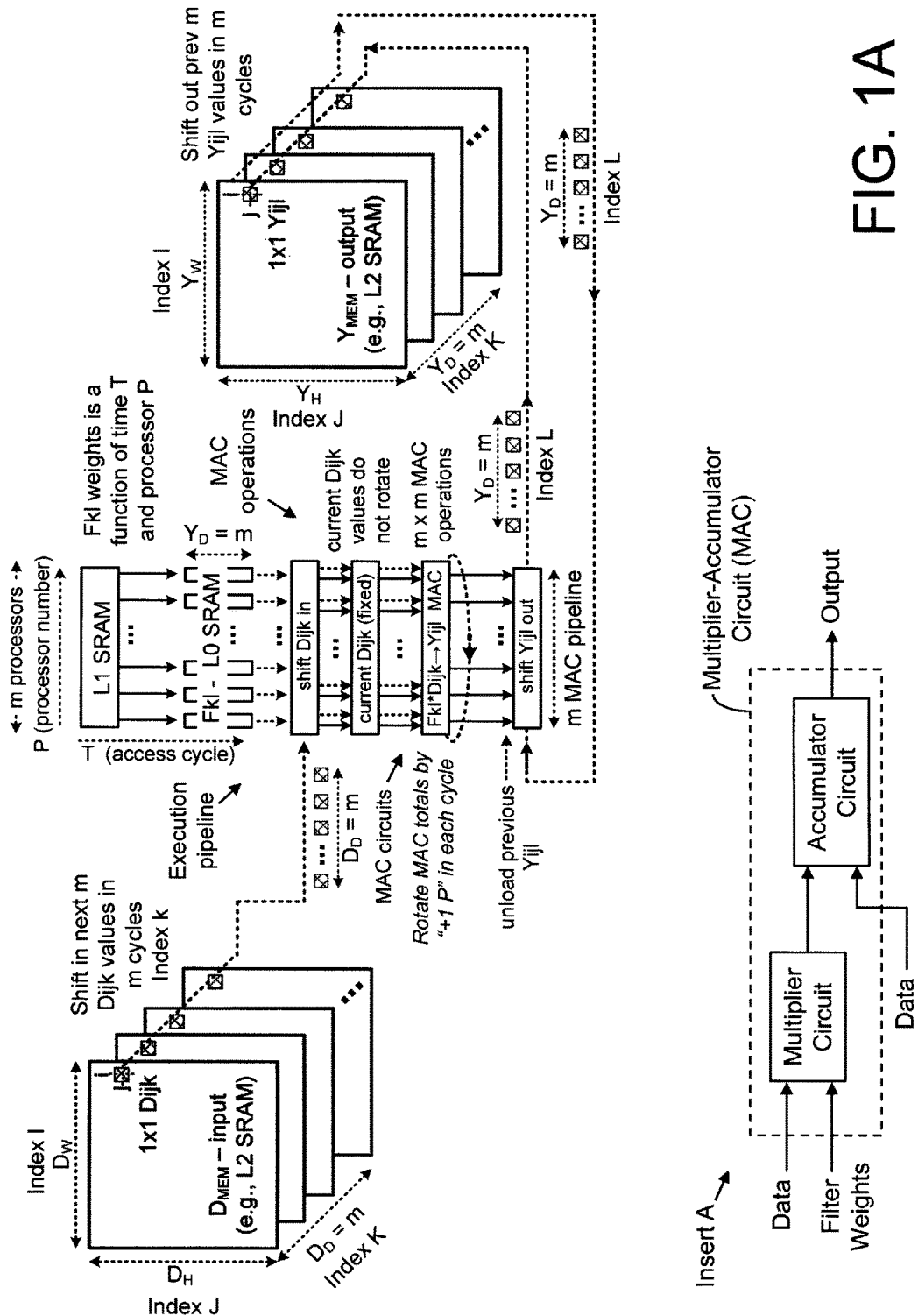
Figure 1B:
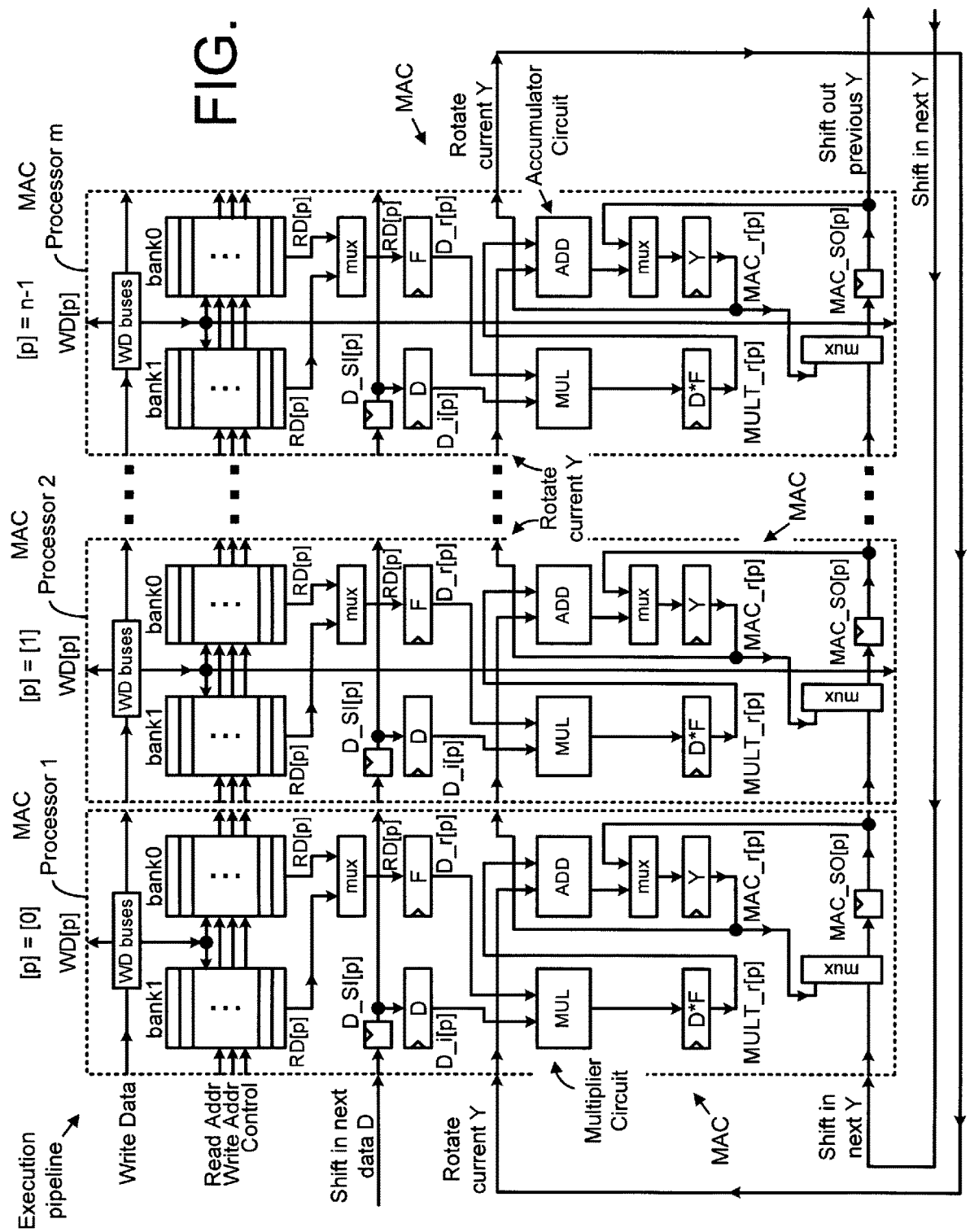
Figure 1C:
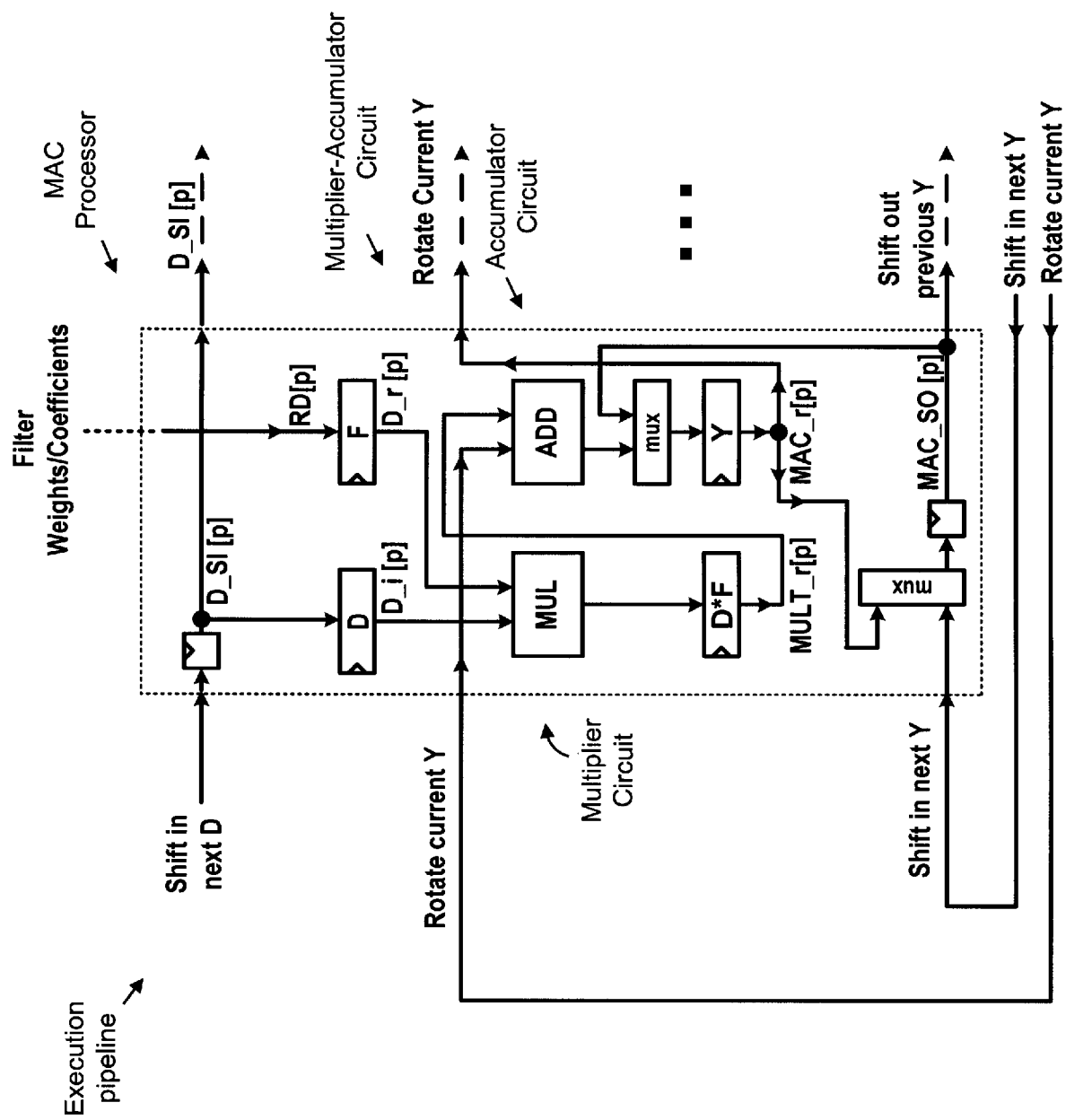
Figure 2A:
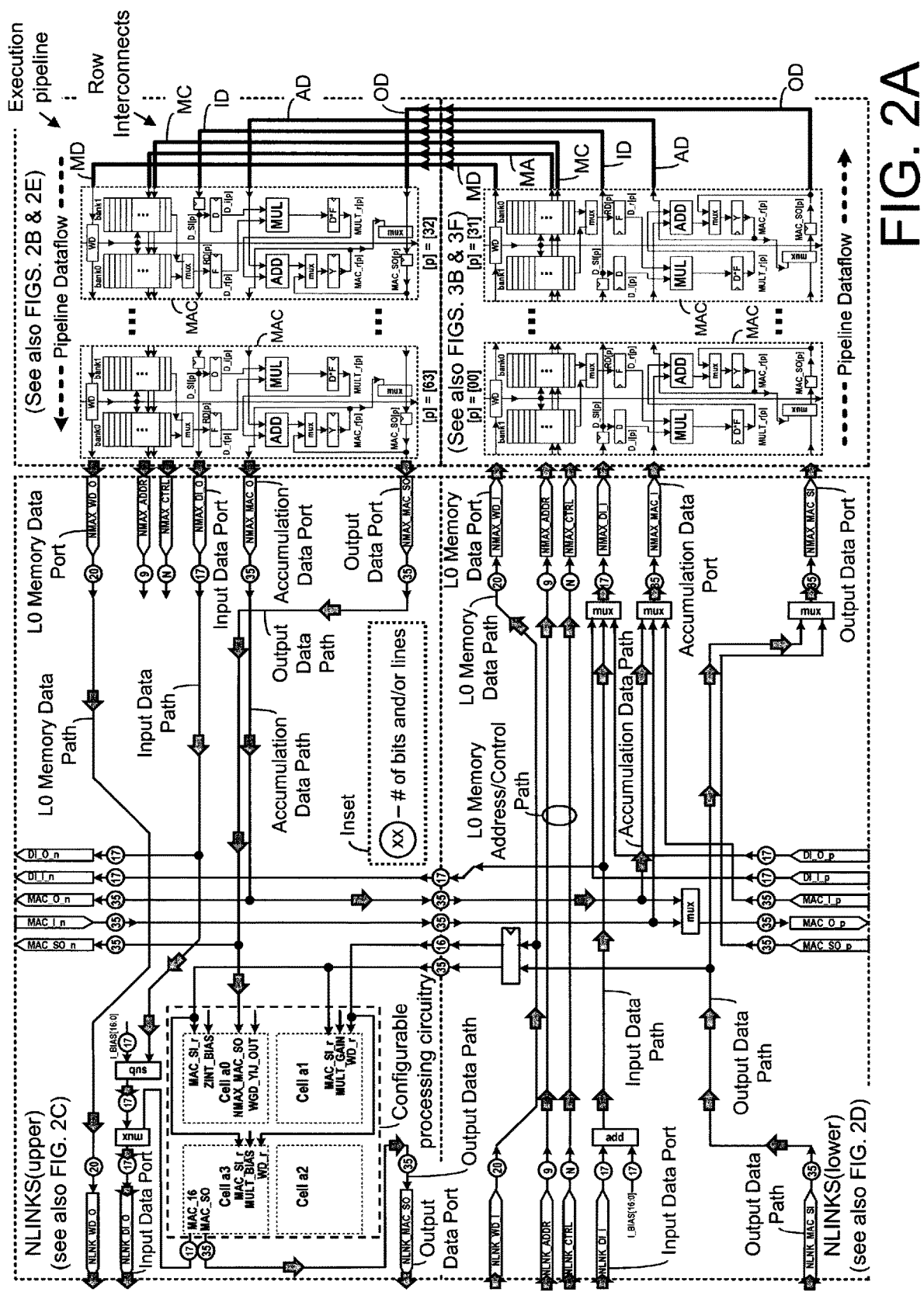
Figure 2B:
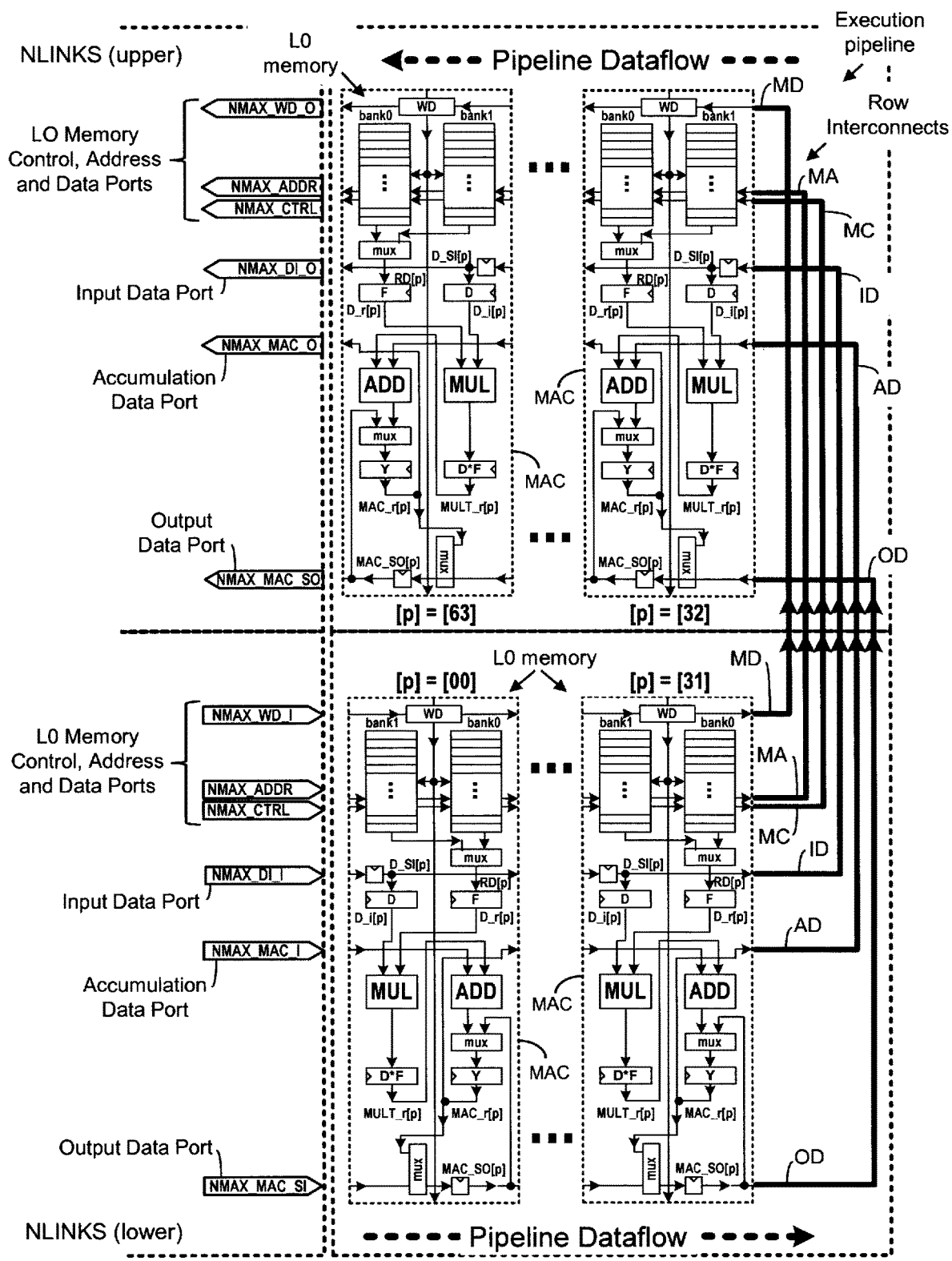
Figure 2C:
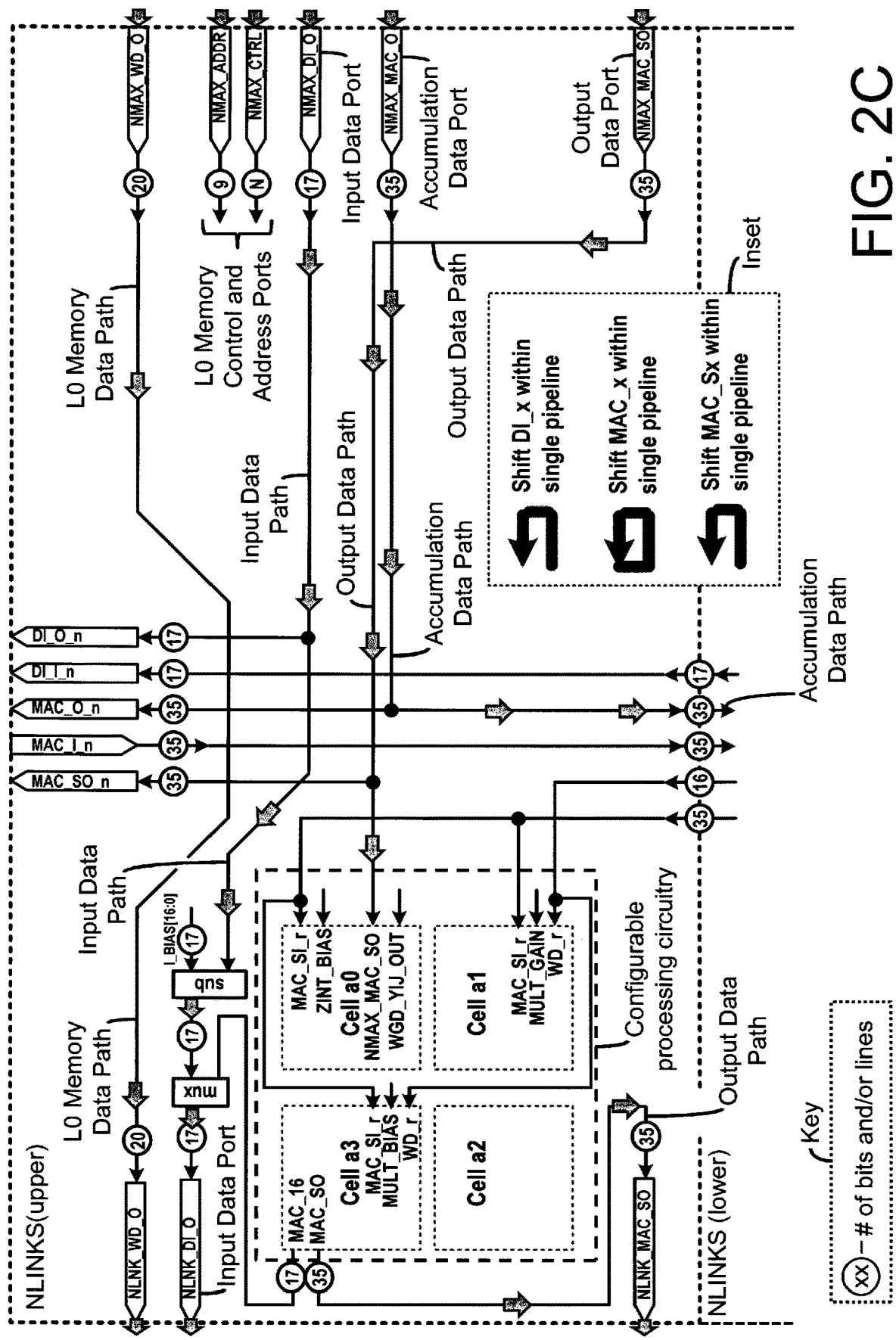
Figure 2E:
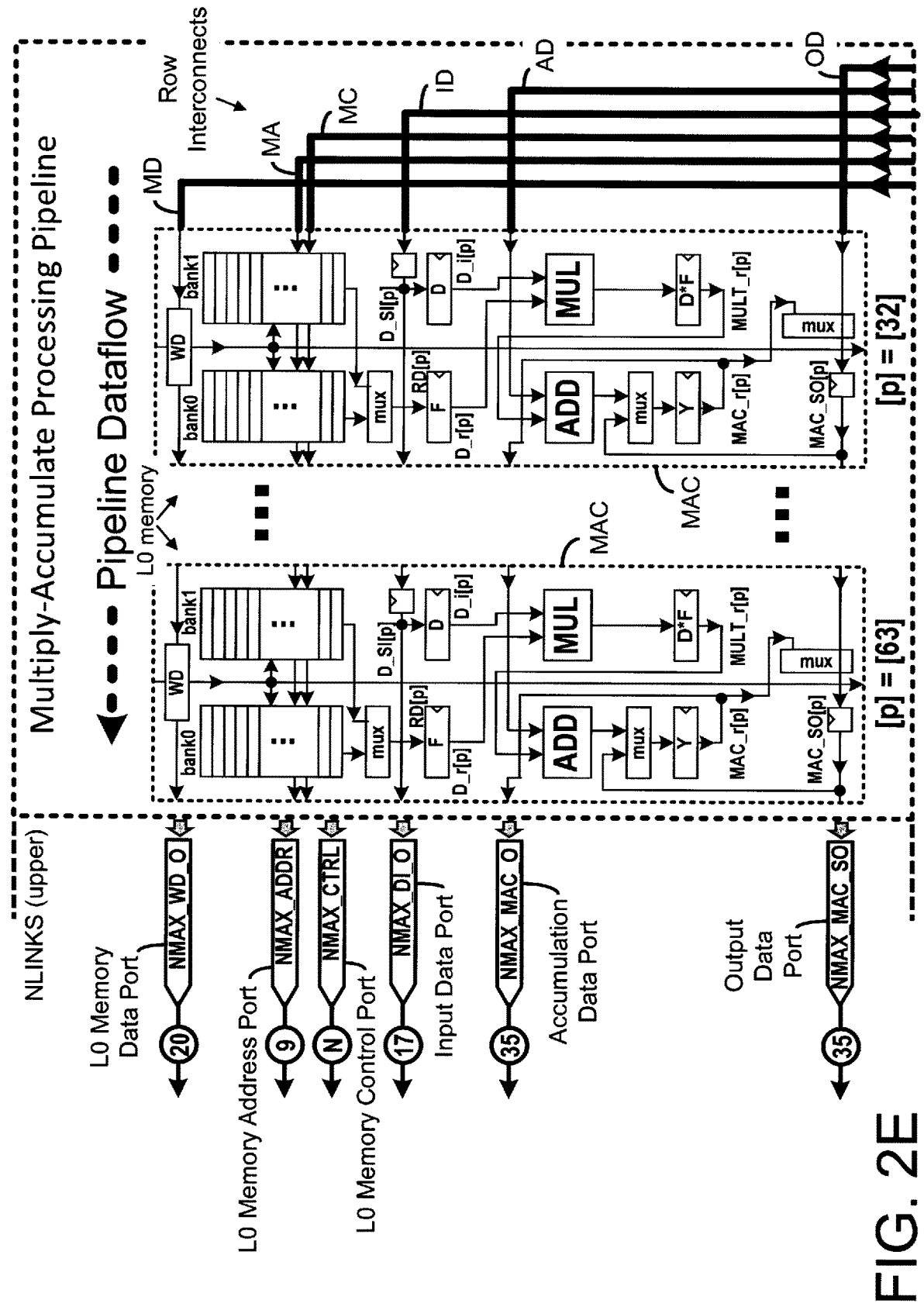
Figure 2F:
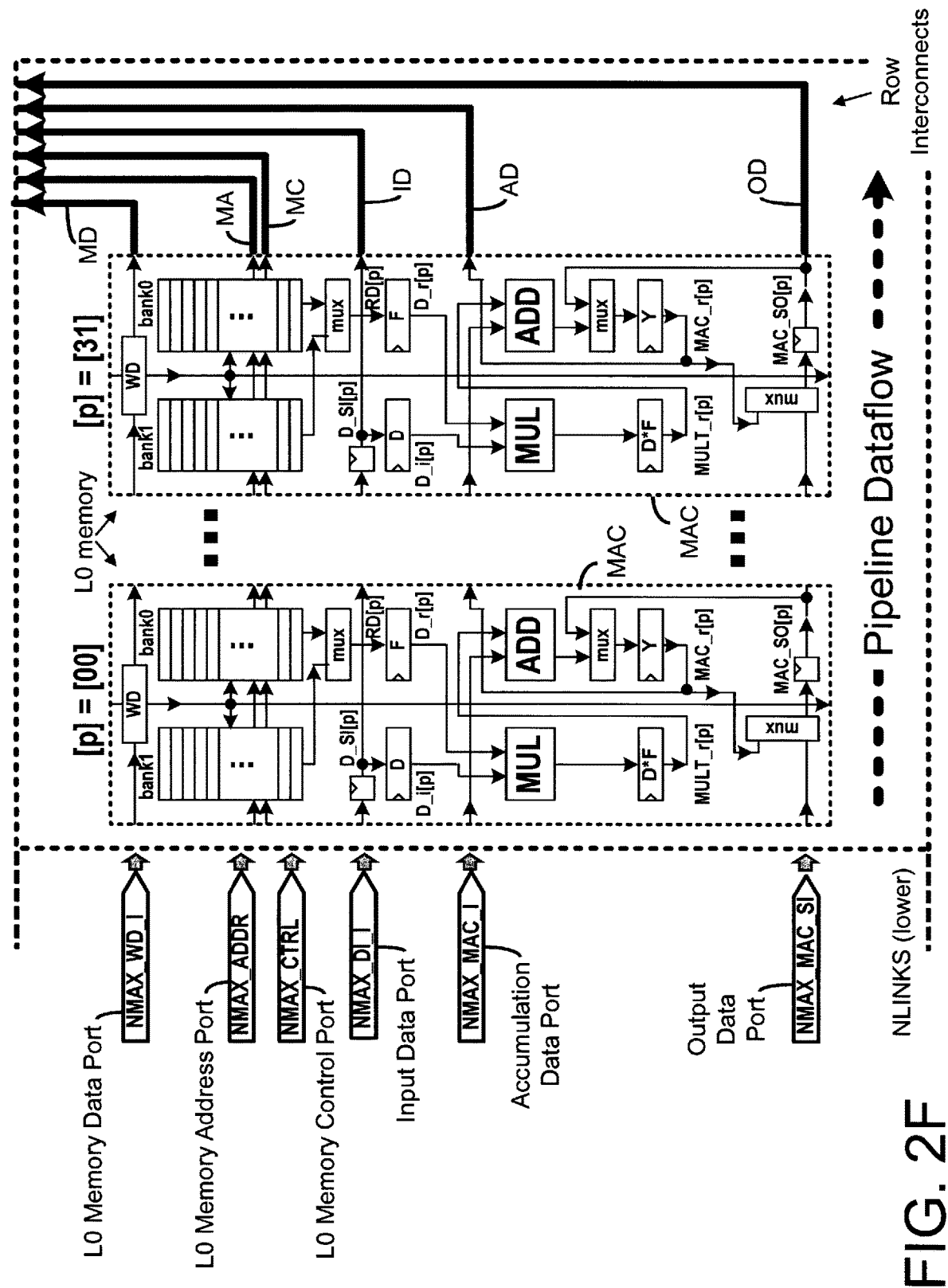
Figure 3:
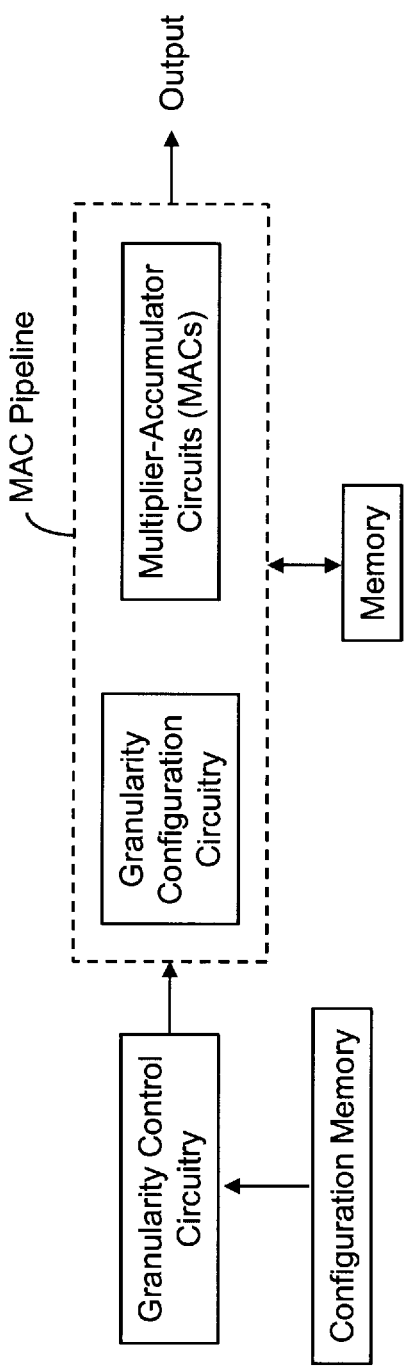
Figure 4A:
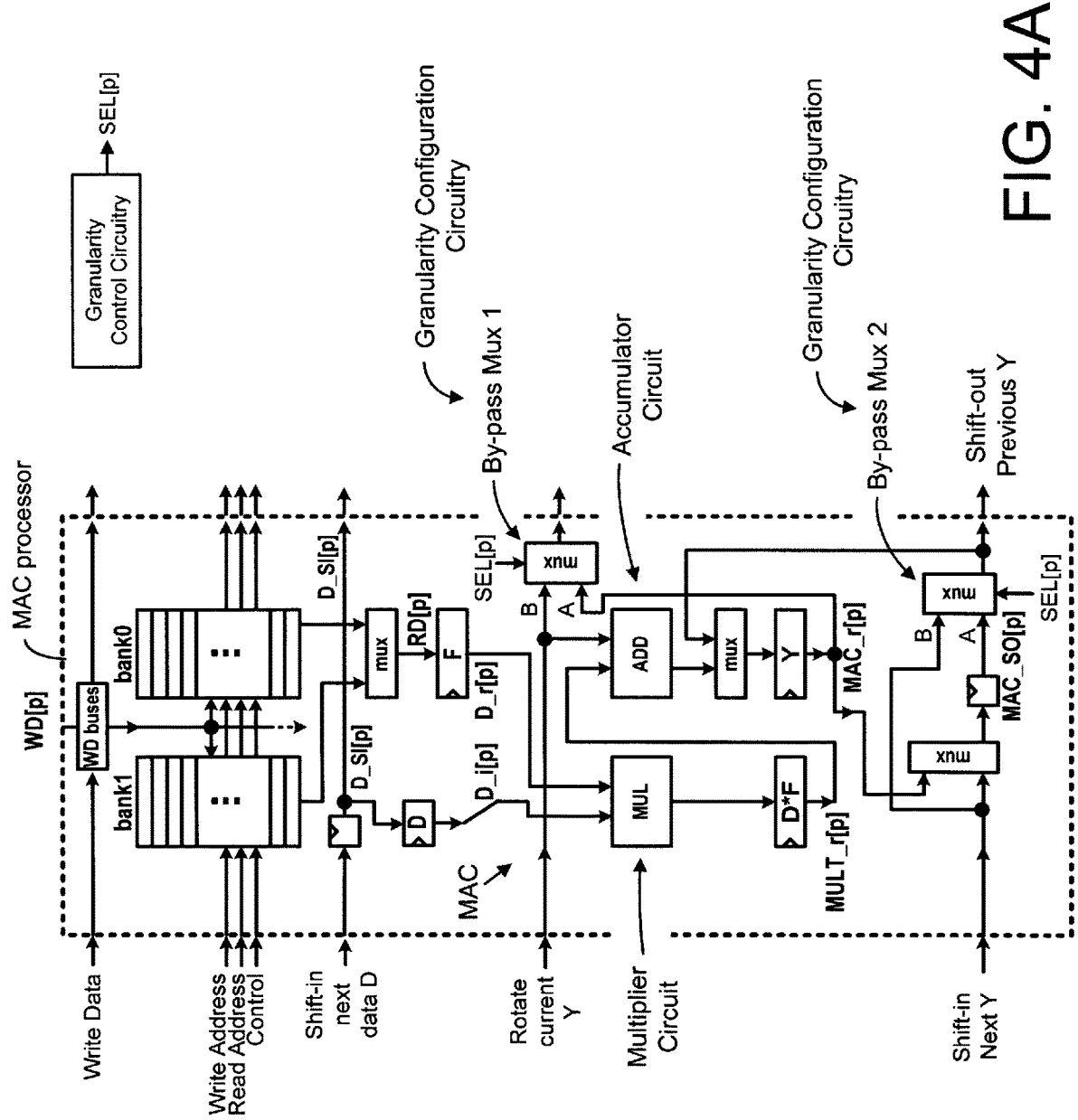
Figure 4B:
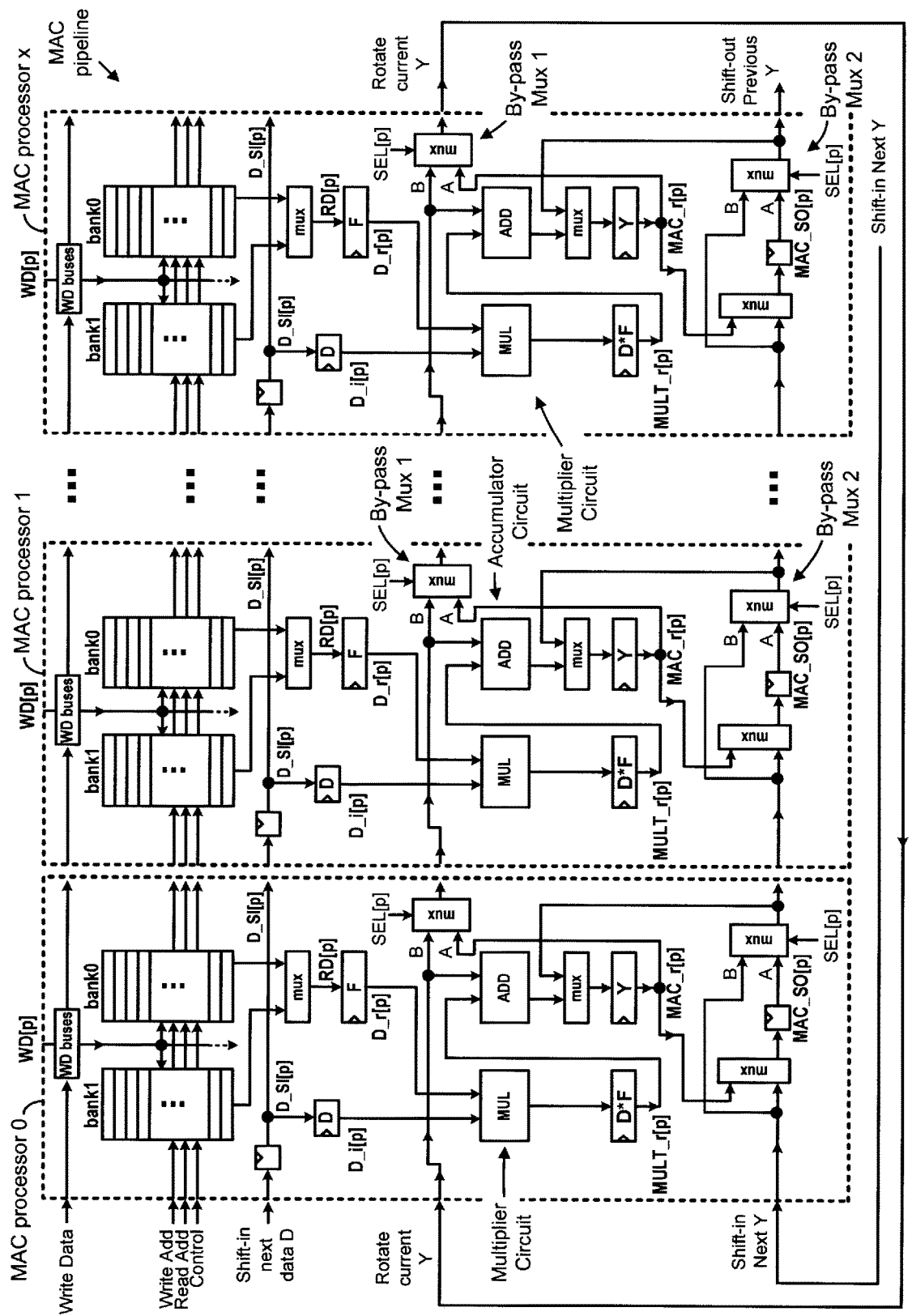
Figure 4C:
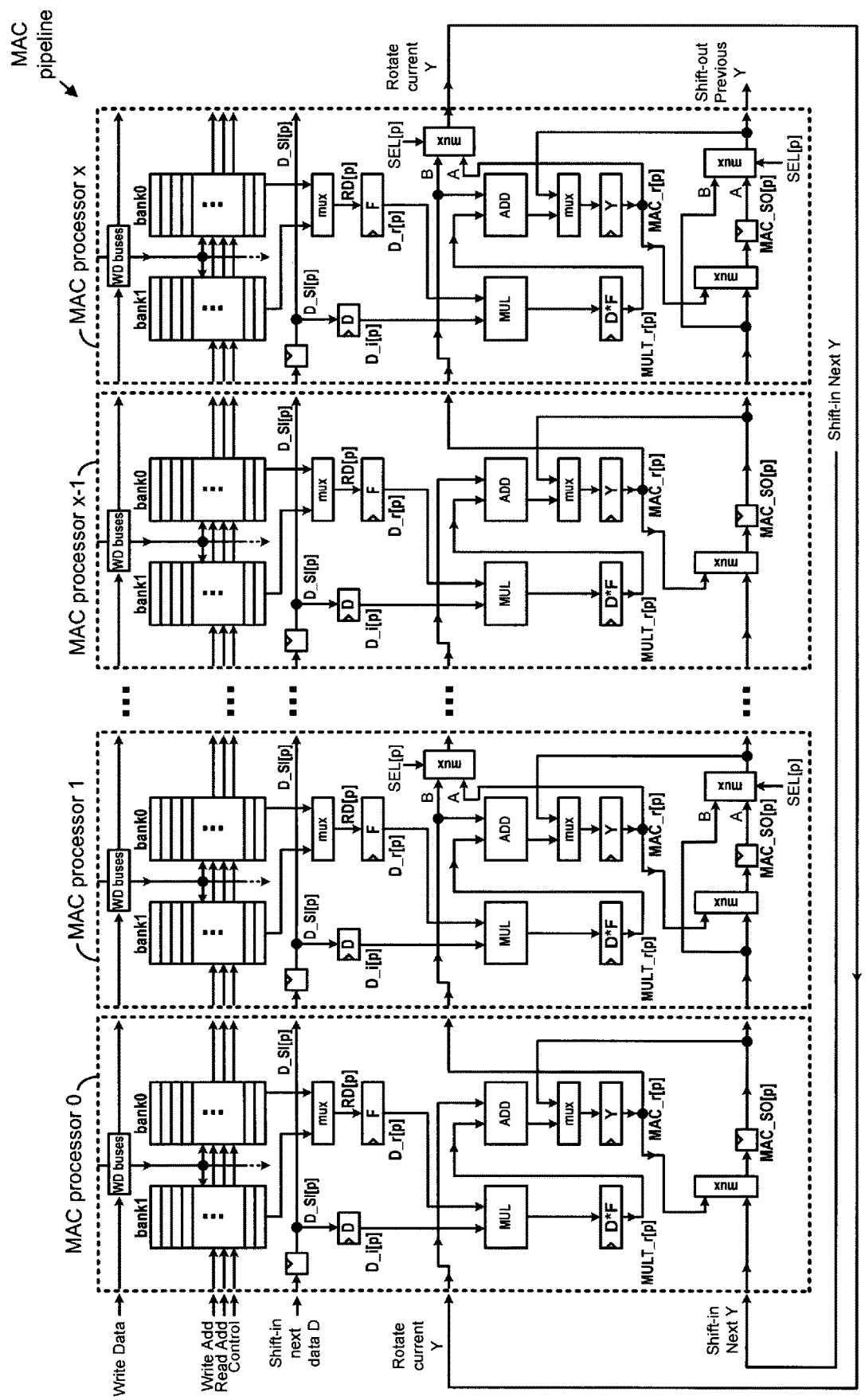
Figure 4D:
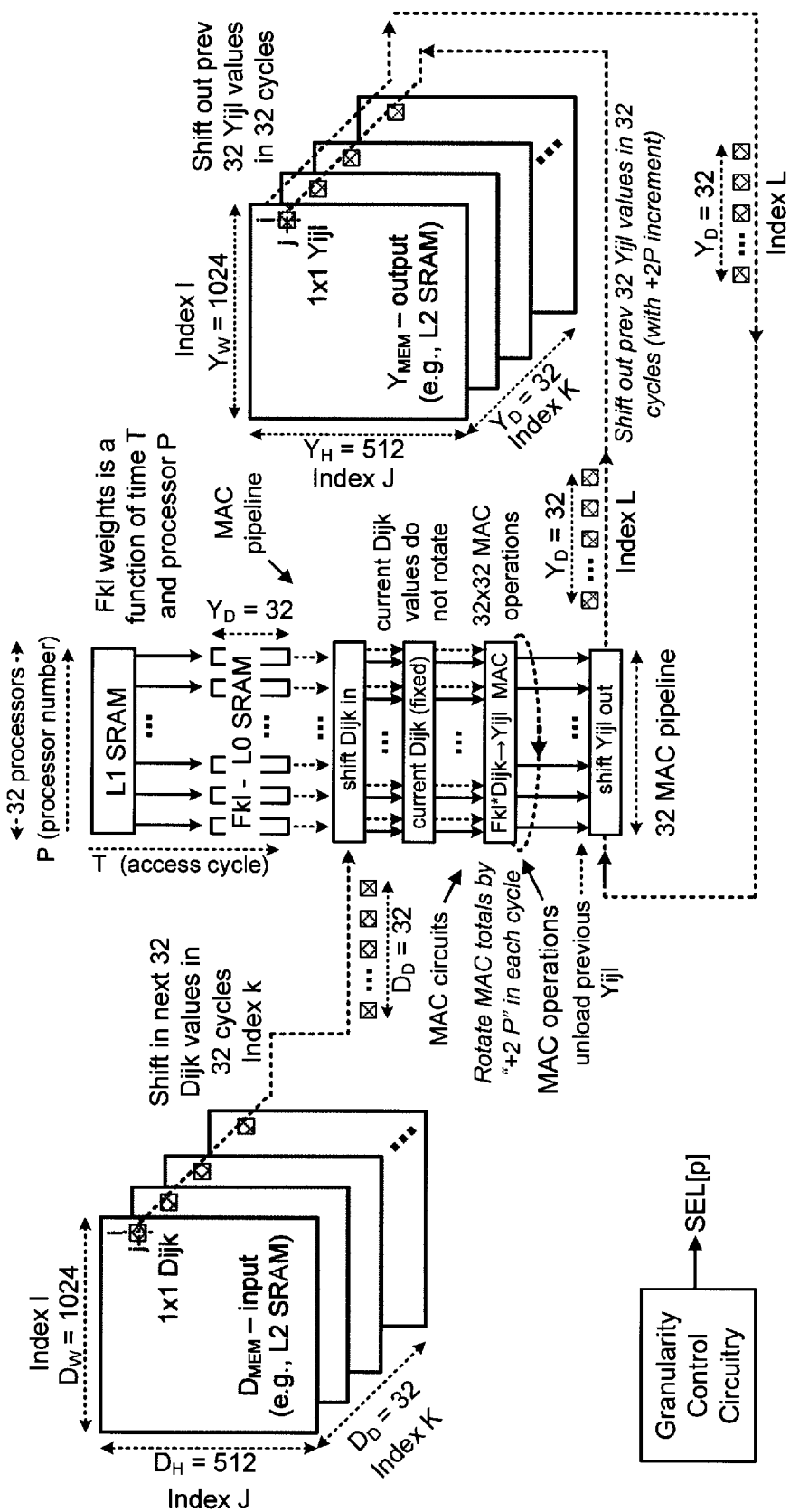
Figure 5A:
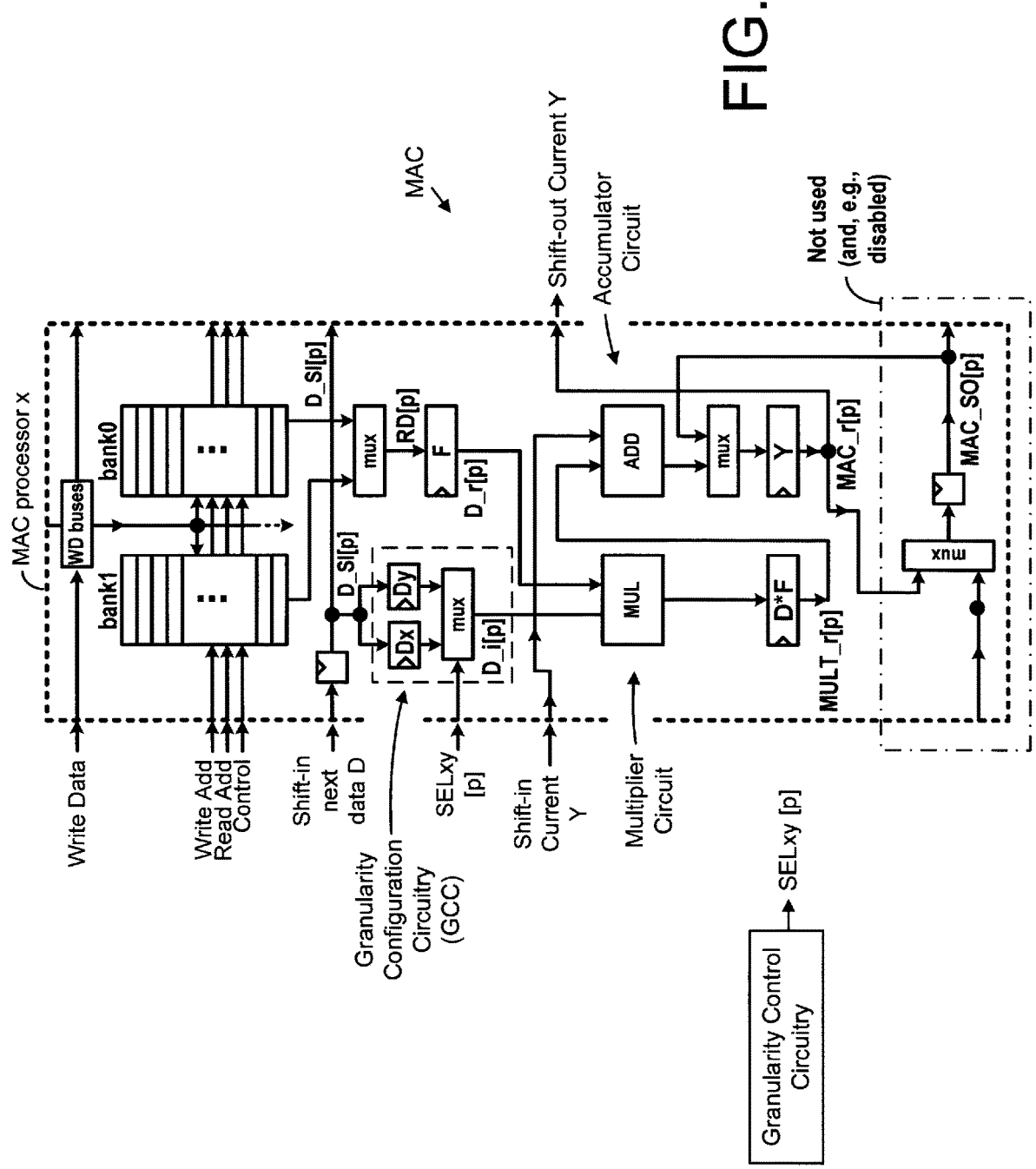
Figure 5B:
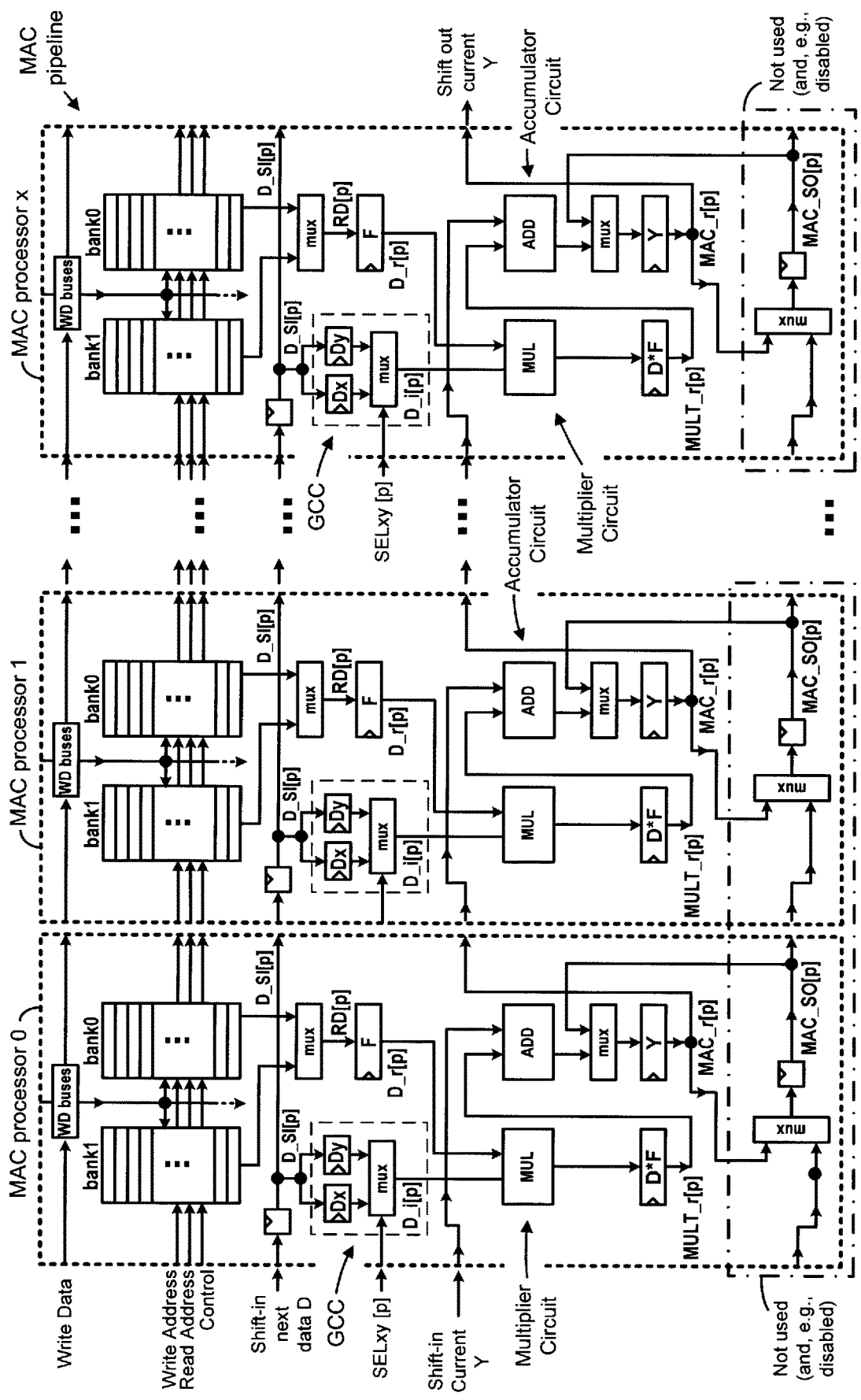
Figure 6A:
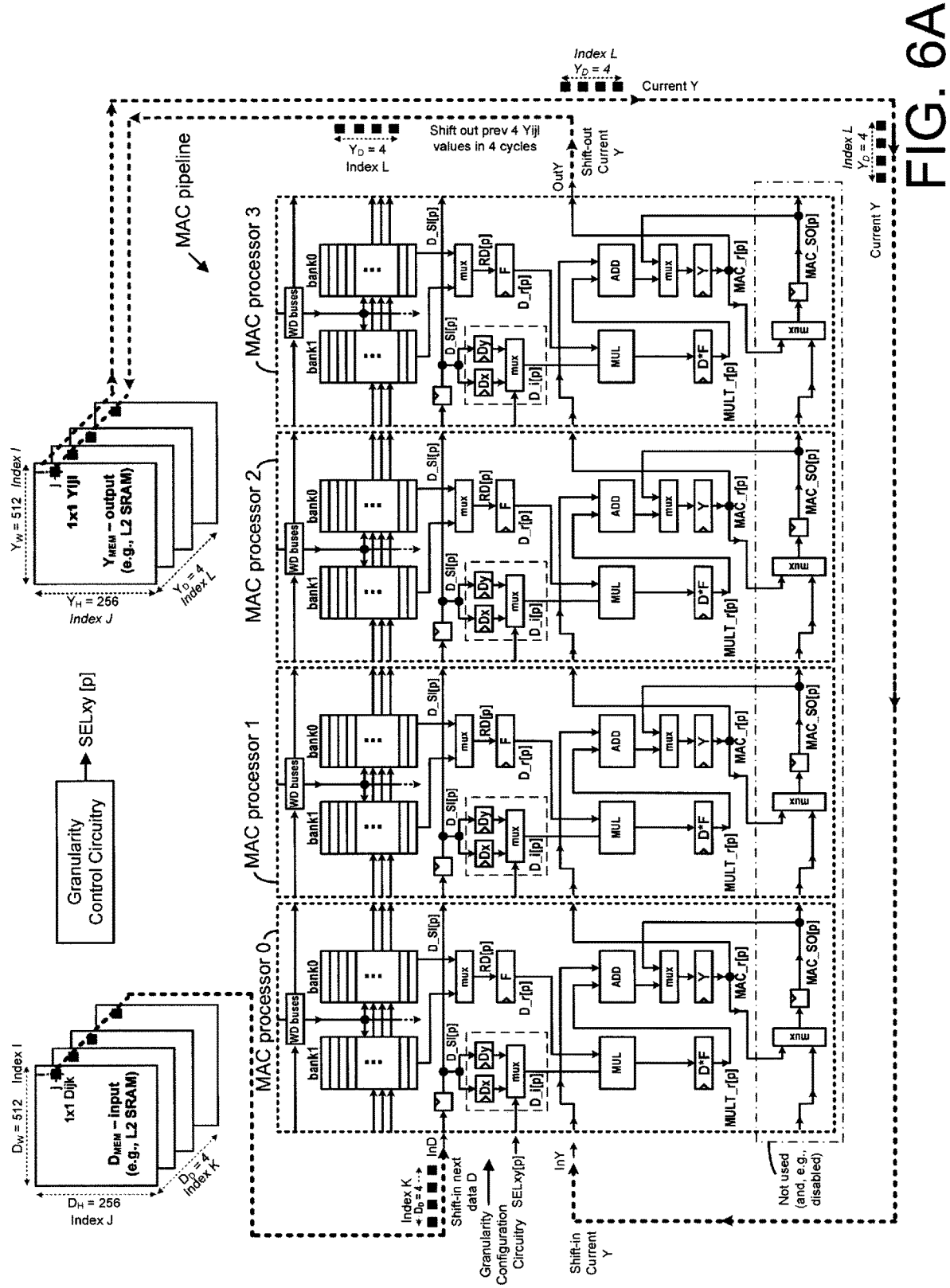
Figure 6B:
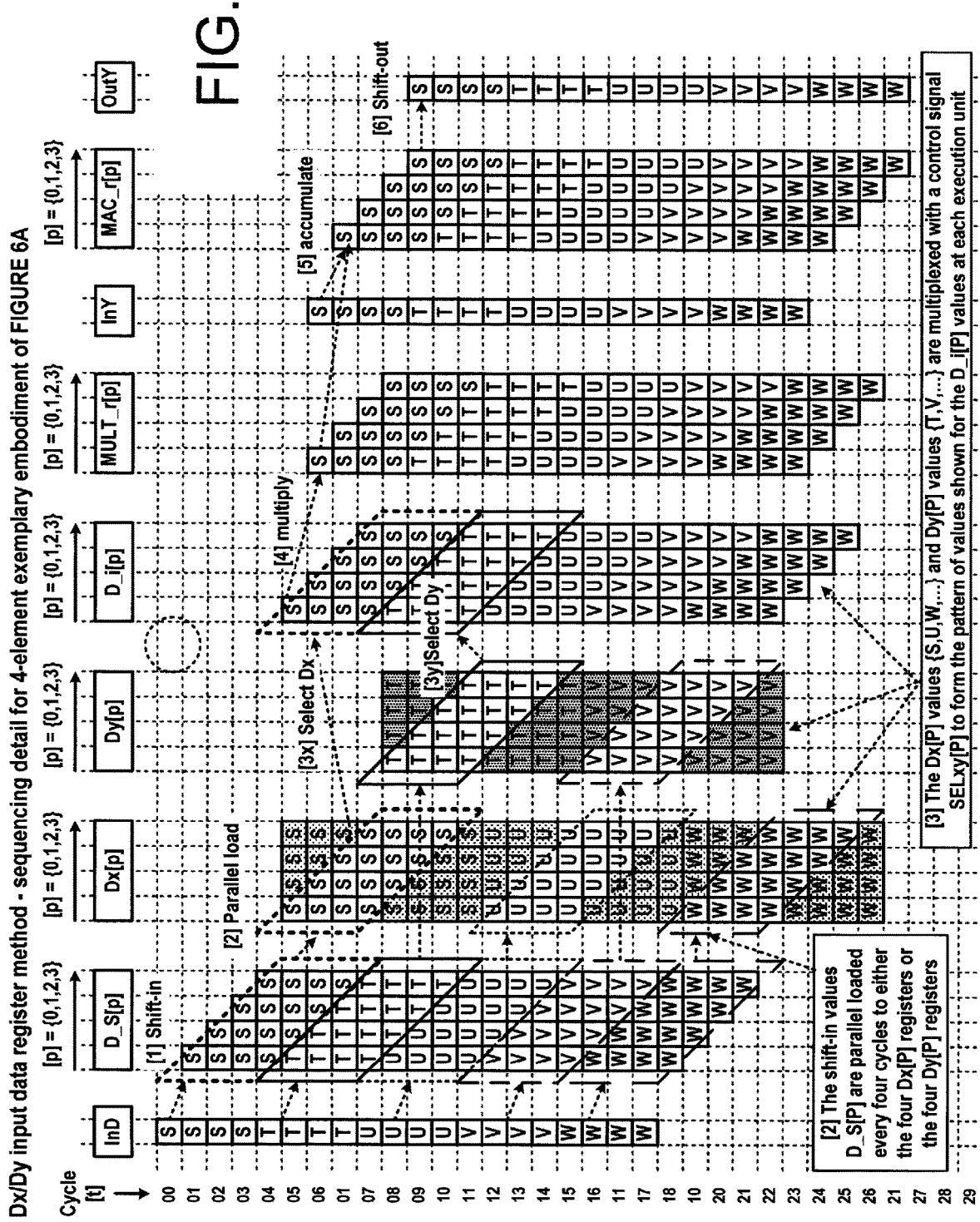
Figure 7C:
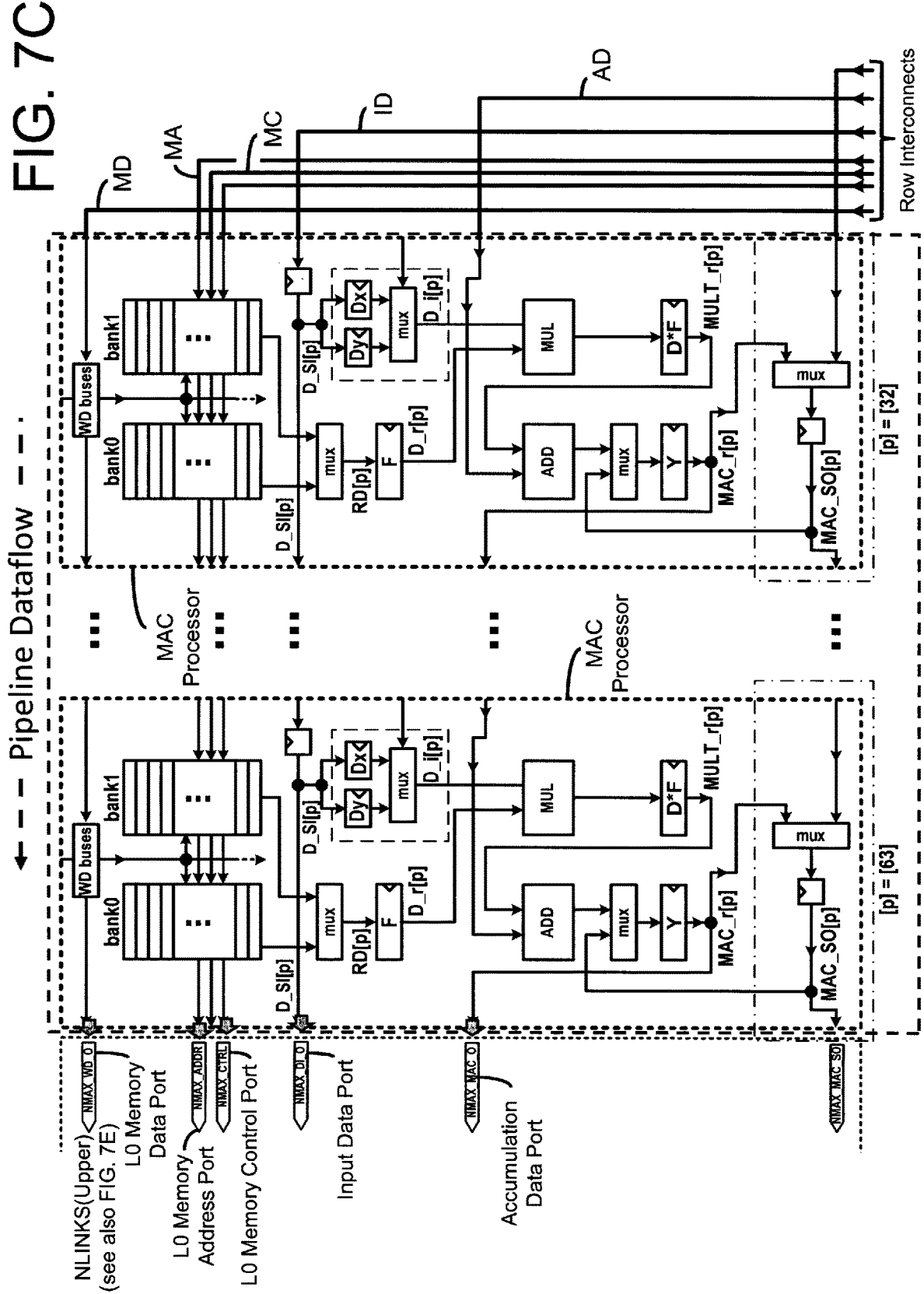
Figure 7D:
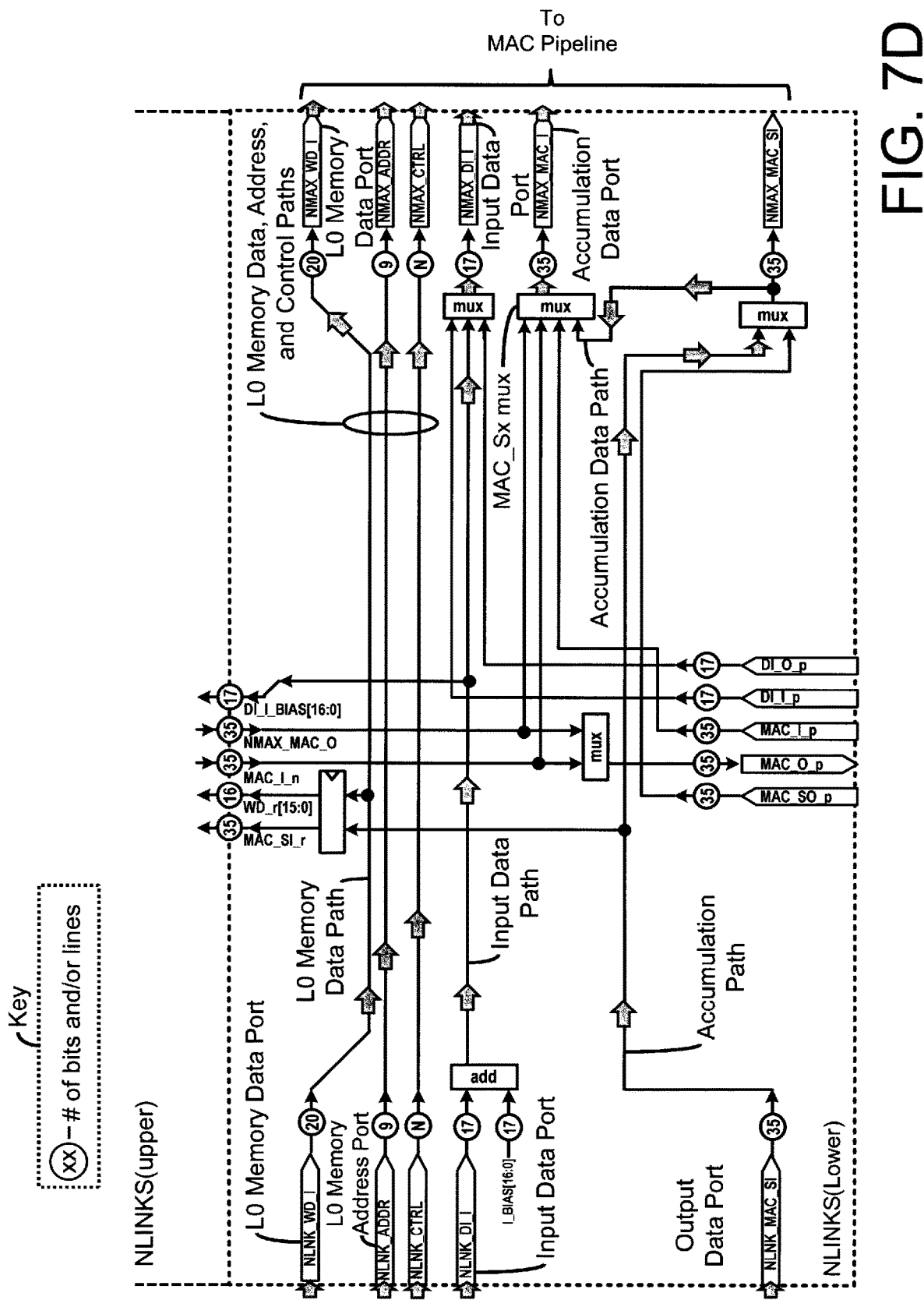
Figure 7E:
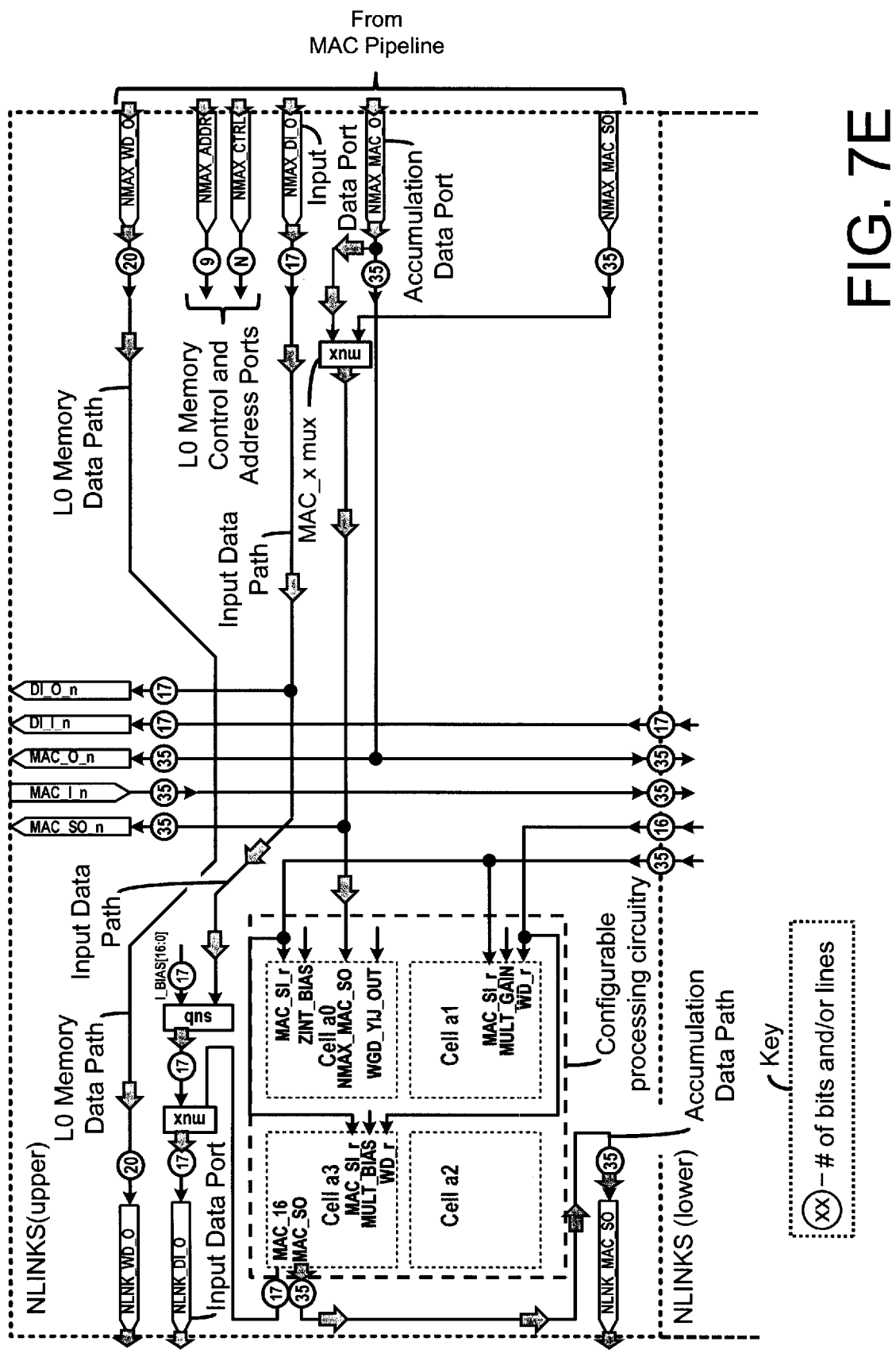
Figure 7F:
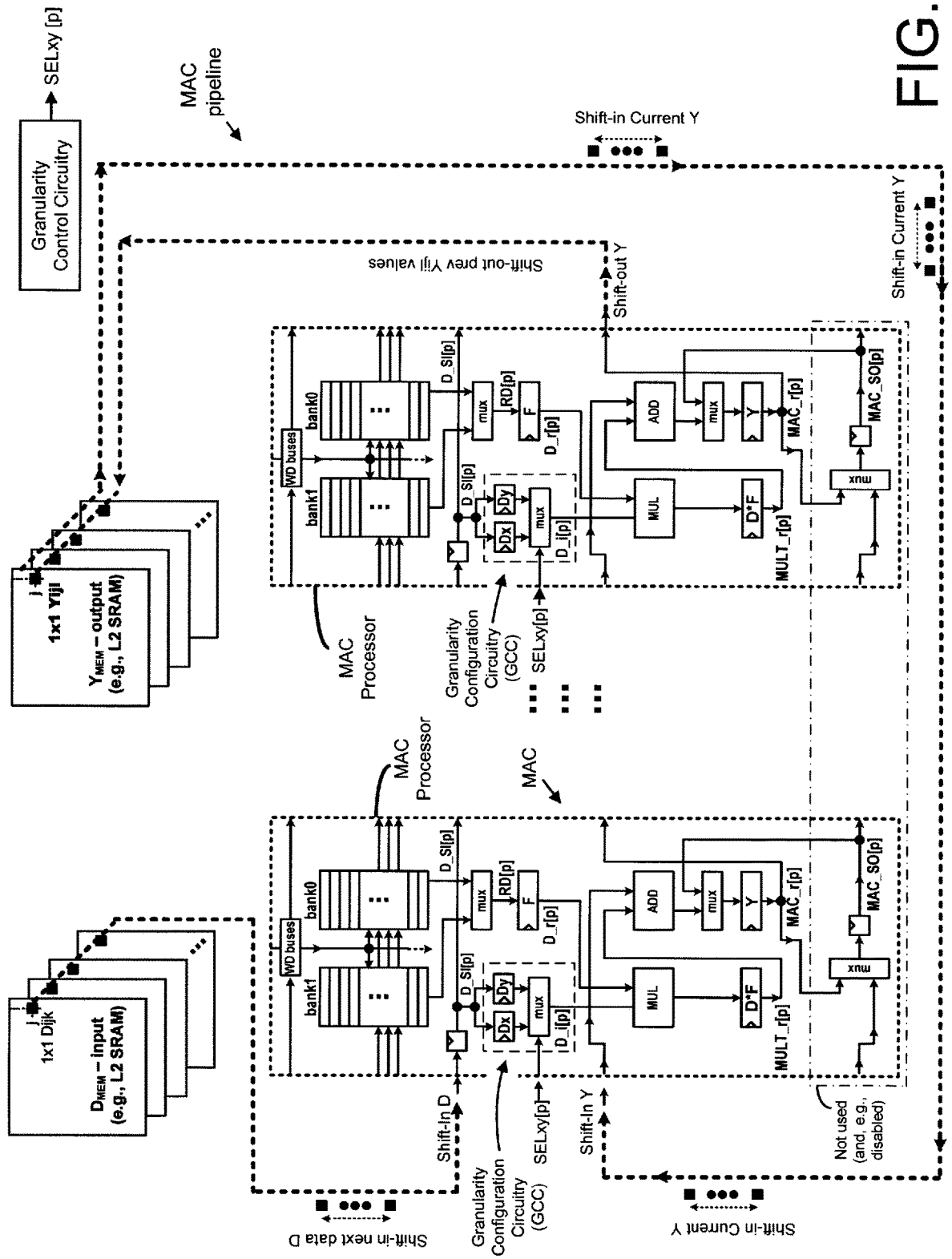
Figure 8A:
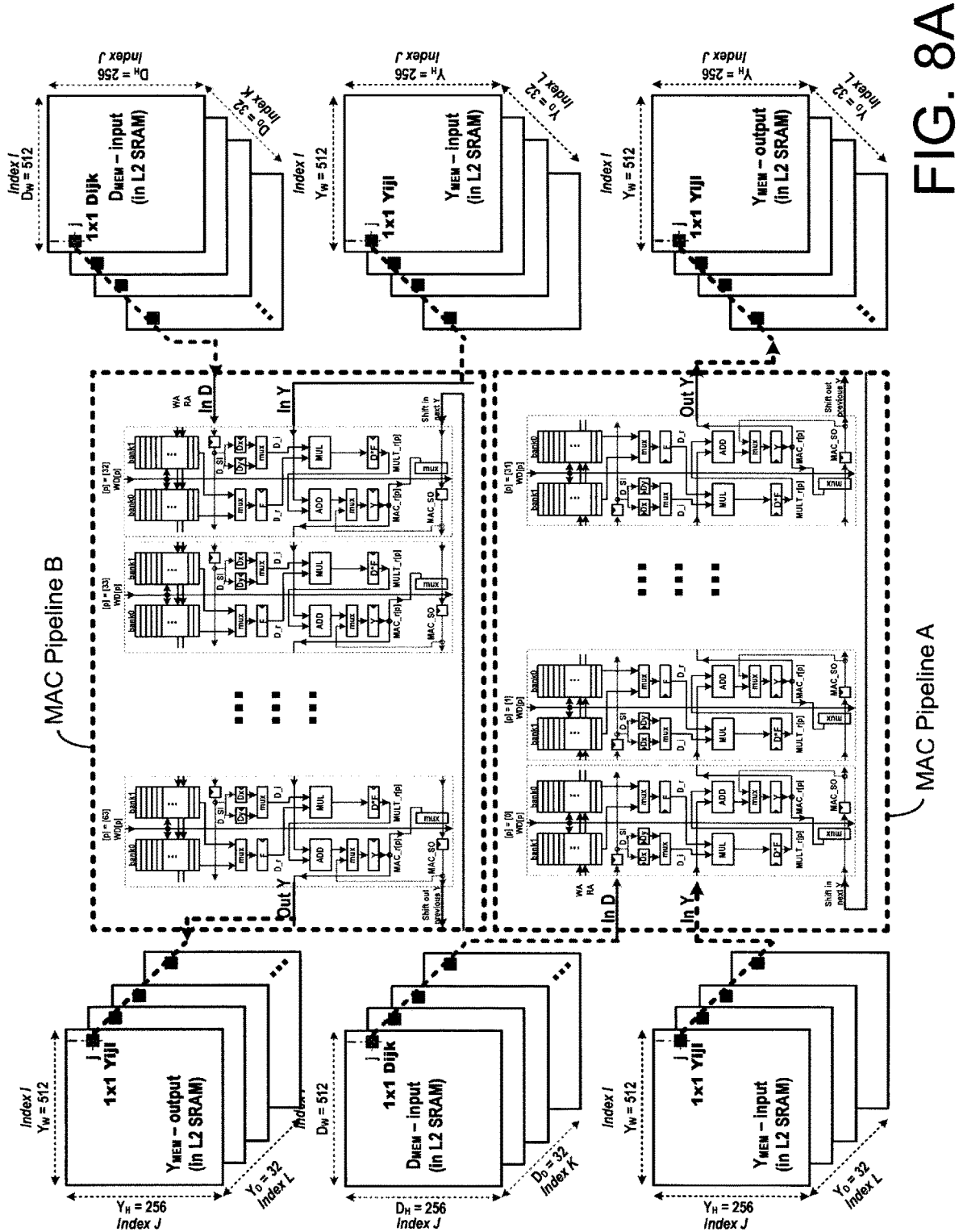
Figure 8B:
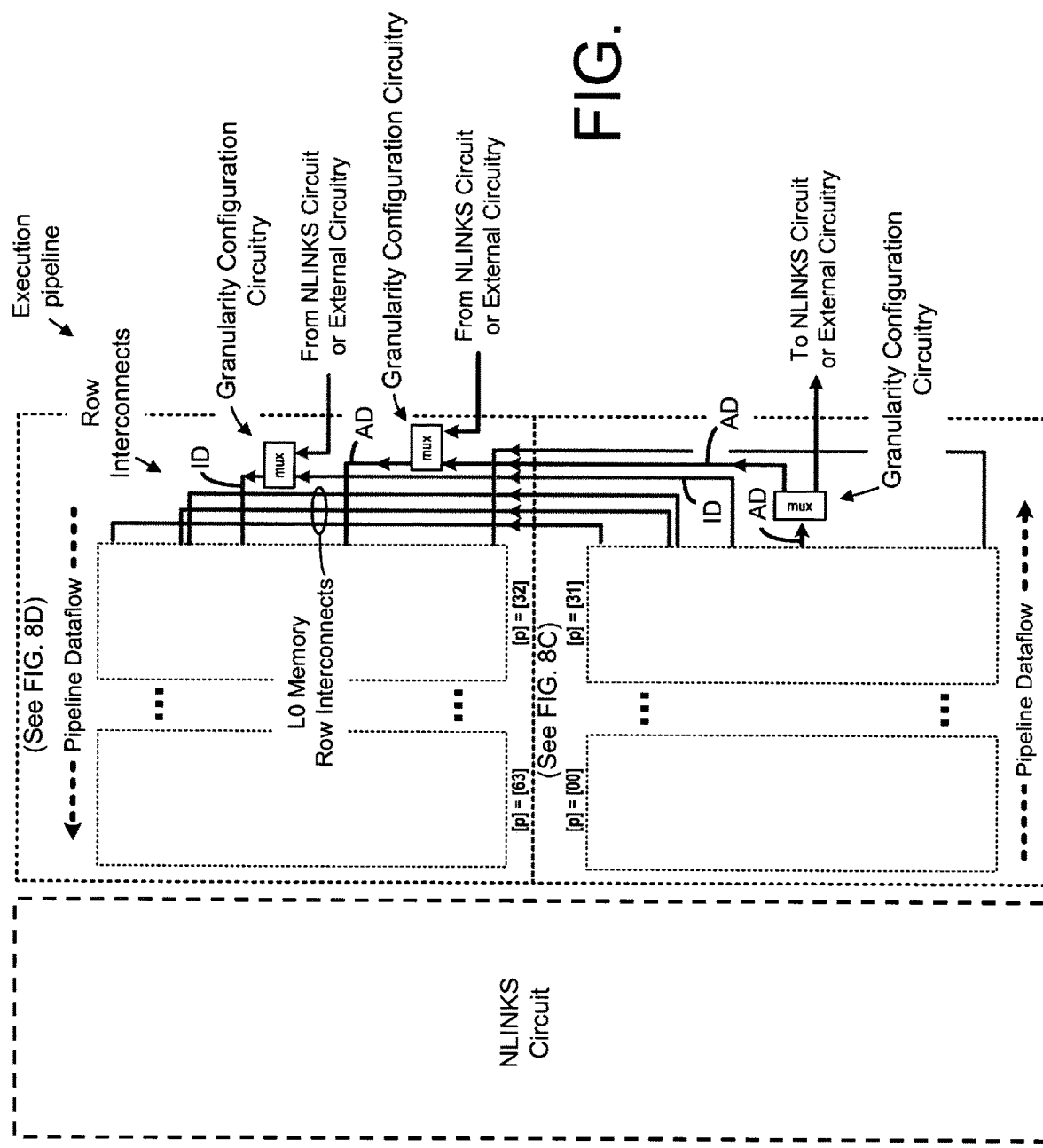
Figure 8C:
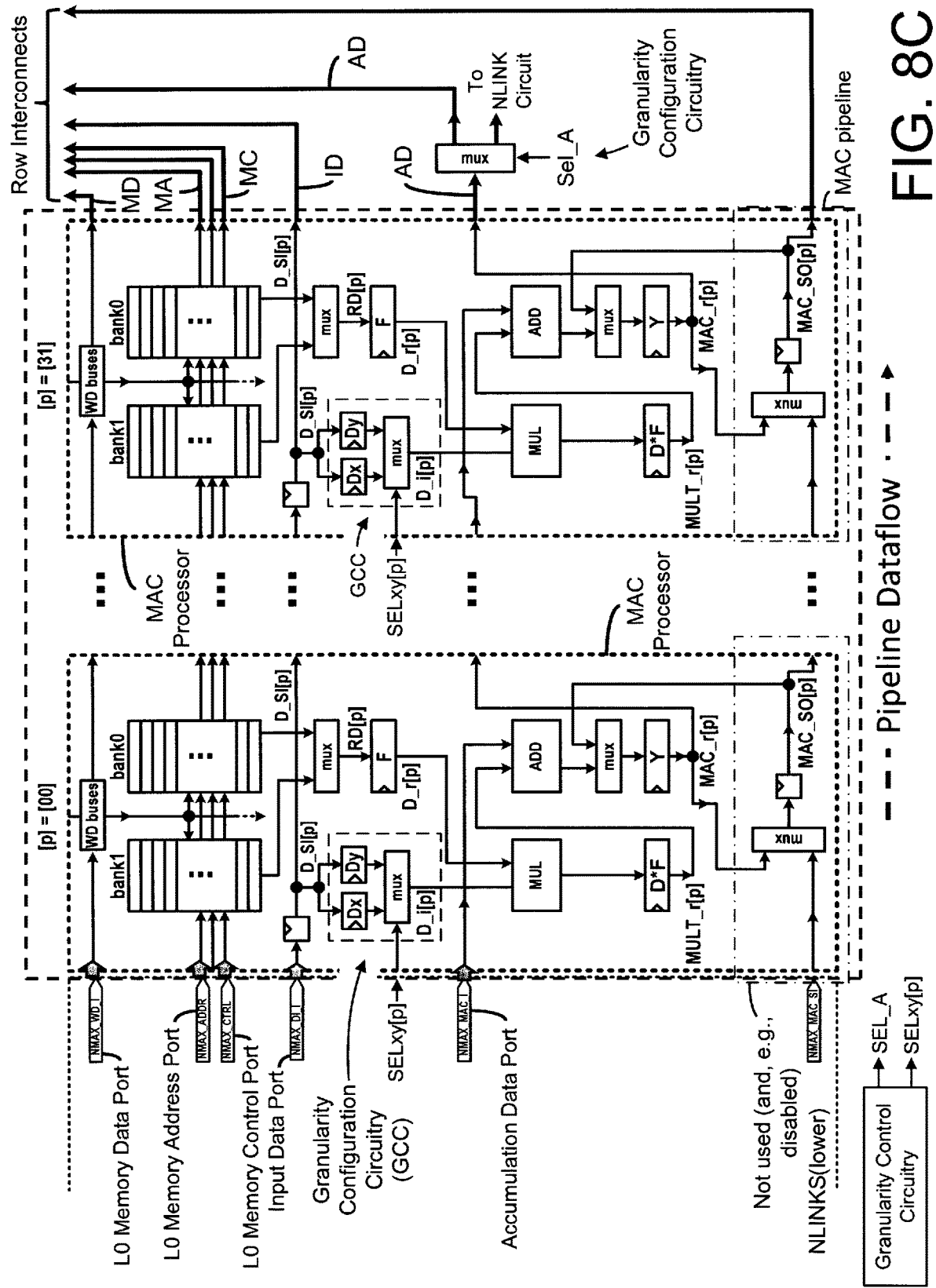
Figure 9:
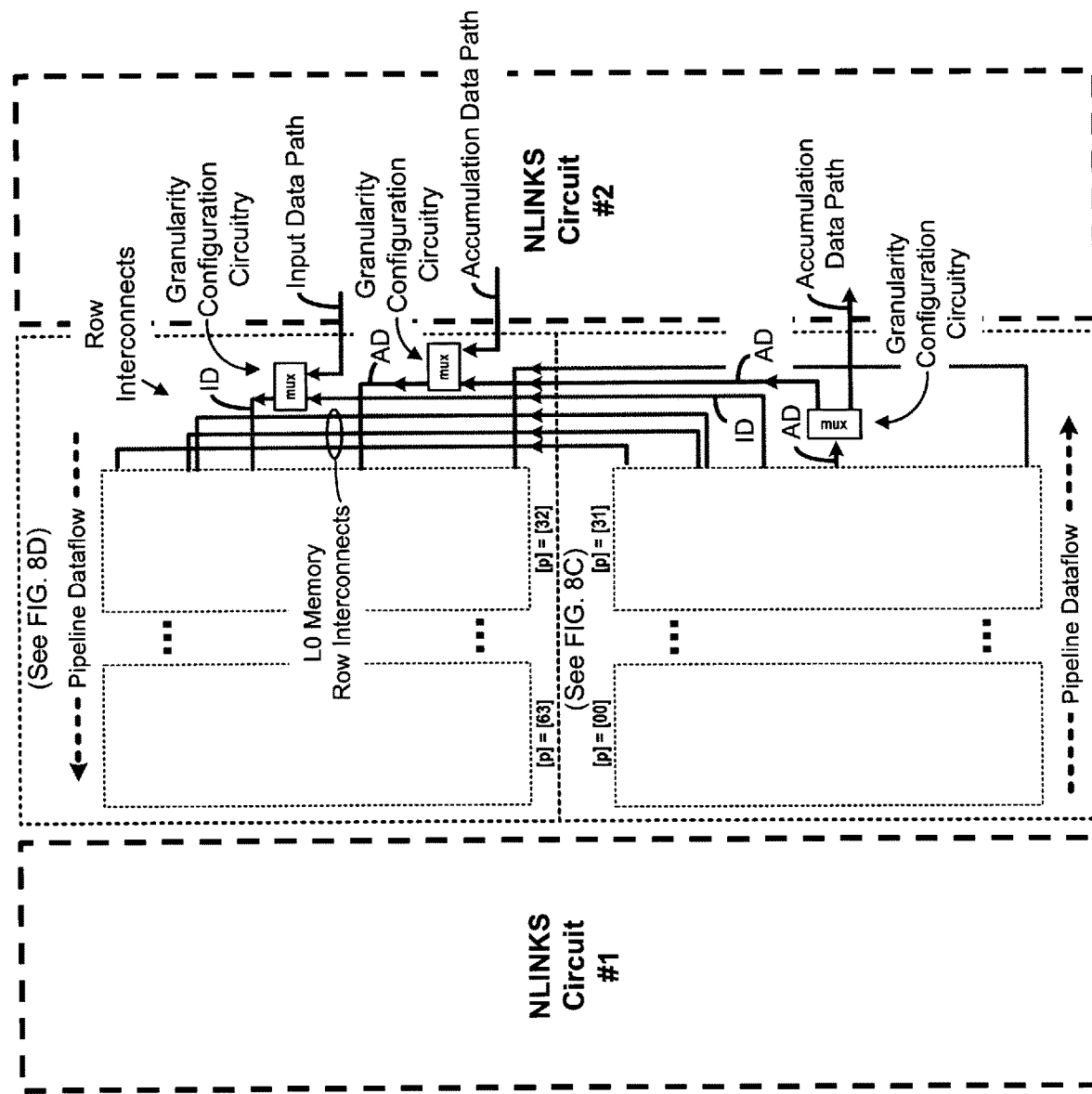
Figure 10:
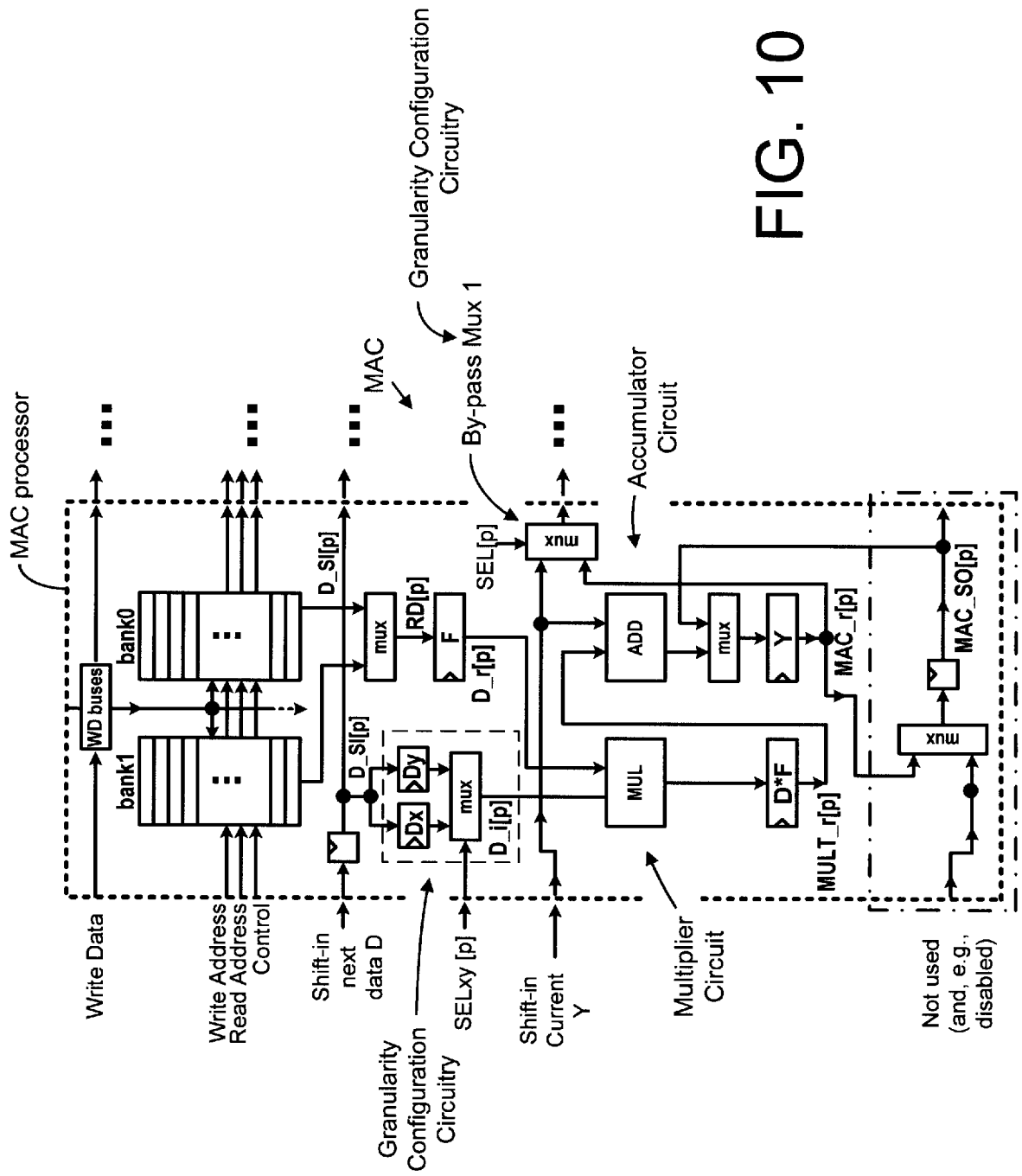
Figure 11A:
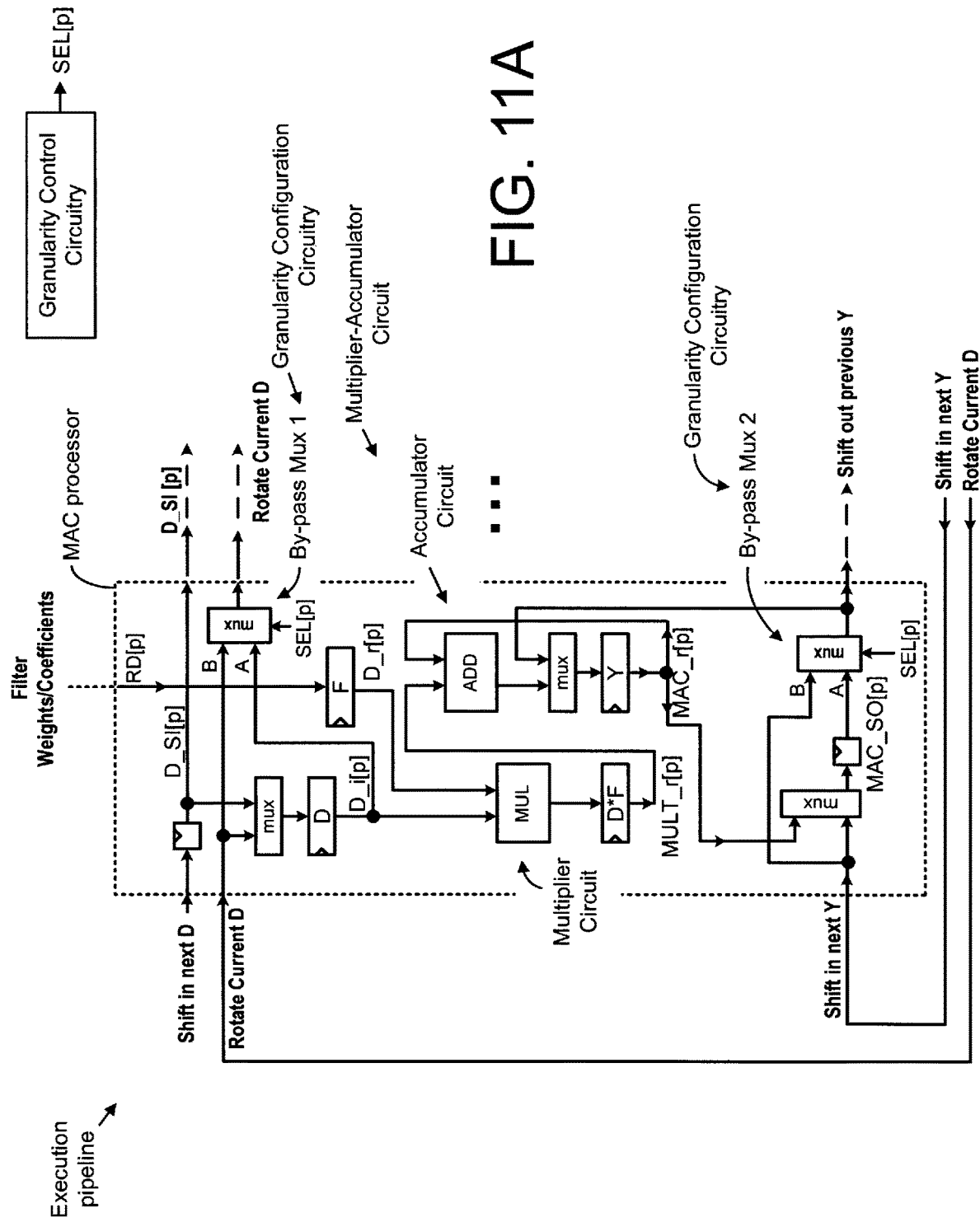
Figure 11B:
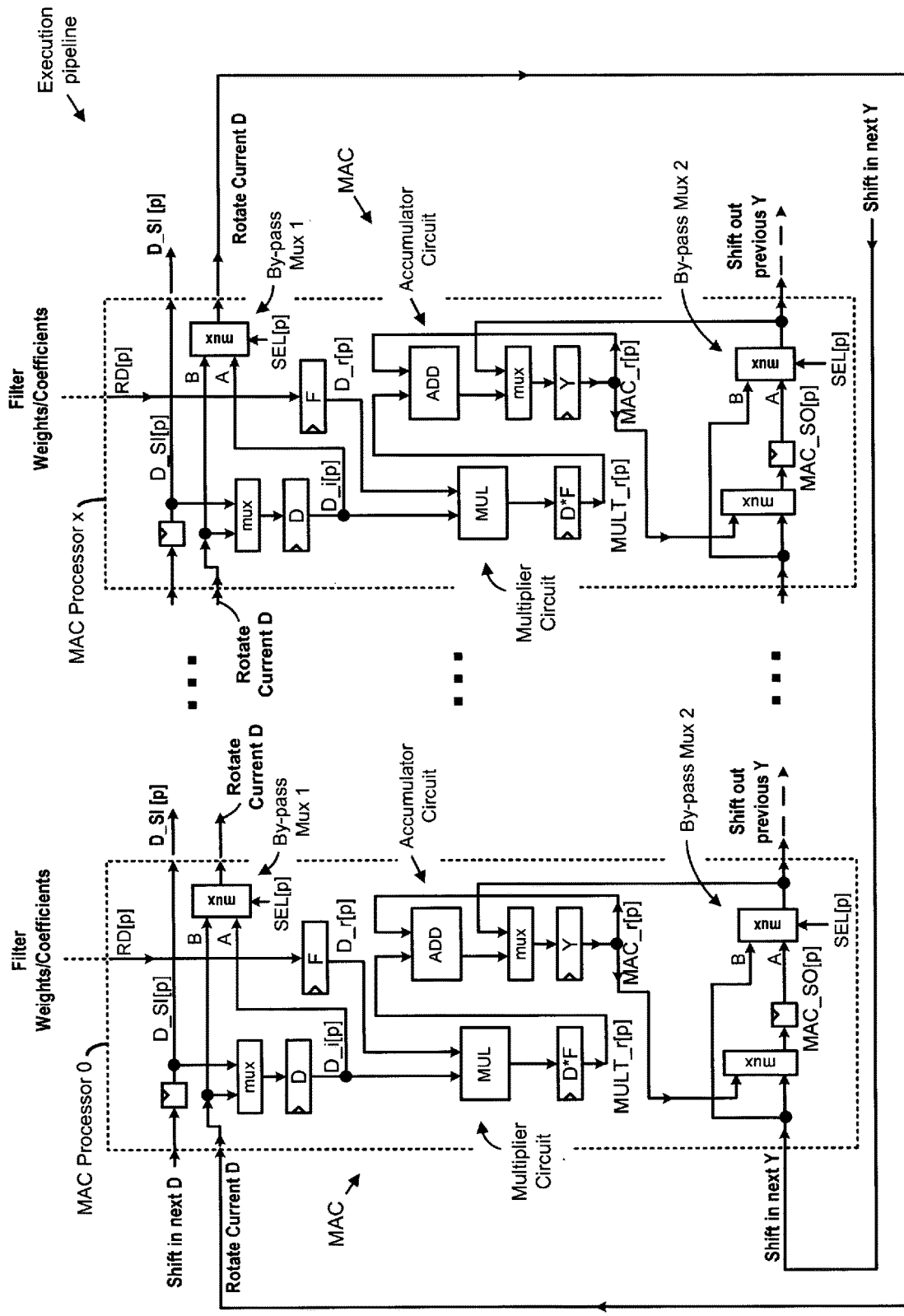

FIG. 1A illustrates a schematic block diagram of a logical overview of an exemplary multiplier-accumulator execution pipeline connected in a linear pipeline configuration, according to one or more aspects of the present inventions, wherein the multiplier-accumulator execution pipeline includes multiplier-accumulator circuitry ("MAC"), which is illustrated in block diagram form; notably, the multiplier-accumulator circuitry includes one or more of the multiplier-accumulator circuits (although the individual multiplier-accumulator circuits are not specifically illustrated here); notably, in this exemplary embodiment, "m" (e.g., 64 in the illustrative embodiment) multiplier-accumulator circuits are connected in a linear execution pipeline to operate concurrently whereby the processing circuits perform m×m (e.g., 64×64) multiply-accumulate operations in each m (e.g., 64) cycle interval (here, a cycle may be nominally 1 ns); notably, each m (e.g., 64) cycle interval processes a Dd/Yd (depth) column of input and output pixels/data at a particular (i,j) location (the indexes for the width Dw/Yw and height Dh/Yh dimensions of this exemplary embodiment—Dw=512, Dh=256, and Dd=128, and the Yw=512, Yh=256, and Yd=64) wherein the m (e.g., 64) cycle execution interval is repeated for each of the Dw*Dh depth columns for this stage; in addition, in one embodiment, the filter weights or weight data are loaded into memory (e.g., L1/L0 SRAM memories) before the multiplier-accumulator circuitry starts processing (see, e.g., the '345 and '306 applications);

FIG. 1B illustrates a schematic block diagram of an exemplary logical overview of an exemplary multiplier-accumulator execution or processing pipeline wherein each multiplier-accumulator circuit includes a multiplier circuit, according to one embodiment of the present inventions; in this exemplary embodiment, the multiplier-accumulator circuit may include a plurality of memory banks (e.g., SRAM memory banks) that are dedicated to the multiplier-accumulator circuit to store filter weights used by the multiplier circuit of the associated multiplier-accumulator circuit; in one illustrative embodiment, the MAC execution or processing pipeline includes 64 multiplier-accumulator circuits (see FIG. 1A); notably, in the logical overview of a linear pipeline configuration of this exemplary multiplier-accumulator execution or processing pipeline, a plurality of processing (MAC) circuits ("m") are connected in the execution pipeline and operate concurrently; for example, in one exemplary embodiment where m=64, the multiplier-accumulator processing circuits 64×64 multiply-accumulate operations in each 64 cycle interval; thereafter, next 64 input pixels/data are shifted-in and the previous output pixels/data are shifted-out during the same 64 cycle intervals; in one embodiment, each multiplier-accumulator circuit may include two dedicated memory banks to store at least two different sets of filter weights—each set of filter weights associated with and used in processing a set of data) wherein each memory bank may be alternately read for use in processing a given set of associated data and alternately written after processing the given set of associated data; the filter weights or weight data are loaded into memory (e.g., the L1/L0 SRAM memories) from, for example, an external memory or processor before the stage processing started (see, e.g., the '345 and '306 applications); notably, the multiplier-accumulator circuits and circuitry of the present inventions may be interconnected or implemented in one or more multiplier-accumulator execution or processing pipelines including, for example, execution or processing pipelines as described and/or illustrated in U.S. Non-Provisional application Ser. No. 17/212,411 and U.S. Provisional Application No. 63/012,111; as noted above, the '411 and '111 applications are incorporated by reference herein in their entirety;

FIG. 1C illustrates schematic block diagrams of an exemplary multiplier-accumulator execution or processing pipelines including a plurality of serially connected MACs wherein the output of each accumulator circuit ("ADD") of the MACs is coupled to the input of the immediately following accumulator circuit ("ADD") of the MACs of the linear processing pipeline wherein, in this way, accumulation values ("Y") generated by the MACs (see, MAC_r[p]) are rotated, transferred or moved (e.g., before, during or at the completion of each execution cycle of the execution sequence (i.e., set of associated execution cycles)) through the plurality of serially connected MACs of the pipeline such that each accumulation value (see, MAC_r[p]—"Rotate current Y") generated by a MAC is output before, during or at the completion of each execution cycle to the immediately following MAC of the linear pipeline and employed in the accumulation operation of the accumulator circuit ("ADD") of that immediately following MAC, according to one or more aspects of the present inventions; notably, each MAC includes a multiplier circuit ("MUL") to perform/implement the multiply operations and accumulator circuit ("ADD") to perform/implement the accumulate operations, according to one or more aspects of the present inventions; in this exemplary embodiment, MAC processor may include or read from one memory bank (see FIG. 1C) or more than one memory bank (e.g., two SRAM memory banks—see FIG. 1B) that may be dedicated to the MAC of the MAC processing circuit to store filter weights used by the multiplier circuit of the associated MAC; as noted above, the individual MACs may, at times, be referred to herein as "MAC processors" or "MAC processing circuits"; notably, the linear processing pipeline, and the MACs that are incorporated in such pipeline, may be configured to rotate, transfer or move (before, during or at the completion of an execution cycle) the input data values (rather than the accumulation values—which are maintained, stored or held, in the particular MAC during each execution cycle of the execution sequence), as described and illustrated in U.S. Provisional Patent Application No. 63/156,263 "MAC Processing Pipelines, Circuitry to Configure Same, and Methods of Operating Same", filed Mar. 3, 2021; the '263 application is incorporated by reference herein in its entirety; here, in operation, after input or loading of the initial data input values into the MACs of the linear MAC processing pipeline, the input data values are rotated, transferred or moved, on a cycle-by-cycle basis, from one MAC of the linear pipeline to the immediately following MAC of the pipeline and employed in the multiply operation of the multiplier circuit of that next MAC of the processing pipeline as described and/or illustrated in the '263 application;

FIG. 1D illustrates a high-level block diagram layout of an integrated circuit or a portion of an integrated circuit (which may be referred to, at times, as an X1 component) including a plurality of multi-bit MAC execution pipelines having a plurality of multiplier-accumulator circuits each of which implement multiply and accumulate operations, according to certain aspects of the present inventions; the multi-bit MAC execution pipelines and/or the plurality of multiplier-accumulator circuits may be configured to implement one or more processing architectures or techniques (singly or in combination with one or more X1 components); in this illustrative embodiment, the multi-bit MAC execution pipelines are organized into clusters (in this illustrative embodiment, four clusters wherein each cluster includes a plurality of multi-bit MAC execution pipelines (in this illustrative embodiment each cluster includes 16, 64-MAC execution pipelines (which may also be individually referred to below as MAC processors)); in one embodiment, the plurality of multiplier-accumulator circuitry are configurable or programmable (one-time or multiple times, e.g., at start-up and/or in situ) to implement one or more pipelining processing architectures or techniques (see, e.g., the expanded view of a portion of the high-level block diagram of FIG. 1B in the lower right is a single MAC execution pipeline (in the illustrative embodiment, including, e.g., 64 multiplier-accumulator circuits or MAC processors) which correlates to the schematic block diagram of a logical overview of an exemplary multiplier-accumulator circuitry arranged in a linear execution pipeline configuration—see FIG. 1A); the processing component in this illustrative embodiment includes memory (e.g., L2 memory, L1 memory and L0 memory (e.g., SRAM)), a bus interfaces (e.g., a PHY and/or GPIO) to facilitate communication with circuitry external to the component and memory (e.g., SRAM and DRAM) for storage and use by the circuitry of the component, and a plurality of switches/multiplexers which are electrically interconnected to form a switch interconnect network "Network-on-Chip" ("NOC") to facilitate interconnecting the clusters of multiplier-accumulator circuits of the MAC execution pipelines; in one embodiment, the NOC includes a switch interconnect network (e.g., a mixed-mode interconnect network (i.e., a hierarchical switch matrix interconnect network and a mesh, torus or the like interconnect network (hereinafter collectively "mesh network" or "mesh interconnect network")), associated data storage elements, input pins and/or look-up tables (LUTs) that, when programmed, determine the operation of the switches/multiplexers; in one embodiment, one or more (or all) of the clusters includes one or more computing elements (e.g., a plurality of multiplier-accumulator circuitry—labeled as "NMAX Rows"—see, e.g., the '345 and '306 applications); notably, in one embodiment, each MAC execution pipeline (which, in one embodiment, consists of a plurality of serially interconnected multiplier-accumulator circuits) is connected to an associated L0 memory (e.g., SRAM memory) that is dedicated to that processing pipeline; the associated L0 memory stores filter weights used by the multiplier circuit of each multiplier-accumulator circuit of that particular MAC processing pipeline in performance of the multiply operations, wherein each MAC processing pipeline of a given cluster is connected to an associated L0 memory (which, in one embodiment, is dedicated to the multiplier-accumulator circuits of that MAC processing pipeline); a plurality (e.g., 16) MAC execution pipelines of a MAC cluster (and, in particular, the L0 memory of each MAC execution pipeline of the cluster) is coupled to an associated L1 memory (e.g., SRAM memory); here, the associated L1 memory is connected to and shared by each of the MAC execution pipelines of the cluster to receive filter weights to be stored in the L0 memory associated with each MAC execution pipeline of the cluster; in one embodiment, the associated L1 memory is assigned and dedicated to the plurality of pipelines of the MAC cluster; notably, the shift-in and shift-out paths of each 64-MAC execution pipeline is coupled to L2 memory (e.g., SRAM memory) wherein the L2 memory also couples to the L1 memory and L0 memory; the NOC couples the L2 memory to the PHY (physical interface) which may connect to L3 memory (e.g., external DRAM); the NOC also couples to a PCIe or PHY which, in turn, may provide interconnection to or communication with circuitry external to the X1 processing component (e.g., an external processor, such as a host processor); the NOC, in one embodiment, may also connect a plurality of X1 components (e.g., via GPIO input/output PHYs) which allow multiple X1 components to process related data (e.g., image data), as discussed herein, in accordance with one or more aspects of the present inventions;

FIG. 2A illustrates a schematic block diagram of an exemplary circuit, connected to multiplier-accumulator circuitry, to configure and control the multiplier-accumulator circuitry (which includes a plurality of MACs interconnected in a serial/linear pipeline (in this illustrative embodiment, 64 MACs, multiplier-accumulator circuits or MAC processors)), according to aspects of the present inventions; in one embodiment, the circuit (referred to, at times, as "control/configure circuit", "NLINKS", or "NLINKS circuit") is associated with and dedicated to interface with a plurality of interconnected (e.g., serially) multiplier-accumulator circuits and/or one or more rows of interconnected (e.g., serially) multiplier-accumulator circuits; in one embodiment, an integrated circuit having one or more control/configure circuits interfaces with a plurality of multi-bit MAC execution pipelines, each pipeline including a plurality of interconnected (e.g., serially) multiplier-accumulator circuits (see, e.g., FIG. 1D), wherein each control/configure circuit controls one of the plurality of multi-bit MAC execution pipelines, according to certain aspects of the present inventions; in this illustrative embodiment (implementing one exemplary processing pipeline embodiment), (i) the L0 memory control, address and data signal paths in the NLINKS circuit provide control, address and data signals, generated by logic circuitry (not illustrated), to the L0 memory in each MAC of the pipeline to manage or control memory operation during the execution sequence(s), (ii) the input data signal path in the NLINKS circuit and MAC execution pipeline of this embodiment denotes the signal path of the input data to be processed, via the MACs, during the execution sequence(s), (iii) the accumulation data path in the NLINKS circuit and execution pipeline of this embodiment denotes the ongoing/accumulating MAC accumulation totals generated by the MACs during the execution sequence(s), and (iv) the output data path in the NLINKS circuit and MAC execution pipeline of this embodiment denotes the output data generated by execution sequence(s) (i.e., input data that was processed via the multiplier-accumulator circuits or MAC processors of the execution pipeline); the "row interconnects" connect two rows of serially connected MACs to form or provide one linear MAC pipeline wherein the signal lines: "OD" denotes the output data path, "AD" denotes the accumulation data path, "ID" denotes the input data path, "MC" denotes L0 memory control path, "MA" denotes L0 memory address path, and "MD" denotes L0 memory address path; the circle with a number therein located in each data path indicates the number of bits and/or conductors or lines (e.g., data or control) of the particular path or port—see the Inset; for the avoidance of doubt, the block/data width, data path and/or port width set forth therein are merely exemplary and not limiting in any respect; notably, a "port" is a physical point of entry to/exit from the control/configure or NLINKS circuit; all physical forms of entry to or exit from the control/configure or NLINKS circuit are intended to fall within the scope of the present inventions (for example, a conductor or metal routing in/of an integrated circuit);

FIG. 2B illustrates the schematic block diagram of the exemplary embodiment of a MAC execution or processing pipeline illustrated in FIG. 2A;

FIGS. 2C-2F illustrate selected/specific portions, as indicated in FIG. 2A, of the schematic block diagram of the exemplary control/configure circuit and multiplier-accumulator circuitry (e.g., a plurality of MACs serially connected into a linear MAC processing pipeline) of FIG. 2A, in accordance with an embodiment of certain aspects of the present inventions; the insets in FIGS. 2C and 2D provide a general key of the (i) input data flow in the one MAC pipeline and one associated NLINKS circuit (("Shift of data input DI_x within single pipeline" refers to the path of the input data), (ii) the multiply and accumulate operation flow in one the MAC pipeline and one associated NLINKS circuit ("Shift MAC_x within single pipeline" refers to the path of the accumulation data of the multiply-accumulate operation), and (iii) the output data flow of the accumulation operation with prior results in one MAC pipeline in connection with associated NLINKS circuit ("Shift MAC_Sx within single pipeline" refers to the output data path corresponding to the accumulation operation with prior results)); as mentioned above, the "row interconnects" connect the two rows of serially connected MACs (to form one linear MAC pipeline (comprised of the MACs of the two serially connected rows of MACs) having "n" MAC circuits, wherein in this illustrative embodiment, n=64); the signal lines of the row interconnects include: "OD" denotes the output data path, "AD" denotes the accumulation data path, "ID" denotes the input data path, "MC" denotes L0 memory control path, "MA" denotes L0 memory address path, and "MD" denotes L0 memory address path; the circle with a number therein located in each data path indicates the number of bits and/or conductors or lines (e.g., data or control) of the particular path or port—see the "key" in the FIGS. 2C and 2D; for the avoidance of doubt, the block/data width, data path and/or port width set forth are merely exemplary and not limiting in any respect; the inset in FIGS. 2C and 2D provides a general key of the data flow in a single pipeline ("shift of data input DI_x within single pipeline"), the multiply-accumulate operation (multiply and accumulate operation flow in a single pipeline ("shift MAC_x within single pipeline"), and the accumulation operation with prior results ("shift MAC_Sx within single pipeline"); again, a "port" is a physical point of entry to/exit from the control/configure or NLINKS circuit; all physical forms of entry to or exit from the control/configure or NLINKS circuit are intended to fall within the scope of the present inventions (for example, a conductor or metal routing in/of an integrated circuit);

FIG. 3 illustrates a schematic block diagram of an exemplary embodiment of (i) a MAC pipeline, including granularity configuration circuitry to configure and/or control a plurality of interconnected (in series) multiplier-accumulator circuits or rows/banks of interconnected (in series) multiplier-accumulator circuits to pipeline multiply and accumulate operations (e.g., in a linear pipeline architecture) and generate and output a plurality of m×n image data/pixels, and (ii) granularity control circuitry (coupled to configuration memory which stores data which is representative of one or more available granularity settings for the processing and/or output of the MAC pipeline), in accordance with an embodiment of certain aspects of the present inventions; here, the granularity configuration circuitry may configure or provide an associated MAC pipeline (e.g., linear pipeline) to provide a predetermined m×n data/pixels granularity format (e.g., where n equals m: 16×16, 32×32, 48×48, etc.; where n does not equal m: 16×32, 16×64, 32×16, 32×64, 64×32, etc.); in one embodiment, the configuration memory (e.g., a configuration register) may store granularity configuration data, including the granularity of the image processing of, for example, the MAC pipeline; such configuration memory may be programmed at or during power-up, start-up, initialization, re-initialization and/or in situ;

FIG. 4A illustrates a schematic block diagram of an exemplary logical overview of an exemplary multiplier-accumulator circuit including a multiplier circuit ("MUL") performing multiplication operations and an accumulator circuit ("ADD") performing addition or accumulation operations, and granularity configuration circuitry, including one or more by-pass multiplexers ("By-pass Mux") located in the multiply and/or accumulation path of the multiplier-accumulator circuit to facilitate programming, configuring and/or providing a predetermined granularity of the associated multiplier-accumulator circuit, according to one embodiment of the present inventions; notably, in one embodiment, granularity control circuitry may program the by-pass multiplexer(s) to (i) include/incorporate multiply-accumulator circuit(s), associated therewith, into the multiply and accumulation operations of the MAC pipeline or (ii) by-pass or eliminate/remove multiply-accumulator circuit(s), associated therewith, from the multiply and accumulation operations of the MAC pipeline;

FIG. 4B illustrates a schematic block diagram of an exemplary logical overview of an exemplary multiplier-accumulator processing pipeline wherein each multiplier-accumulator circuit includes granularity configuration circuitry, including one or more by-pass multiplexers ("By-pass Mux") located in the multiply and/or accumulation path to facilitate programming, configuring and/or providing a predetermined granularity of the MAC pipeline (e.g., linear pipeline), in accordance with an embodiment of certain aspects of the present inventions; in one illustrative embodiment, the MAC execution or processing pipeline includes 64 multiplier-accumulator circuits; notably, in the logical overview of a linear pipeline configuration of this exemplary multiplier-accumulator execution or processing pipeline, a plurality of MAC processors ("x") are connected in the execution pipeline and operate concurrently; the granularity configuration circuitry programs, configures and/or controls a plurality of separate multiplier-accumulator circuits or rows/banks of interconnected (in series) multiplier-accumulator circuits to pipeline multiply and accumulate operations (e.g., in a linear pipeline architecture) and generate and output a plurality of m×n image data/pixels; the granularity configuration circuitry may, in response to the granularity control circuitry (not illustrated here), configure and/or re-configure the granularity of the MAC processing pipeline, for example, in situ (i.e., during normal operation of the integrated circuit) and/or at or during power-up, start-up, initialization, re-initialization, configuration, re-configuration or the like;

FIG. 4C illustrates a schematic block diagram of an exemplary logical overview of an exemplary multiplier-accumulator processing pipeline wherein every even numbered MAC processor includes granularity configuration circuitry, including one or more by-pass multiplexers ("By-pass Mux"—see FIG. 4A) located in the multiply and/or accumulation path of the multiplier-accumulator circuit to facilitate programming, configuring and/or providing a predetermined granularity of the MAC pipeline (e.g., linear pipeline), in accordance with an embodiment of certain aspects of the present inventions;

FIG. 4D illustrates a schematic block diagram of a logical overview of an exemplary multiplier-accumulator execution pipeline (including 64 multiplier-accumulator circuits) connected in a linear pipeline configuration wherein every even numbered MAC processor includes granularity configuration circuitry, including one or more by-pass multiplexers ("By-pass Mux"—see FIG. 4A) located in the multiply and/or accumulation path of the multiplier-accumulator circuit, as illustrated in FIG. 4C, to facilitate programming, configuring and/or providing a predetermined granularity of the MAC pipeline (e.g., linear pipeline), according to one or more aspects of the present inventions; notably, in this exemplary embodiment, "x" is 64 such that the pipeline includes 64 multiplier-accumulator circuits, connected in a linear execution pipeline, wherein granularity configuration circuitry configures the pipeline, via enabling the By-pass Mux in the even numbered MAC processors, to perform 32×32 multiply-accumulate operations;

FIG. 5A illustrates a schematic block diagram of an exemplary logical overview of an exemplary multiplier-accumulator circuit including a multiplier circuit ("MUL") performing multiply operation and an accumulator circuit ("ADD") performing addition or accumulation operations, and granularity configuration circuitry, including Dx/Dy registers and multiplexer circuit located at/in the input of the multiply and/or accumulation path of the multiplier-accumulator circuit to facilitate programming, configuring and/or providing a predetermined granularity of the associated multiplier-accumulator circuit, according to one embodiment of the present inventions; a plurality of control signals (not illustrated) are employed to parallel-load the Dx and Dy registers selectively from the input shift path D_S[p] and a multiplexer select signal controls the multiplexer to selectively input the data (see D_i[p]) into the multiplier-accumulator circuit;

FIG. 5B illustrates a schematic block diagram of an exemplary logical overview of an exemplary multiplier-accumulator processing pipeline wherein each multiplier-accumulator circuit includes granularity configuration circuitry, including Dx/Dy registers and multiplexer circuit located at/in the multiply and/or accumulation path to facilitate programming, configuring and/or providing a predetermined granularity of the MAC pipeline (e.g., linear pipeline), in accordance with an embodiment of certain aspects of the present inventions; in one illustrative embodiment, the MAC execution or processing pipeline includes 64 multiplier-accumulator circuits; notably, in the logical overview of a linear pipeline configuration of this exemplary multiplier-accumulator execution or processing pipeline, a plurality of MAC processors ("x") are connected in the execution pipeline and operate concurrently; the granularity configuration circuitry programs, configures and/or controls a plurality of separate multiplier-accumulator circuits or rows/banks of interconnected (in series) multiplier-accumulator circuits to pipeline multiply and accumulate operations (e.g., in a linear pipeline architecture) and generate and output a plurality of m×n image data/pixels; the granularity configuration circuitry may, in response to the granularity control circuitry (not illustrated here), configure and/or re-configure the granularity of the MAC processing pipeline, for example, in situ (i.e., during normal operation of the integrated circuit) and/or at or during power-up, start-up, initialization, re-initialization, configuration, re-configuration or the like;

FIG. 6A illustrates a schematic block diagram of an exemplary logical overview of an exemplary multiplier-accumulator processing pipeline, including four (4) MAC processors (each having a multiplier-accumulator circuit) connected to memory, wherein every even numbered MAC processor includes granularity configuration circuitry, including Dx/Dy registers and multiplexer circuit located at/in the input of the multiplier-accumulator circuit to facilitate programming, configuring and/or providing a predetermined granularity of the MAC pipeline (e.g., linear pipeline), in accordance with an embodiment of certain aspects of the present inventions;

FIG. 6B illustrates a pseudo timing diagram of the exemplary four processor pipeline illustrated in FIG. 6A, according to certain aspects of the present inventions, in conjunction with sequencing of the Dx/Dy input data registers and other processing of each of the MAC processors;

Figure 7A:
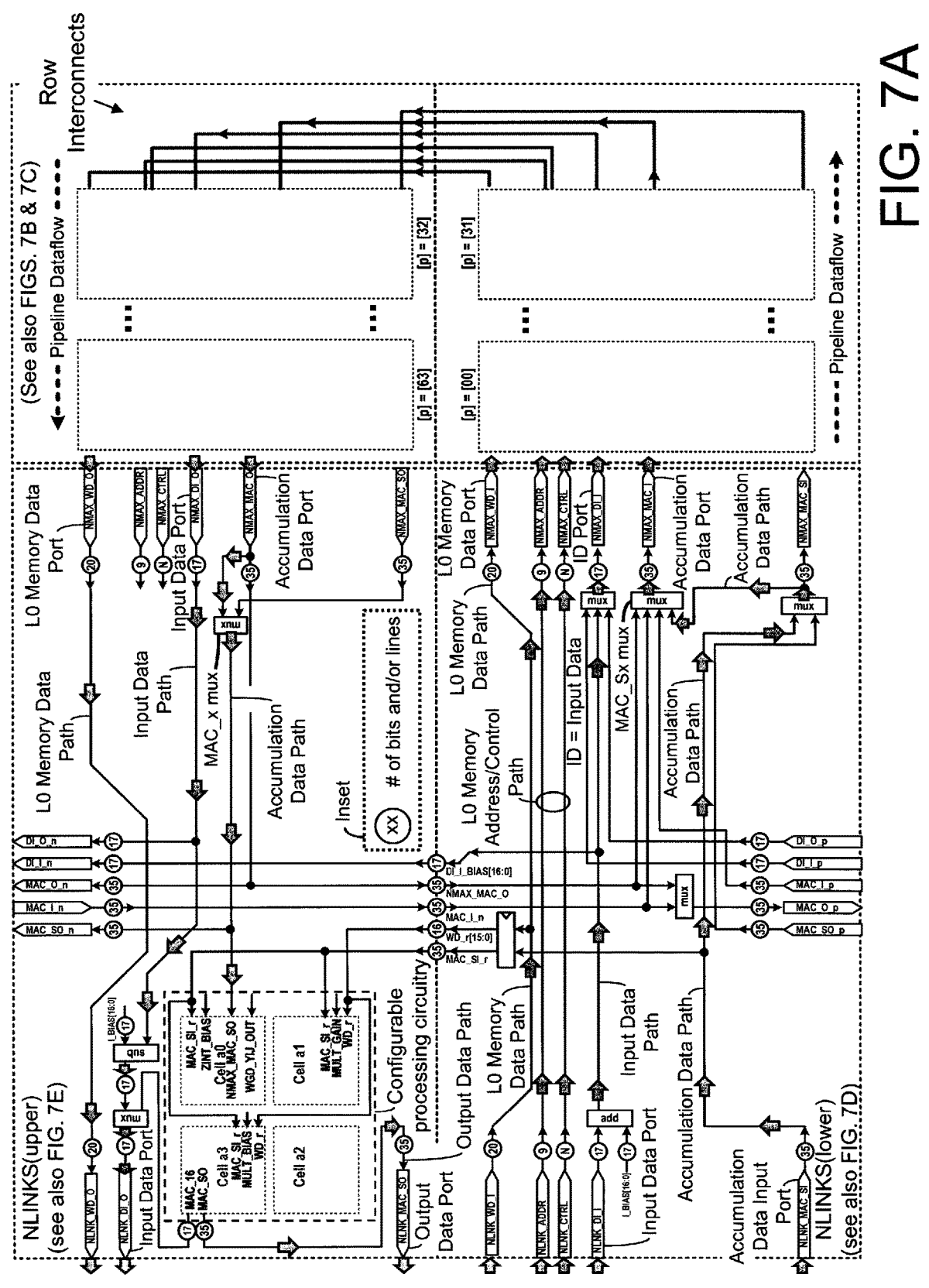

FIG. 7A illustrates a schematic block diagram of an exemplary control/configure or NLINKS circuit connected to multiplier-accumulator circuitry (which includes a plurality of MAC processors (not illustrated in detail—but including 64 MAC processors having the architecture of FIG. 5A wherein the granularity configuration circuitry includes the Dx/Dy registers—multiplexer circuit located at/in the input of the multiplier-accumulator circuit), according to aspects of the present inventions; in one embodiment, the control/configure circuit is associated with and dedicated to interface with the plurality of multiplier-accumulator circuits and/or one or more rows of interconnected (e.g., serially) multiplier-accumulator circuits; wherein the integrated circuit includes a plurality of multi-bit MAC execution pipelines, each pipeline including a plurality of interconnected (e.g., serially) multiplier-accumulator circuits (see FIG. 1B), the control/configure circuitry includes a plurality of control/configure circuits, each circuit to control one of the plurality of multi-bit MAC execution pipelines, according to certain aspects of the present inventions; in this illustrative embodiment, (i) the L0 memory control, address and data signal paths in the NLINKS circuit provide control, address and data signals, generated by logic circuitry (not illustrated), to the L0 memory in each MAC of the pipeline to manage or control memory operation during the execution sequence(s), (ii) the input data signal path in the NLINKS circuit and MAC execution pipeline of this embodiment denotes the signal path of the input data to be processed, via the MACs, during the execution sequence(s), and (iii) the accumulation data path in the NLINKS circuit and execution pipeline of this embodiment denotes the ongoing/accumulating MAC accumulation totals generated by the MACs during the execution sequence(s)—which are routed through the multiplexers MAC_x mux and MAC_Sx mux; notably, multiplexer MAC_Sx mux and MAC_x mux may be incorporated in other locations in the control/configure circuit or NLINKS circuit;

FIGS. 7B and 7C illustrate schematic block diagrams of the exemplary embodiment of the MAC execution pipeline, illustrated in FIG. 7A, having a plurality of MAC processors (in this illustrative embodiment, 64 MAC processors) having the architecture of FIG. 5A wherein the granularity configuration circuitry includes the Dx/Dy registers—multiplexer circuit located at/in the input of the multiplier-accumulator circuit), according to aspects of the present inventions; the "row interconnects" connect two rows of serially connected MACs to form or provide one linear MAC pipeline wherein the signal lines: "AD" denotes the accumulation data path, "ID" denotes the input data path, "MC" denotes L0 memory control path, "MA" denotes L0 memory address path, and "MD" denotes L0 memory address path; the circle with a number therein located in each data path indicates the number of bits and/or conductors or lines (e.g., data or control) of the particular path or port—see the Inset; for the avoidance of doubt, the block/data width, data path and/or port width set forth therein are merely exemplary and not limiting in any respect; notably, a "port" is a physical point of entry to/exit from the control/configure or NLINKS circuit; all physical forms of entry to or exit from the control/configure or NLINKS circuit are intended to fall within the scope of the present inventions (for example, a conductor or metal routing in/of an integrated circuit);

FIGS. 7D and 7E illustrate selected portions, as identified in FIG. 7A, of the exemplary schematic block diagram of configure/control circuitry and control multiplier-accumulator circuitry of FIG. 7A, in accordance with an embodiment of certain aspects of the present inventions; as noted in FIG. 7A, the inset in FIGS. 7D and 7E provides a general key of the data flow in a single pipeline (the execution pipeline receives input data at DI_I (see "Input Data Port" in NLINKS(lower)), the multiply-accumulate operations (multiply and accumulate operation flow in a single pipeline ("Accumulation Data Path")) within single pipeline, and the L0 memory address, control and data paths in the NLINKS circuit and MAC execution pipeline provide control and address information/signals generated by logic circuitry (not illustrated) to manage or control execution sequence(s) of the memory that stores the filter weights/coefficients;

FIG. 7F illustrates a schematic block diagram of an exemplary logical overview of a MAC pipeline (in the illustrative embodiment having a plurality of interconnected MAC processors), like that of FIGS. 2A, 2B, 2E and 2F, but including a plurality of MAC processors having an architecture like that of FIG. 5A (e.g., Dx/Dy granularity configuration circuitry (i.e., Dx/Dy registers—multiplexer circuit) which are interconnected via row interconnects in a circular topology, and which further include granularity configuration circuitry to facilitate implementing a granularity of the MAC pipeline; the MAC pipeline may consist of MAC circuits of one group of associated rows (which are interconnected via row interconnects—for example, as illustrated in FIGS. 7A-7E) or a plurality of groups of associated rows of MAC circuits (wherein each group of associated rows is interconnected via row interconnects); in the illustrate embodiment, MAC pipeline is connected to memory—in the illustrated example, two banks of memory (e.g., L2 SRAM) wherein the MAC pipeline reads input values/data (e.g., image data) for the D_Si shifting path (e.g., initial accumulation totals), and the MAC pipeline writes values/data (e.g., processed data) from the shifting path for final accumulation totals (after processing via the MACs of the MAC pipeline);

FIG. 8A illustrates a schematic block diagram of an exemplary logical overview of a folded MAC pipeline (in the illustrative embodiment having 64 MAC processors), like that of FIGS. 2A, 2B, 2E and 2F, but including a plurality of MAC processors having an architecture like that of FIG. 5A (here, Dx/Dy granularity configuration circuitry (i.e., Dx/Dy registers—multiplexer circuit) which are interconnected via row interconnects in a circular topology, and which further include granularity configuration circuitry to facilitate separating the folded MAC pipeline into two or more separate/different MAC pipelines (i.e., MAC pipeline A and MAC pipeline B), which are capable of operating/ processing independently of each other; in the illustrate embodiment, MAC pipeline A and MAC pipeline B are each connected to memory—in the illustrated example, three banks of memory (e.g., L2 SRAM) wherein each MAC pipeline reads input values/data (e.g., image data) for the D_Si shifting path (e.g., initial accumulation totals), and each MAC pipeline writes values/data (e.g., processed data) from the shifting path for final accumulation totals; notably, in the illustrated embodiment, the memory banks written to are on opposite sides of the pipelines from the memory banks that are read from; in one embodiment, it may be advantageous for the accumulation totals to alternate between memory banks on opposite sides of the execution pipeline;

FIG. 8B illustrates a schematic block diagram of an exemplary control/configure or NLINKS circuit connected to multiplier-accumulator circuitry (which includes a plurality of MAC processors (not illustrated in detail—but including 64 MAC processors having the architecture of FIG. 5A wherein the granularity configuration circuitry includes the Dx/Dy registers—multiplexer circuit located at/in the input of the multiplier-accumulator circuit) and further including granularity configuration circuitry (in this illustrative example, a plurality of multiplexers) in the row interconnects to facilitate separating the folded MAC pipeline into two or more separate/different MAC pipelines (i.e., MAC pipeline A and MAC pipeline B), which are capable of operating/processing independently of each other (see FIG. 8A), according to aspects of the present inventions;

FIGS. 8C and 8D illustrate the schematic block diagram of the exemplary embodiment of the MAC execution pipeline illustrated in FIG. 8B;

FIG. 9 illustrates a layout of multiplier-accumulator circuitry and NLINKS circuit, which is physically disposed on two sides of the multiplier-accumulator circuitry (in this illustrative embodiment, opposing sides) wherein (i) when the granularity configuration circuitry is programmed to operationally or electrically connect the rows of serially connected MACs, for example, into different (e.g., discrete) MAC pipelines (e.g., two separate MAC pipelines), NLINKS circuit #1 is configured to provides control and configuration information as well as input data (see, e.g., FIG. 7A for detail of a particular embodiment of NLINKS circuit #1) or (ii) when the granularity configuration circuitry is programmed to operationally or electrically separate the rows of serially connected MACs, for example, into different (e.g., discrete) MAC pipelines (e.g., two separate MAC pipelines), NLINKS circuit #1 and NLINKS circuit #2, together, separately interface with each linear pipeline wherein each pipeline includes one of the rows of serially interconnected multiplier-accumulator circuits, according to aspects of the present inventions; notably, in this illustrative embodiment, the rows of multiplier-accumulator circuits may be interconnected into one MAC pipeline (see FIGS. 7A-7E) or the rows of multiplier-accumulator circuits may be interconnected into more than one MAC pipeline (see FIGS. 8B-8D); moreover, in this illustrative embodiment, the MAC processing pipeline includes 64 MACs interconnected via row interconnects (32 MACs in each row); this is merely illustrative wherein more or less MACs may be included in each row; notably, in this embodiment, granularity configuration circuitry is disposed in the row interconnects, which connect the rows of MACs (in this illustrative example, two rows) into serially connected MACs; the granularity configuration circuitry disposed in the row interconnects enables configuring or programming the pipeline(s) to provide a programmable or configurable granularity wherein, in one embodiment, such granularity configuration circuitry may be programmed to operationally separate the rows of serially connected MACs into different (e.g., discrete) pipelines (in this illustrative example, two separate MAC pipelines) wherein NLINKS circuit #2 may interface with each of the pipelines separately;

FIG. 10 illustrates an embodiment of a MAC processor including granularity configuration circuitry including the by-pass mux and the Dx/Dy registers—multiplexer circuit, according to aspects of the present inventions; this embodiment of the MAC processor may be implemented in any of the MAC pipelines set forth herein; moreover, the granularity configuration circuitry of this embodiment may be employed in any of the embodiments described and/or illustrated herein; and FIGS. 11A and 11B illustrate schematic block diagram of an exemplary multiplier-accumulator execution or processing pipelines including a plurality of serially connected MACs wherein input data values ("D") are rotated, transferred or moved, on a cycle-by-cycle basis, from one MAC of the linear pipeline to the immediately following MAC of the execution pipeline (see, D_i[p]) and employed in the multiply operation of the multiplier circuit of that next MAC of the processing pipeline and wherein granularity configuration circuitry, including one or more by-pass multiplexers ("By-pass Mux") located in the multiply and/or accumulation path of the multiplier-accumulator circuit, facilitate programming, configuring and/or providing a predetermined granularity of the associated multiplier-accumulator circuit, according to one embodiment of the present inventions; notably, in one embodiment, granularity control circuitry may program the by-pass multiplexer(s) to (i) include/incorporate multiply-accumulator circuit(s), associated therewith, into the multiply and accumulation operations of the MAC pipeline or (ii) by-pass or eliminate/remove multiply-accumulator circuit(s), associated therewith, from the multiply and accumulation operations of the MAC pipeline; moreover, in this embodiment, the output of each accumulator circuit ("ADD") of the MACs is input into the accumulator circuit ("ADD") of the associated MAC (see, MAC_r[p]) and employed in the accumulation operation; moreover the output of each accumulator circuit ("ADD") of the MACs is not rotated, transferred or moved to the immediately following MAC of the linear processing pipeline (compare FIG. 1C); in this way, the input data values ("D") are rotated, transferred or moved (e.g., before, during or at the completion of each execution cycle of the execution sequence (i.e., set of associated execution cycles)) through the plurality of serially connected MACs of the pipeline such that, in operation, after input of the initial data input values into the MACs of the linear pipeline (see "Shift in next D"), each input data value (see "Rotate current D") that is input into a MAC is output before, during or at the completion of each execution cycle to the immediately following MAC of the linear pipeline and employed in the multiplication operation of the multiplier circuit ("MUL") of that immediately following MAC, according to one or more aspects of the present inventions; notably, each MAC includes a multiplier circuit ("MUL") to perform/implement the multiply operations and accumulator circuit ("ADD") to perform/implement the accumulate operations, according to one or more aspects of the present inventions; in this exemplary embodiment, MAC processor may include or read from one or more of memory banks (e.g., two SRAM memory banks) that are dedicated to the MAC to store filter weights used by the multiplier circuit of the associated MAC (as described and illustrated in U.S. Non-Provisional application Ser. No. 17/212,411 and U.S. Provisional Application No. 63/012,111); notably, the individual MACs may, at times, be referred to herein as MAC processors).

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed or illustrated separately herein

DETAILED DESCRIPTION

In a first aspect, the present inventions are directed to circuitry and methods to configure or provide the granularity of the processing and/or output of the multiplier-accumulator circuitry including one or more MAC processing pipelines (e.g., MAC pipeline(s) having linear architectures). The granularity configuration circuitry of the present inventions configures (e.g., one-time or more than one-time) the multiplier-accumulator circuit processing pipeline(s) to provide a predetermined granularity of the output data of the pipeline, for example, granularity of the processed image data. In one embodiment, the granularity configuration circuitry may interconnect the MAC circuit(s) or by-pass MAC circuit(s) of the image processing pipeline to process input data and provide, generate and output m×n image data/pixel output (wherein m and n are positive whole numbers). In one embodiment, n equals m—such as, for example, 16×16, 32×32, 64×64, 128×128, etc. In another embodiment, n does not equal m—such as, for example, 16×32, 16×64, 32×16, 32×64, 64×16, 64×32, 64×96, 32×96, etc.

In one embodiment, the granularity configuration circuitry programs and configures one or more separate multiplier-accumulator circuits, and/or rows/banks of interconnected (in series) multiplier-accumulator circuits, and/or a plurality of associated rows/banks of interconnected (in series) multiplier-accumulator circuits to pipeline multiply and accumulate operations (e.g., in a linear pipeline architecture) in a predetermined m×n data/pixels granularity format and generate and output image data/pixels in the m×n granularity format. The granularity configuration circuitry may configure and/or re-configure the granularity of the MAC processing pipeline, for example, in situ (i.e., during normal operation of the integrated circuit) and/or at or during power-up, start-up, initialization, re-initialization, configuration, re-configuration or the like. In one embodiment, memory (e.g., a configuration register) may store granularity configuration data, including the granularity of the image processing of, for example, the MAC pipeline, to implement processing in a m×n granularity format and/or to output image data/pixels in the m×n granularity format. Such memory may be programmed at or during power-up, start-up, initialization, re-initialization and/or in situ.

The granularity of the processing and/or output of the MAC processing pipeline may be user or system defined and/or may be one-time programmable (e.g., at manufacture) or more than one-time programmable (e.g., (i) at or via power-up, start-up or performance/completion of the initialization sequence/process sequence, and/or (ii) in situ or during normal operation). That is, the granularity configuration circuitry may be programmed and/or re-programmed in situ and/or prior to normal operation of the integrated circuit (e.g., the programmable MAC image processing pipeline) so that the MAC pipeline processes and outputs image data/pixels in one of a plurality of m×n data/pixels granularity formats.

In one embodiment, the granularity control circuitry programs, configures and/or controls the granularity configuration circuitry (such circuitry may collectively be referred to, at times, as granularity control/configure circuitry) to incorporate or by-pass one or more multiplier-accumulator circuits of the MAC processing or execution pipeline(s). For example, in one embodiment, the granularity control circuitry may program the granularity configuration circuitry (e.g., one or more multiplexers associated with one or more multiplier-accumulator circuits or rows/banks of multiplier-accumulator circuits) to, among other things, enable or incorporate a predetermined multiplier-accumulator circuits in the execution or processing pipeline to process and output image data/pixels in a predetermined m×n data/pixels format. Here, the granularity control circuitry may configure or determine which multiplier-accumulator circuits or which multiplier-accumulator circuits of a plurality of rows/banks of interconnected multiplier-accumulator circuits, for example, via control of one or more by-pass circuits (e.g., multiplexers), are interconnected (in series) and/or employed to perform the multiply and accumulate operations of the pipelining architecture or configuration of the execution pipeline. Thus, in one embodiment, the granularity control circuitry configures or implements an architecture of the execution or processing pipeline by controlling or programming the granularity configuration circuitry (e.g., programmable by-pass circuits such as multiplexers) to provide connection(s) (i) between predetermined multiplier-accumulator circuits and/or (ii) between predetermined multiplier-accumulator circuits of rows of interconnected multiplier-accumulator circuits of the MAC pipeline (e.g., linear pipeline) or (iii) to by-pass selected multiplier-accumulator circuits and/or (iv) to by-pass selected multiplier-accumulator circuits of rows of interconnected multiplier-accumulator circuits of the MAC pipeline.

With reference to FIG. 3, in one embodiment of the present inventions, the granularity configuration circuitry is programmed and/or re-programmed (e.g., in situ), via the granularity control circuitry, such that the MAC pipeline (e.g., linear pipeline) performs the multiply and accumulate operations to process and output image data/pixels in a predetermined m×n data/pixels granularity format (e.g., e.g., where n equals m: 16×16, 32×32, 48×48, 96×96, etc.; where n does not equal m: 16×32, 16×64, 32×16, 32×64, 64×96, 96×64, etc.). Here, the granularity configuration circuitry associated with the multiply-accumulator circuit which is connected (e.g., serially) in a MAC pipeline (e.g., a linear pipeline architecture) may be programmed or configured, via the granularity control circuitry, to (i) include/incorporate multiply-accumulator circuit into the multiply and accumulation operations of the MAC pipeline or (ii) by-pass or eliminate/remove the multiplier-accumulator circuit from the multiply and accumulation operations of the MAC pipeline.

As noted above, in one embodiment, configuration memory (e.g., a configuration register) may store granularity configuration data, including the granularity of the image processing of the MAC pipeline, to implement processing in a m×n granularity format and/or to output image data/pixels in the m×n granularity format. The configuration memory may be programmed at or during power-up, start-up, initialization, re-initialization and/or in situ (i.e., during normal operation of the integrated circuit).

With reference to FIGS. 4A-4C, in one embodiment, the granularity configuration circuitry includes one or more by-pass multiplexers ("By-pass Mux") in one or more (or all) of the MAC processors of the MAC pipeline. In this embodiment, the by-pass multiplexers are incorporated, disposed or located in, before or after the multiply and/or accumulation path of the associated multiply-accumulator circuit to facilitate programming, configuring and/or providing a predetermined granularity of the MAC pipeline (e.g., linear pipeline). The granularity control circuitry may program the by-pass multiplexer(s) to (i) include/incorporate multiply-accumulator circuit(s), associated therewith, into the multiply and accumulation operations of the MAC pipeline or (ii) by-pass or eliminate/remove multiply-accumulator circuit(s), associated therewith, from the multiply and accumulation operations of the MAC pipeline during operation. In this way, the granularity configuration circuitry may configure or provide an associated MAC pipeline (e.g., linear pipeline) to provide a predetermined m×n data/pixels granularity format (e.g., where n equals m: 16×16, 32×32, 48×48, etc.; where n does not equal m: 16×32, 16×64, 32×16, 32×64, 98×64, etc.).

As noted above, in one embodiment, the linear array of N pipelined processors performs, as its default operation, a vector-matrix multiply. That is, an N-element vector operand is multiplied by an N×N element matrix to give an N-element result. This employs N-pipeline cycles. While the current execution happens, the previous N element result vector is unloaded and the next N element operand vector is loaded. Where N=64, a linear array of N MAC processors and an N×N matrix size, provides a matrix-vector multiply efficiency of about 91% (approximately $^{64}/_{70}$). Where, however, the processing application employs a 32×32 matrix size and the includes pipeline 64 MAC or MAC processors (e.g., FIGS. 2A-2F), the matrix-vector multiply efficiency of the exemplary pipeline embodiment of decreases to 46% (approximately $^{32}/_{70}$), because 64 pipeline cycles are employed to process the accumulation totals through the 64 MAC pipelined array. In the pipeline embodiment of FIGS. 4A-4C, where the granularity configuration circuitry is configured or programmed to provide a MAC pipeline (e.g., linear pipeline) of 32 MACs or MAC processors, the performance efficiency of a 32×32 matrix-vector multiply is 42% (which is calculated as (32×32)/(64×38)). The efficiency of such a MAC pipeline which is approximately twice the efficiency of the pipeline embodiment of FIGS. 2A-2F (i.e., where N=64)). In one embodiment, the granularity configuration circuit (e.g., by-pass multiplexers) associated with 32 MACs or MAC processors of the pipeline by-passes those 32 MACs or MAC processors of the 64 MAC or MAC processor pipeline—thereby effectively reducing the size of the array to N/2 (64/2=32). Here, only 32 MACs or MAC processors are operationally connected in the linear pipeline during operation wherein 32 MACs or MAC processors are operationally disconnected from the pipeline via each granularity configuration circuit associated therewith. Moreover, the performance efficiency for 64×64 matrix-vector multiply (i.e., none of the MACs or MAC processors are by-passed) is 91%, the same efficiency as the efficiency of the embodiment of FIGS. 2A-2F (where N=64).

With particular reference to FIG. 4A, in operation, when the by-pass multiplexers are programmed or configured to incorporate or include the associated multiplier-accumulator circuit of a MAC processor into the multiply and accumulation operations of the MAC pipeline, the granularity control circuitry outputs a control signal SEL[p] to enable or select the "A" input of By-pass Mux 1 and By-pass Mux 2 (see FIG. 4A). Where, however, the multiplier-accumulator circuit of a MAC processor is to be "by-passed" or excluded/removed from the multiply and accumulation operations of the MAC pipeline, the granularity control circuitry outputs a control signal SEL[p] to enable or select the "B" input of By-pass Mux 1 and By-pass Mux 2 (see FIG. 4A). In response, the multiplier-accumulator circuit of the MAC processor of the MAC pipeline is "skipped", by-passed or not incorporated into the multiply and accumulation operations of the MAC pipeline. Notably, in this exemplary embodiment, the by-pass multiplexers are disposed or located in the accumulation output path (MAC_r[P] shifting path) and in the shift-in/out accumulation data path (MAC_SO[P] shifting path).

With reference to FIG. 4B, in one embodiment, the by-pass multiplexers may be incorporated in all of the MAC processors of the MAC pipeline. In this way, where the bypass multiplexers associated with each multiplier-accumulator circuits of the MAC pipeline are controlled by a unique control signal, the multiplier-accumulator circuits of the MAC pipeline may be incorporated or by-passed on an individual basis. As such, each set of bypass multiplexers (By-pass Mux 1 and By-pass Mux 2) associated with a given multiplier-accumulator circuit may be controlled individually from the other sets of bypass multiplexers associated the other multiplier-accumulator circuits of the MAC pipeline.

Alternatively, the bypass multiplexers associated with a group of multiplier-accumulator circuits of the MAC pipeline (i.e., a subset of all of the multiplier-accumulator circuits of the MAC pipeline) may be controlled by a common control signals. For example, a first common set of control signals may be employed to configure whether to incorporate or "skip", by-pass or not incorporate such plurality of multiplier-accumulator circuits into the multiply and accumulation operations of the MAC pipeline. With continued reference to FIG. 4B, a first set of common control signals may be associated with and control the status of a subset of the MAC processors (e.g., the odd numbered MAC processors (i.e., MAC processor 1, MAC processor 3 (not illustrated), etc.) from the perspective of whether the MAC processors are employed in the multiply and accumulation operations of the MAC pipeline. That is, a common set of control signals may control or configure the selection of which input is connected to the output of the by-pass multiplexer for a subset of the MAC processors of the MAC pipeline and, as such, a common set of control signal(s) (i.e., the same control signal(s)) may be employed to determine whether that subset of the MAC processors (and, as such, the multiplier-accumulator circuits associated therewith) are effectively incorporated or by-passed/eliminated from the MAC pipeline (e.g., the same control signals may control the by-pass multiplexers of MAC processor 1, MAC processor 3 (not illustrated), . . . etc. (such that a first data state (e.g., logic low) of the control signal SEL[p] may enable or select the "A" input of By-pass Mux 1 and By-pass Mux 2 (see FIG. 4A) in each MAC processor of the group and a second data state (e.g., logic high) of control signal SEL[p] may enable or select the "B" input of By-pass Mux 1 and By-pass Mux 2 (see FIG. 4A) in each MAC processor of the group. In this way, the predetermined m×n granularity format of the MAC pipeline may be configured rapidly wherein the multiplier-accumulator circuits of the associated MAC processors of the group may be configured to contribute to (or participate in) or not contribute to (or not participate in) the processing of the MAC pipeline via one control signal and/or one set of control signals.

Notably, the MAC pipeline may include a plurality of groups of MAC processors wherein the by-pass multiplexers of each group of MAC processors may be controlled by a common control signal(s). In this way, the m×n granularity format of the MAC pipeline may be provided via one or more common granularity control signals which, in operation, would determine which of the subset(s) of the MAC processors (and, as such, the multiplier-accumulator circuits connected in the MAC pipeline associated therewith), or all of the subsets of the MAC processors (and, as such, all of the multiplier-accumulator circuits connected in the MAC pipeline), are employed in the processing of the MAC pipeline or by-passed/eliminated from the MAC pipeline and contribute to the processing of the MAC pipeline and do not and employed in the processing of the MAC pipeline.

With reference to FIG. 4C, in one embodiment, one or more groups of MAC processors include associated by-pass multiplexer(s) (see, e.g., MAC processors 1 and x) and one or more groups of MAC processors do not include by-pass multiplexers (see, e.g., MAC processors 0 and x−1). Here, the granularity control circuitry may program the by-pass multiplexer(s) in those MAC processors to (i) include/incorporate multiply-accumulator circuit(s), associated therewith, into the multiply and accumulation operations of the MAC pipeline or (ii) by-pass or eliminate/remove multiply-accumulator circuit(s), associated therewith, from the multiply and accumulation operations of the MAC pipeline. In this way, the granularity configuration circuitry may program, configure or provide an associated MAC pipeline (e.g., linear pipeline) to provide a predetermined m×n data/pixels granularity format (e.g., where n equals m: 16×16, 32×32, 48×48, etc.; where n does not equal m: 16×32, 16×64, 32×16, 32×64, etc.).

With reference to FIGS. 4A and 4C, in operation, the multiplier-accumulator circuits of MAC processor 1 and MAC processor x are incorporated into the processing operations of the MAC pipeline when the control signals connect the "A" input of By-pass Mux 1 and By-pass Mux 2 to the output thereof (see FIG. 4A). Where, the multiplier-accumulator circuit of a MAC processor is to be "by-passed" or excluded/removed from the multiply and accumulation operations of the MAC pipeline, the control signal select the "B" input of By-pass Mux 1 and By-pass Mux 2 (see FIG. 4A) whereby the signal applied to the "B" input of By-pass Mux 1 and By-pass Mux 2 are output by each by-pass multiplexer. In response, the multiplier-accumulator circuit of each of the MAC processors 1 and x of the MAC pipeline is not incorporated into or do not contribute to the multiply and accumulation operations of the MAC pipeline. That is, the MAC multiplier-accumulator circuits not incorporated in the multiply and accumulate operations of the execution pipeline, albeit electrically/physically connected or coupled to those MAC circuits employed in the execution pipeline, do not contribute to or participate in the concatenation of the multiply and accumulate operations of the execution pipeline based on control of the granularity configuration circuitry associated with such MAC circuits (i.e., those MAC circuits not enabled or not incorporated in the processing).

In one embodiment, where the MAC pipeline includes 64 MAC processors connected in series in a linear architecture, the image layers may be processed in groups of 64 input pixels. (See, e.g., FIGS. 1A and 1B where m=64 and n=64). Such a MAC pipeline may perform 64×64 multiply-accumulate operations in 64 pipeline cycles and produces 64 output pixels—each having a 64×64 output pixel granularity. Where, a 32×32 output pixel granularity is desired of the linear pipeline having 64 MAC processors connected in series, the by-pass multiplexers located in the multiplier-accumulator circuit (specifically in the accumulation output path (MAC_r[P] shifting path) and in the shift-in/out accumulation data path (MAC_SO[P] shifting path) of the illustrative embodiment—as depicted in FIG. 4A), when enabled to remove the multiplier-accumulator circuit of each associated MAC processor (in this illustrative embodiment, 64 MAC processors (numbered/labeled MAC processor 0 to MAC processor 63), MAC processor 1, MAC processor 3 (not illustrated), . . . MAC processor 63 as depicted in FIG.

4C) from the multiply and accumulation operations of the MAC pipeline. With reference to FIGS. 4C and 4D, the 32×32 output pixel granularity may be implemented in 32 pipeline cycles (by MAC processor 0, MAC processor 2 (not illustrated) . . . MAC processor 62 as depicted in FIG. 4C, wherein x=63). As such, the effective rate would improve to 0.50× of the peak rate (relative to the 64×64 example above).

With continued reference to FIGS. 4C and 4D, in this exemplary embodiment, in operation, 32×32 Fkl filter weights will be distributed across the 32 L0 SRAMs (there is one L0 SRAM in each of the 32 processing elements). In each execution cycle, 32 Fkl values are read from memory (bank1 and bank0) and output or transferred to the multiplier circuit (MUL) and the accumulator circuit (ADD) of the MAC processor. The Dijk data values (data D) are shifted-in from, for example, memory and held and processed in a MAC processor during 32 execution cycles after being loaded from the Dijk shifting chain into the multiplier circuit (MUL) and the accumulator circuit (ADD). The Yijlk MAC values (Y values) will be rotated through all 32 processing elements during the 32 execution cycles after being loaded from the Yijk shifting chain (Shift-in next Y), and will be unloaded or output via the same shifting chain (Shift-out Previous Y). Here, the plurality of MAC circuits are connected in series to form a linear pipeline to facilitate concatenating the multiply and accumulate operations.

Notably, in the illustrative embodiment, the by-pass multiplexers are placed or located in half of the MAC processors (e.g., in every other MAC processor of the pipeline) so that multiplier-accumulator circuits associated with such MAC processors are "skipped" or not included in the multiply-accumulate operations of the linear MAC pipeline. These by-pass multiplexers may be controlled by a common granularity control signal.

Where each MAC processor of the MAC pipeline includes by-pass multiplexers (see FIG. 4B), the by-pass multiplexers of half of the MAC processors (e.g., every odd MAC processor or every even MAC processor of the pipeline) may be controlled/configured to by-pass the multiplier-accumulator circuits associated with such half of MAC processors thereby "skipping" or not including those multiplier-accumulator circuits in the multiply-accumulate operations of the linear MAC pipeline. Indeed, as stated above, the granularity of the MAC pipeline may be programmed to provide any m×n granularity format—for example, if ¾ of the MAC processors of a 64 MAC processor linear pipeline are skipped (e.g., via controlling/configuring by-pass multiplexers associated with ¾ of MAC processors), then the effective rate for a 16×16 granularity example would be 0.25× of the peak rate (relative to the 64×64 example above); or if ¼ of the MAC processors of a 64 MAC processor linear pipeline are skipped (e.g., via controlling/configuring by-pass multiplexers associated with ¼ of MAC processors), then the effective rate for a 48×48 granularity example would be 0.75× of the peak rate (relative to the 64×64 example above).

Although the granularity control signal(s) are not illustrated with respect to the by-pass multiplexers in FIGS. 4B and 4C, such multiplexers may be controlled as illustrated in FIG. 4A and described herein. For the sake of brevity, the discussion will not be repeated specifically in connection with FIGS. 4B and 4C.

Notably, there are a number of reasons why it may be advantageous to utilize or employ the bypass multiplexer embodiment/configuration illustration in FIG. 4C including:

[1] It is possible that there are execution resources shared by two (or more) of the "N" MAC processor elements, so that the execution pipeline is only able to generate "N/2" MAC operations per cycle. For example, each pair of MAC processors could be capable of performing two integer MAC operations per cycle, but only one floating point MAC operation per cycle. In this case, the bypass mux would be used so that N/2 floating point MACs are generated per cycle, and (N/2)^2 floating point MACs are generated in N/2 cycles. If the bypass mux option was not available, the pipeline latency would be longer (it would require N cycles for generating N/2 floating point MACs), resulting in a performance loss.

[2] It is possible that there are memory resources shared by two (or more) of the "N" MAC processor elements, so that the execution memory is only able to generate "N/2" weight values per cycle. For example, each pair of MAC processors could be capable of generating two integer filter weight values (F) per cycle, but can only generate one floating point weight value per cycle. In this case, the bypass mux would be used so that N/2 floating point filter weight values are generated per cycle, and (N/2)^2 floating point MACs are generated in N/2 cycles. If the bypass mux option was not available, the pipeline latency would be longer (it would require N cycles for generating N/2 floating point MACs), resulting in a performance loss.

[3] The application that is utilizing the execution pipeline may only have "N/2" elements that can be processed in the same pipelined MAC (vector) operation. This could be due to the inherent (limited) parallelism in the application. In this case, the bypass mux would be used so that N/2 floating point filter weight values are generated per cycle, and (N/2)^2 floating point MACs are generated in N/2 cycles. If the bypass mux option was not available, the pipeline latency would be longer (it would require N cycles for generating N/2 floating point MACs), resulting in a performance loss.

In another embodiment, the present inventions modify the pipelined input path for the "D_i[p]" operand in MAC processor. With reference to FIGS. 5A and 5B, in this embodiment, an additional register (e.g., D register) is incorporated into the data input path such that a plurality of registers are implemented in the path into the multiplier-accumulator circuits of each of the MAC processors (labeled "Dx" and "Dy" in the illustrated embodiment). As such, a plurality of control signals (not illustrated) are employed to parallel-load the Dx and Dy registers selectively from the input shift path D_S[p] and a multiplexer select signal to selectively input the data into the multiplier-accumulator circuit. Notably, in this embodiment, the data input shift path D_S[p] may be unchanged relative to the MAC processor architecture illustrated in FIG. 1B.

The Dx/Dy dual data registers embodiment/configuration illustrated in FIG. 5A is an alternative embodiment of managing the circular shift path for the current Y accumulation values. If the Dx/Dy dual data register embodiment/configuration is used, the previously described shift path for the previous Y accumulation values (path identified or highlighted in the "Not used" box in FIG. 5A). There are several advantages to the Dx/Dy dual data register embodiment including:

[1] the circuit cost is lower; the Dx/Dy method requires an second data register and a control SELxy[p]. It also allows the MAC_SO[p] register (typically about twice as large) to be removed.

[2] the wire cost is also lower; the dual data register embodiment does not require additional global wire tracks—it uses the existing DI_S wires. It also allows the MAC_SO[p] wire tracks (typically about twice as wide as the DI_S wire tracks) to be removed.

[3] the pipeline latency is reduced; the current accumulation results may be removed directly from the shifting path ("Shift-out Current Y")—in one embodiment, directly into memory (e.g., L2 memory) and/or external circuit (e.g., a processor). The latency for shifting the input data and performing the MAC accumulations is 2*N cycles. In one embodiment, the previously described MAC_SO shifting path is employed to shift-out processed data. In this embodiment, an addition N cycles (for 3*N cycles total) will be required (relative to the embodiments which employ the accumulation path to shift-out processed data).

The granularity control circuitry generates a control signal (labeled SELxy[p]) to multiplex either the Dx or Dy value to the input of the multiplier circuit of the multiplier-accumulator circuit (i.e., D_i[P]). In this way, the value/data stored in the Dx register or Dy register to be individually selected across the plurality of multiplier-accumulator circuit of each MAC processor (e.g., 64) of the MAC processing pipeline.

Typically, the SELxy[p] signal will be generated at one side of the execution pipeline (the left side at P=0 in the FIG. 6B exemplary embodiment) and is shifted to the opposite side at the rate of one processor element per cycle. This may be seen in the D_i[p] waveform in FIG. 6B. In this example, the SELxy[p] signal enables a common sequence at each processor element position: four cycles of the S operand, followed by four cycles of the T operand, etc. This sequence is shifted by one cycle at each processor element.

A plurality of MAC circuits employed in the multiply and accumulate operations of the execution pipeline are connected in series to form a linear pipeline to facilitate concatenating the multiply and accumulate operations. Those MAC circuit(s) not enabled or not incorporated in the multiply and accumulate operations of the execution pipeline, albeit electrically/physically connected or coupled to those MAC circuits employed in the execution pipeline, do not contribute to or participate in the multiply and accumulate operations of the execution pipeline, in response to or based on control of the granularity configuration circuitry associated with such MAC circuits (i.e., those MAC circuits not enabled or not incorporated in the processing). The MAC_SO shift path will not be needed for bringing in the accumulator state serially and parallel-loading and parallel-unloading it to the MAC_r[p] registers. Instead, the accumulator state will be shifted in and out incrementally with the MAC_r[P] register path.

FIG. 6A illustrates a schematic block-diagram of a MAC processing pipeline, including four MAC processors (each having a multiplier-accumulator circuit), connected to memory. Although the pipeline is illustrated as including four (4) multiplier-accumulator circuits (one each associated with a different one of the four MAC processors), the present inventions is not limited to a pipeline including four (4) multiplier-accumulator circuits. Here, the pipeline includes four (4) multiplier-accumulator circuits to simplify/focus the explanation/description of operation and register sequencing (see discussion below and FIG. 6B).

With reference to FIG. 6A, in one embodiment, in operation, a vector of four input data values Dijk is shifted into the MAC pipeline, via the D_SI[P] path, from a bank of memory (e.g., L2 SRAM). Every four cycles, four D_SI[P] values are parallel-loaded into either the four Dx[P] or four Dy[P] registers of the four MAC processors (i.e., MAC processor 0-MAC processor 3). The Dx[P] or Dy[P] register is multiplexed to the D_i[P] value at the input of the multiplier circuit of the multiplier-accumulator circuit of each MAC processor.

Concurrently, a vector of four initial accumulation totals Yijl is shifted into the multiplier-accumulator circuit, via the MULT_r[P] path, from a second bank of memory (e.g., L2 SRAM). The initial accumulation totals Yijl are added to the output of the multiplier circuit (i.e., the product of image data input (D_i[P]) and the filter weight (D_r[P])) in each MAC processor to generate a partial accumulation totals Yijl. The vector of final accumulation values Yijl is shifted out of the MAC circuit of the MAC processor, via the MULT_r[P] path, to a bank of memory (e.g., a third bank of L2 SRAM).

Notably, in this embodiment, the accumulation data path is shifted-in and shifted-out directly, and the parallel load path (MAC_SO) is not used. The accumulation data path, in this embodiment, includes a Dx/Dy input data register and a multiplexer wherein the selected input is determined via control signal SELxy[p].

Moreover, although the embodiment illustrated in FIG. 6A depicts the final accumulation values Yijl returning to (be written into) the same memory that stores the initial accumulation totals Yijl (from which the data is read from and applied to the accumulator circuit (ADD) of MAC processor 0), the system architecture of the MAC pipeline may employ different memory banks to store the final accumulation values and the partial accumulation totals (which are input to the accumulator circuit (ADD) of MAC processor). In this way, issues of reading and writing data into memory will not overlap thereby avoiding read/write restrictions.

FIG. 6B illustrates a pseudo timing diagram in conjunction with sequencing of the Dx/Dy input data registers and other processing of each of the MAC processors of the exemplary four processor pipeline (albeit the invention is not limited to four MAC processors). With reference to FIGS. 6A and 6B, six (6) portions of the sequence are identified in FIG. 6B and discussed in detail below, including:

[1] A vector of four input data values Dijk is shifted in via the D port from a bank of L2 memory. Every four cycles an independent four-vector is supplied and shifts through the MAC processors on the D_SI[P] node of each MAC processor. As noted above, a "port" is a physical point of entry to/exit; all physical forms of entry to or exit from, for example, the control/configure or NLINKS circuit, are intended to fall within the scope of the present invention (for example, a conductor or metal routing in/of an integrated circuit).

[2] Every four cycles an independent four-vector on the D_Si[P] nodes of the MAC processors are parallel-loaded into either the four Dx[P] or four Dy[P] registers. Each four-vector value remains stable in a Dx[P] or Dy[P] register for eight cycles.

[3] The Dx[P] or Dy[P] register is multiplexed to the D_i[P] node at input of the multiplier-accumulator circuit of each MAC processor. A select control SELxy [P] in each MAC processor controls the multiplexing. This pattern is illustrated in the {S,T,U,V,W . . . } values at the D_i[P] node at each of MAC processor 0-MAC processor 3.

[4] Concurrently, a vector of four initial accumulation totals Yijl is loaded or shifted into the multiplier-accumulator circuit of each MAC processor of the MAC pipeline, via the Shift-in Current Y input port ("InD"—see FIG. 6A), from memory (e.g., L2 SRAM).

Every four cycles an independent four-vector is read from memory and transferred/supplied to the multiplier-accumulator circuit of each MAC processor of the MAC pipeline and is processed by the multiplier-accumulator circuit of each of the MAC processors.

[5] Each value of the four-vector initial accumulation totals Yijl is added to the product of D_i[P] and D_r[P] by the accumulator circuit of multiplier-accumulator circuit of each MAC processor to give the next four-vector of partial accumulation totals on the MAC_r[P] nodes.

[6] The vector of final accumulation values Yijl is shifted out of the multiplier-accumulator circuit of MAC processor 3, via the Shift-out Current Y input port ("OutY"—see FIG. 6A), to memory (e.g., L2 SRAM).

As noted above, a "port" is a physical point of entry to and/or exit from a circuit—here the MAC processors; all physical forms of entry to or exit from the MAC processors are intended to fall within the scope of the present invention (for example, a conductor, semiconductor, doped semiconductor or metal route).

The present inventions may be employed in conjunction with one or more control/configure or NLINKS circuits (see, e.g., FIG. 1D, and/or U.S. application Ser. No. 16/545,345, U.S. Provisional Application No. 62/725,306, U.S. Non-Provisional application Ser. No. 17/212,411 and/or U.S. Provisional Application No. 63/012,111), for example, in connection with a component (e.g., the X1 component) having a plurality of multi-bit MAC execution pipelines, which may be organized or arranged (e.g., physically) into one or more clusters, each cluster including a plurality of multi-bit MAC execution pipelines (e.g., 6, 64-MAC execution pipelines).

Where the programmable granularity configuration architectures of FIGS. 4A and 4B are employed, the control/configure circuit or NLINKS circuit connected to that MAC pipeline may include the configuration illustrated in FIGS. 2A, 2C and 2D to, among other things, configure the overall execution pipeline by providing or "steering" data between one or more MAC pipeline(s) (in this exemplary embodiment, 64 MAC processors), via programmable or configurable interconnect paths. In addition, as noted above, the control/configure circuit may also configure the interconnection between the multiplier-accumulator circuits of the MAC processors of the pipeline and one or more memories—including external memories (e.g., L3 memory, such as external DRAM)—that may be shared by one or more (or all) of the clusters of MAC execution pipelines. These memories may store, for example, the input image pixels Dijk, output image pixels Yijl (i.e., image data processed via the circuitry of the MAC pipeline(s), as well as filter weight values Fijklm employed in connection with such data processing.

Where the programmable granularity configuration architecture of FIGS. 5A and 5B are employed, the control/configure circuit or NLINKS circuit connected to that MAC pipeline may include the configuration illustrated in FIGS. 7A-7E. With reference to FIG. 7A, in one exemplary configuration, the control/configure or NLINKS circuit (which, in one embodiment, is dedicated to the associated MAC execution pipeline) connects to the execution pipeline via a plurality of ports including (i) the DI_I, MAC_SI, DI_O, MAC_SO ports, which, in one embodiment, connect the execution pipeline to memory that is external to the pipeline (e.g., L2 memory such as SRAM), and (ii) the MAC_I, MAC_O ports which connect the plurality of multiplier-accumulator circuits (or the two rows of multiplier-accumulator circuits) into ring configuration or architecture. In this exemplary embodiment, the control/configure or NLINKS circuit is configured to be an interface for an associated MAC execution pipeline to, for example, provide input data to execution pipeline (e.g., from memory) and receive the output/processed data from the execution pipeline (e.g., to output to memory). (See, e.g., FIG. 7F).

The L0 memory control and address signals in the NLINKS and the pipeline provide control and address information that manage an execution sequence in the NLINKS and MAC processors of the pipeline. The data (e.g., image data) is input into the NLINKS and MAC pipeline via the Input Data Port, Input Data Path and ID Port) and used by/in an execution or processing sequence (implemented by the MAC circuits). The input data may be stored in L2 memory (e.g., SRAM) and provided (i.e., read from memory) to the NLINKS via the control logic circuitry (not illustrated). A set or group of input data is shifted in serially through the DI_I port and loaded into the pipeline in parallel to the D register in each of the multiplier-accumulator circuits of the execution pipeline. The end of the serial path is the DI_O output port in the NLINKS circuit. As noted above, a "port" is a physical point of entry to/exit; all physical forms of entry to or exit from the control/configure or NLINKS circuit are intended to fall within the scope of the present invention (for example, a conductor or metal routing in/of an integrated circuit).

The signal paths that were employed for output data path in the NLINKS circuit and MAC execution pipeline (i.e., input data that was processed via the multiplier-accumulator circuits or MAC processors of the execution pipeline—see FIGS. 2A-2F) have been re-purposed or employed as the NLINKS input and output ports for the serial path (NLNK_MAC_SI and NLNK_MAC_SO) of the accumulation data path. In one embodiment, these ports are connected to the L2 memory (e.g., SRAM). Moreover, these ports and data paths, in this embodiment, are employed to shift accumulation totals directly into the accumulation data path of the MAC pipeline. (See, e.g., FIG. 7F). Notably, however, in this embodiment, the signals and paths that were previously used for parallel-unloading and serially shifting out the accumulation totals (i.e., NMAX_MAC_SI and NMAX_MAC_SO) are not employed. Likewise, such signals and paths are not used for parallel-loading and serially shifting in the initial accumulation totals. The unused buses and signal paths are now identified and/or highlighted as "Not used"—see FIGS. 7B and 7C.

With reference to FIGS. 7A, 7D and 7E, the NLINKS circuit includes two multiplexers to route the shift accumulation totals directly into the accumulation data path of the MAC pipeline. In FIG. 7D, the multiplexer MAC_Sx mux is connected between the NMAX_MAC_SI port and NMAX_MAC_I port to facilitate input of a data source that could be driven into the baseline NMAX_MAC_SI parallel loading path to be instead serially shifted directly into the NMAX_MAC_I path. Further, in FIG. 7E, the multiplexer MAC_x mux is connected between the NMAX_MAC_O port and the NMAX_MAC_SO input into configurable processing circuits. This provides a data path for any data destination that could be reached by the baseline configuration (see FIGS. 2A-2F) NMAX_MAC_SO parallel unloading path to be instead serially shifted directly from the NMAX_MAC_O path. This also means that the accumulation totals from the NMAX_MAC_O port may be processed or further processed by the configurable processing circuits blocks a0,a1,a2,a3 such as the accumulation totals from the NMAX_MAC_SO port.

Notably, where the programmable granularity configuration architecture of architecture of FIGS. 5A and 5B are employed, the control/configure circuit or NLINKS circuit connected to that MAC pipeline may include the configuration illustrated in FIGS. 7A-7E to, among other things, configure the overall execution pipeline by providing or "steering" data between one or more MAC pipeline(s) (in this exemplary embodiment, 64 MAC processors), via programmable or configurable interconnect paths. The multiplexer MAC_Sx mux and MAC_x mux may be incorporated in other locations in the control/configure circuit or NLINKS circuit. The locations illustrated in FIGS. 7A, 7D and 7E are not intended to be limiting but are merely exemplary. In addition, as noted above, the control/configure circuit may also configure the interconnection between the multiplier-accumulator circuits of the MAC processors of the pipeline and one or more memories—including external memories (e.g., L3 memory, such as external DRAM)—that may be shared by one or more (or all) of the clusters of MAC execution pipelines. These memories may store, for example, the input image pixels Dijk, output image pixels Yijl (i.e., image data processed via the circuitry of the MAC pipeline(s), as well as filter weight values Fijklm employed in connection with such data processing.

In this embodiment, in contrast to the embodiments of FIGS. 2A-2F and FIGS. 4A-4D, the N MACs or MAC processors are separated into a plurality of arrays (e.g., a first or an upper N/2 group that is associated with the Dx register and a second or a lower N/2 group that is associated with the Dy register). In one embodiment, each group works on or processes separate or different N/2×N/2 multiplies. As such, where N=64, the efficiency of two 32×32 matrix vector (each array corresponds to half of the MAC or MAC processor of the entire linear array) are each 84% (which is calculated as 2*(32×32)/(64×38)). Moreover, all "N" MACs or MAC processors are being utilized in this configuration (twice the performance of the embodiment of FIGS. 4A-4D).

Further, with reference to FIGS. 7A and 7E, as intimated above, the configurable processing circuitry may be employed to implement additional data processing operations including, for example, pre-processing of data operands and post-processing of accumulation results, in accordance with an embodiment of certain aspects of the present inventions. Here, the configurable processing circuit is organized into four circuit blocks a0, a1, a2, a3 wherein each circuit block of the configurable processing circuitry may be configured to perform one or more operations. Moreover, the configurable processing circuitry includes additional programmable/configurable circuitry to establish, configure or "steer" the data path to implement one or more pre-processing operations (e.g., pre-process the data operands) and/or one or more post-processing operations (e.g., further/subsequent processing of the accumulation results from the MAC processing pipeline—which may be an overall, complete or combined MAC processing pipeline).

In this regard, the present inventions may be employed in conjunction with activation circuitry described and/or illustrated in U.S. Patent Application No. 63/144,553, entitled "MAC Processing Pipeline having Activation Circuitry, and Methods of Operating Same", filed Feb. 2, 2021). Here, the activation circuitry described and/or illustrated in the '553 application may be employed in the same manner (e.g., disposed on the output of a MAC processing pipeline, to further process the data initially processed by the MAC processing pipeline) in connection with linear pipelines and processing described and/or illustrated herein. Indeed, the activation circuitry may be implemented in any of the embodiments described and/or illustrated herein as well as include one or more circuits to process data output by such linear pipelines via one or more operations, including, for example, linear and/or non-linear activation operations and/or threshold functions. The one or more circuits of the activation circuitry, alone or in combination, may perform a particular operation, including, for example, a particular linear or non-linear activation operation or threshold function. The '553 application is hereby incorporated by reference herein in its entirety.

In addition, the configurable processing circuitry may perform a variety of floating point and fixed point operations (whether pre-processing of the input data and/or post-processing of the accumulation results) including, for example, addition/subtraction with register value, multiplication by register value, conversion to floating point value, conversion to integer value, adjustment in format precision, conversion with monadic function(s) (e.g., inverse, square root, inverse square root, hyperbolic tangent, and/or sigmoid, etc.). The configurable processing circuitry may include multiplexers to configure and establish a data path, or steer the data, to the selected processing circuit(s) to implement selected operation(s) or bypass them. In one embodiment, the paths and/or steering will be set up, via control of the multiplexers, before an execution sequence.

In one embodiment, the present inventions may be employed in conjunction with circuitry/operations to post-process accumulation data—including the described and/or illustrated in U.S. Patent Application No. 63/173,948, entitled "Floating Point to Fixed Point Data Format Conversion Circuitry, and MAC Processing Pipeline including Same", filed Apr. 12, 2021, and/or in U.S. Patent Application No. 63/189,804 entitled "Fixed Point to Floating Point Data Format Conversion Circuitry, and MAC Processing Pipeline including Same", filed May 18, 2021. The one or more post-processing circuits, alone or in combination, may perform a particular operation, including, for example, a floating point to fixed point data format conversion or a fixed point to floating point data format conversion. The '948 and '804 applications are hereby incorporated by reference herein in their entirety.

Notably, the configurable processing circuitry may be one-time programmable (e.g., at manufacture via, for example, a programmable fuse array) or multiple-times programmable (including, e.g., at start-up/power-up, initialization, and/or in situ (i.e., during operation of the integrated circuit)). In one embodiment, the configuration is programmed before operation or implementation of an execution sequence of the processing pipeline via multiplexers to establish a data path into one or more selected processing circuits or to by-pass such circuits.

The configurable processing circuitry, and connections thereto, are superimposed (for illustration purposes) in the detailed schematic block diagram of an exemplary configuration of the control/configure circuit or NLINKS circuit illustrated in FIGS. 7A and 7E (see, the left side of "NLINKS (upper)" section of each exemplary configuration of the control/configure circuit or NLINKS circuit).

In another embodiment, the granularity configuration circuitry may be employed to separate or divide a MAC pipeline into a plurality of separate MAC pipelines, each pipeline having a plurality of MACs configured in a linear architecture. Here, the granularity configuration circuitry configures (e.g., one-time or more than one-time) the MAC pipeline(s) to provide a predetermined granularity of the output data of the MAC pipeline, for example, granularity of the processed image data. For example, in one embodiment, the granularity processing circuitry is disposed in the row interconnects of one or more MAC pipelines to program, re-program, configure or re-configure two rows of multiplier-accumulator circuits (each row having a plurality of MACs) into at least two (e.g., separate and independent) MAC processing pipelines.

With reference to FIG. 8A-8D, granularity configuration circuitry, disposed within the row interconnects, may configure the original MAC pipeline (e.g., having 64 multiplier-accumulator circuits interconnected in a linear pipeline) into two separate MAC pipelines (i.e., MAC pipeline A and MAC pipeline B), each having 32 multiplier-accumulator circuits. In this way, the granularity configuration circuitry is configurable to separate the two associated rows of MACs. In addition, the granularity configuration circuitry may facilitate connection to, among other things, memory to implement pipeline multiply and accumulate operations wherein MAC pipeline A and MAC pipeline B are capable of separately generating and outputting a plurality of m×n image data/pixels having a granularity that is ½ the granularity (e.g., 32×32) of the original MAC pipeline (e.g., 64×64).

With reference to FIG. 8A, the MAC pipeline (in the illustrative embodiment having 64 MAC processors) is physically "folded", wherein the row of MAC processors are interconnected via row interconnects, so that the circular topologies of the NMAX_MAC_SO[P] nodes and NMAX_MAC_r[P] nodes may be readily implemented in conjunction with the NLINKS circuit illustrated in FIGS. 2A, 2C and 2D. The embodiment of FIGS. 8B-8D, implementing the MAC processor embodiment of FIGS. 5A and 5B (having the Dx/Dy granularity configuration circuitry (i.e., Dx/Dy registers—multiplexer circuit)), may be separated into two or more separate/different MAC pipelines, which are capable of operating/processing independently of each other (see FIG. 8A). Notably, in one embodiment, the NLINKS circuit is physically disposed on two sides of the MAC pipeline—e.g., opposing sides of the MAC processors of the MAC pipeline (see FIG. 9).

With reference to FIG. 8A, the original MAC pipeline is separated into MAC pipeline A and MAC pipeline B, which are each connected to memory—in the illustrated example, three banks of memory (e.g., L2 SRAM). Each MAC pipeline reads input values/data (e.g., image data) for the D_Si shifting path (e.g., initial accumulation totals), and each MAC pipeline writes values/data (e.g., processed data) from the shifting path for final accumulation totals. In the illustrated embodiment, the memory banks written to are on opposite sides of the pipelines from the memory banks that are read from. It may be advantageous for the accumulation totals to alternate between memory banks on opposite sides of the execution pipeline.

Notably, where a 32×32 predetermined granularity example implementing the MAC processor embodiment of FIGS. 5A and 5B (having the Dx/Dy granularity configuration circuitry), the embodiment would have an effective rate of 1.00× of the peak rate the original MAC pipeline (64 MAC processors including 32 MAC processors in each row which are interconnected into a linear architecture via the row interconnects). That is, because MAC pipeline A and MAC pipeline B are configurable as two separate independent sets of 32×32 multiply-accumulation operations would be performed in 32 pipeline cycles.

With reference to FIG. 9, NLINKS circuit #1 provides control and configuration information to the MAC pipeline of serially interconnected MACs (i.e., linear pipeline)—for example, as discussed above in connection with FIGS. 8B-8D. In one embodiment, the rows of MACs are configured into two separate (and, e.g., independent) pipelines as illustrated in FIG. 8A. In this embodiment, NLINKS circuit #2 may also be configured to interface with each row of multiplier-accumulator circuits when the granularity configuration circuitry is programmed to operationally or electrically separate the rows of serially connected MACs, for example, into different (e.g., discrete) MAC pipelines (e.g., two separate MAC pipelines). Here, the accumulation data path and the input data path for each MAC pipeline may interface with NLINKS circuit #2 as well as NLINKS circuit #1 when the granularity configuration circuitry is configured to form the separate MAC pipelines, according to aspects of the present inventions. That is, the granularity configuration circuitry is disposed in the row interconnects, which connect the rows of MACs (in this illustrative example, two rows) into serially connected MACs. The granularity configuration circuitry, in response to control signals, may reconfigure the MACs from two connected rows (via the row interconnects) into two separate rows of MACs—each forming (in whole or in part) two pipelines such that the MACs of each row are operationally or electrically separate during pipeline operation (e.g., concatenation of the multiply and accumulate operations of the MACs of the pipeline). In this embodiment, the granularity configuration circuitry operationally (i) connect the MACs of the rows into a single linear pipeline during operation wherein NLINKS circuit #1 interfaces with the one MAC pipeline or (ii) disconnect the MACs of the rows into two separate linear pipelines during operation wherein NLINKS circuit #1 and NLINKS circuit #2 interface with each of the MAC pipelines.

Thus, in this illustrative embodiment, the granularity configuration circuitry may control, program or configure the granularity of the pipeline via connecting the rows of multiplier-accumulator circuits into one MAC pipeline (FIGS. 7A-7F) or separating the rows of multiplier-accumulator circuits into two separate MAC pipelines (FIGS. 8A-8D). Notably, in this illustrative embodiment, the MAC processing pipeline includes 64 MACs interconnected via row interconnects (32 MACs in each row). This is merely exemplary wherein more or less MACs may be included in each row.

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

For example, the granularity configuration circuitry is not limited to the embodiments illustrated herein. In this regard, the granularity configuration circuitry may be any circuitry that provide for granularity adjustment/programmability of a MAC pipeline having a linear architecture. Indeed, with reference to FIG. 10, the granularity configuration circuitry may include features of the embodiments of FIGS. 4A/4B and 5A/5B.

Notably, the granularity configuration circuitry of FIG. 10 may be employed in any of the embodiments described and/or illustrated herein. For the sake of brevity such embodiments will not be discussed separately but are quite clear to one skilled in the art in light of this disclosure. For example, the MAC processor of FIG. 10 may be implemented in the pipeline architecture illustrated in FIGS. 8A-8D and 9. In this way, the predetermined granularity may be configurable between 64×64 data/pixels format, 32×32 data/pixels format and a 16×16 data/pixels format. Where the pipeline is separated into two separate and independent MAC pipelines, the granularity of each separate and independent MAC pipeline may be further configured to provide a 16×16 granularity (via control of the by-pass multiplexers—as described above and illustrated in FIGS. 4A and 4B) which would have an effective rate of 0.50× of the peak rate the original MAC pipeline (64 MAC processors having, for example, no granularity configuration circuitry—see, e.g., FIGS. 1B and 2A-2F). That is, the two independent MAC pipelines may be configured from initial/original MAC pipeline, and thereafter the predetermined granularity further configured via the by-pass multiplexers to provide two independent sets of 16×16 multiply accumulation operations—which would be performed in 16 pipeline cycles.

In operation, the pipeline architectures including the MAC processors of the embodiment of FIG. 10 include selected MAC circuits (and/or predetermined MAC circuits based on control of the granularity configuration circuitry) that are employed in the multiply and accumulate operations of the execution pipeline. Here, such MAC circuits are connected in series to form a linear pipeline to facilitate concatenating the multiply and accumulate operations. Those MAC circuit(s) not enabled or not incorporated in the multiply and accumulate operations of the execution pipeline, albeit electrically/physically connected or coupled to those MAC circuits employed in the execution pipeline, do not contribute to the concatenation of the multiply and accumulate operations of the execution pipeline based on control of or in response to the granularity configuration circuitry associated with such MAC circuits (i.e., those MAC circuits not enabled or not incorporated in the processing).

As noted above, the granularity configuration circuitry may program, re-program, configure and/or re-configure the granularity of the MAC processing pipeline, for example, in situ (i.e., during normal operation of the integrated circuit) and/or at or during power-up, start-up, initialization, re-initialization, configuration, re-configuration or the like. In one embodiment, memory (e.g., a configuration register) may store granularity configuration data, including the granularity of the image processing of, for example, the MAC pipeline. Such memory may be programmed at or during power-up, start-up, initialization, re-initialization and/or in situ. Thus, the granularity configuration circuitry may be programmed and/or re-programmed in situ and/or prior to normal operation of the integrated circuit (e.g., the programmable MAC image processing pipeline) so that the MAC pipeline processes and outputs image data/pixels in a m×n data/pixels format.

The granularity configuration circuitry configures the multiplier-accumulator circuits of an image processing pipeline to process input data and generate a plurality of m×n image data/pixel outputs (wherein m and n are positive whole numbers). As noted above, in one embodiment, n equals m—such as, for example, 16×16, 32×32, 64×64, 128×128, etc.; in another embodiment, n does not equal m—such as, for example, 16×32, 16×64, 32×16, 32×64, etc.

Although most of the embodiments of the present inventions have been described and/or illustrated in the context of the MACs interconnected into a linear processing pipeline wherein the accumulation data values are rotated, transferred or moved through the MACs of the pipeline (see, e.g., FIG. 1C), in another set of embodiments, the present inventions may be employed in MACs that are interconnected into a linear processing pipeline wherein the input data values are rotated, transferred or moved through the MACs of the pipeline (before, during or at the completion of an execution cycle of a execution sequence). With reference to FIGS. 11A and 11B, in this embodiment, the accumulation values generated by the accumulator circuit of each MAC are maintained, stored or held in the associated MAC, during each execution cycle of the execution sequence (i.e., set of associated execution cycles), of the processing pipeline and used in the accumulation operation of the accumulator circuit of the associated MAC. In this regard, in operation, after input or loading of the initial data input values into the MACs of the linear pipeline, the input data values are rotated, transferred or moved, on a cycle-by-cycle basis, from one MAC of the linear pipeline to the immediately following MAC of the pipeline and employed in the multiply operation of the multiplier circuit of that next MAC of the processing pipeline. As noted above, however, the accumulation values generated by each MAC are maintained, stored or held, during each execution cycle of the execution sequence, in respective MAC and used in the accumulation operation of the associated accumulator circuit (which includes a floating point adder circuit having a single or one stage pipeline) thereof. Thus, in this embodiment, the input data are rotated, transferred or moved, on a cycle-by-cycle basis, from one MAC of the linear pipeline to the immediately following MAC (of the pipeline) whereas, during processing, the accumulation values generated by accumulator circuit of each MAC are not rotated, transferred or moved from one MAC of to the immediately following MAC but are maintained, held or stored in the MAC for use in subsequent processing during the associated execution cycles of the set of execution cycles (i.e., execution sequence). This linear processing pipeline configuration and operation is described and illustrated in U.S. Provisional Patent Application No. 63/156,263 (filed Mar. 3, 2021), which is hereby incorporated by reference herein.

Notably, all of the embodiments described and/or illustrated herein may be employed in the connection with the MAC processor configured in a linear processing pipeline configuration whereby the input values (D) are rotated among the MAC processors—including MACs having granularity configuration circuitry including the Dx/Dy registers—multiplexer circuit. For the sake of brevity, these embodiments will not be repeated.

Notably, the MAC processing pipelines or architectures, and circuitry to configure and control such pipelines/architectures, of the present inventions may employ or implement the concurrent and/or parallel processing techniques, architectures, pipelines, and configurations described and/or illustrated in U.S. patent application Ser. No. 16/816,164, entitled "Multiplier-Accumulator Processing Pipelines and Processing Component, and Methods of Operating Same", filed Mar. 11, 2020) and U.S. Provisional Patent Application No. 62/831,413, entitled "Multiplier-Accumulator Circuitry and System having Processing Pipeline and Methods of Operating and Using Same", filed Apr. 9, 2019). Here, the control/configure circuitry may be programmed to configure the pipelines to implement the concurrent and/or parallel processing techniques described and/or illustrated in the '164 and '413 applications to, for example, increase the throughput of data processing; such applications are incorporated by reference herein in their entirety.

In one embodiment, the MAC processing pipelines or architectures, and circuitry to configure and control such pipelines/architectures, of the present inventions may employ Winograd processing techniques to process the image data. Here, the conversion circuitry may convert the data format of the filter weights from the Gaussian floating point data format to a block-scaled-fraction format having appropriate characteristics that facilitate implementation Winograd processing techniques in connection with the multiplier-accumulator circuitry of the execution pipelines. The pre-processing and/or post-processing may be implemented in the configurable processing circuitry described and illustrated in FIG. 9 of U.S. Non-Provisional application Ser. No. 17/212,411 and U.S. Provisional Application No. 63/012,111. Notably, details of, among other things, the circuitry, structures, architectures, function and operation of the multiplier-accumulator execution pipelines implementing Winograd processing techniques are described and/or illustrated in: (1) U.S. patent application Ser. No. 16/796,111, entitled "Multiplier-Accumulator Circuitry having Processing Pipelines and Methods of Operating Same", filed Feb. 20, 2020, and/or (2) U.S. Provisional Patent Application No. 62/909,293, entitled "Multiplier-Accumulator Circuitry Processing Pipeline and Methods of Operating Same", filed Oct. 2, 2019). These patent applications are incorporated herein by reference.

Further, although the present inventions are described and illustrated in the context of multiplier-accumulator circuitry, the circuitry and operation of the present inventions may, in lieu of the multiplication circuitry, or in addition thereto, substitute/implement logarithmic addition circuitry and conversion circuitry to facilitate concatenating the logarithmic addition and accumulate operations consistent with the present inventions. For example, the present inventions may be employed in conjunction with U.S. patent application Ser. No. 17/092,175 (filed Nov. 6, 2020) and/or U.S. Provisional Patent Application No. 62/943,336 (filed Dec. 4, 2019), which is incorporated herein in their entirety. In this regard, pipelines implementing logarithmic addition-accumulator circuitry (and methods of operating such circuitry) wherein data (e.g., image data) is processed based a logarithmic format, for example, in connection with inferencing operations, may be employed in the processing pipelines, and circuitry to configure and control such pipelines, of the present inventions.

Moreover, the present inventions may employ the circuitry, function and operation of enhancing the dynamic range of the filter weights or coefficients as described and/or illustrated in Non-Provisional patent application Ser. No. 17/074,670 (filed Oct. 20, 2020) and/or U.S. Provisional Patent Application No. 62/930,601 (filed on Nov. 5, 2019. That is, the present inventions may use the circuitry and techniques to enhance the dynamic range of the filter weights or coefficients of the '670 and '601 applications. The '670 and '601 applications are incorporated by reference in their entirety.

In addition, the present inventions may employ various data formats of the input data and the filter weights. For example, the present inventions may employ the circuitry, function and operation of implementing a data format (or modifying a data format) of the input data and/or the filter weights as described and/or illustrated in (1) U.S. Provisional Patent Application No. 62/865,113, entitled "Processing Pipeline having Floating Point Circuitry and Methods of Operating and Using Same", filed Jun. 21, 2019, and/or (2) U.S. Provisional Patent Application No. 62/961,627, entitled "Multiplier-Accumulator Processing Pipeline using Filter Weights having Gaussian Floating Point Data Format", filed on Jan. 15, 2020. Such pre-processing and/or post-processing may be implemented in the configurable processing circuitry described and illustrated in FIG. 9 of U.S. Non-Provisional application Ser. No. 17/212,411 and U.S. Provisional Application No. 63/012,111. Notably, the '113 and '627 applications are also incorporated by reference herein in their entirety.

Notably, the configuration, selection, modification and/or adjustment of the series of a plurality of multiplier-accumulator circuits may be implemented, for example, in situ (i.e., during operation of the integrated circuit) to, for example, perform or provide a particular operation and/or meet or exceed system requirements or constraints (e.g., temporal-based requirements or constraints).

Moreover, the granularity configuration embodiments of the present inventions may be employed in conjunction with the pipeline architectures and configurations described and illustrated in U.S. Non-Provisional application Ser. No. 17/212,411 and U.S. Provisional Application No. 63/012,111. For the sake of brevity, these embodiments will not be illustrated herein—however, all of the embodiments of the present inventions described and illustrated herein may be implemented in the pipeline architectures and configurations described and illustrated in U.S. Non-Provisional application Ser. No. 17/212,411 and U.S. Provisional Application No. 63/012,111.

Importantly, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof.

Further, although the memory cells in certain embodiments are illustrated as static memory cells or storage elements, the present inventions may employ dynamic or static memory cells or storage elements. Indeed, as stated above, such memory cells may be latches, flip/flops or any other static/dynamic memory cell or memory cell circuit or storage element now known or later developed.

Notably, various circuits, circuitry and techniques disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit, circuitry, layout and routing expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other formats and/or languages now known or later developed. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Moreover, the various circuits, circuitry and techniques disclosed herein may be represented via simulations using computer aided design and/or testing tools. The simulation of the circuits, circuitry, layout and routing, and/or techniques implemented thereby, may be implemented by a computer system wherein characteristics and operations of such circuits, circuitry, layout and techniques implemented thereby, are imitated, replicated and/or predicted via a computer system. The present inventions are also directed to such simulations of the inventive circuits, circuitry and/or techniques implemented thereby, and, as such, are intended to fall within the scope of the present inventions. The computer-readable media corresponding to such simulations and/or testing tools are also intended to fall within the scope of the present inventions.

Notably, reference herein to "one embodiment" or "an embodiment" (or the like) means that a particular feature, structure, or characteristic described in connection with the embodiment may be included, employed and/or incorporated in one, some or all of the embodiments of the present inventions. The usages or appearances of the phrase "in one embodiment" or "in another embodiment" (or the like) in the specification are not referring to the same embodiment, nor are separate or alternative embodiments necessarily mutually exclusive of one or more other embodiments, nor limited to a single exclusive embodiment. The same applies to the term "implementation." The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

Further, an embodiment or implementation described herein as "exemplary" is not to be construed as ideal, preferred or advantageous, for example, over other embodiments or implementations; rather, it is intended convey or indicate the embodiment or embodiments are example embodiment(s).

Although the present inventions have been described in certain specific aspects, many additional modifications and variations would be apparent to those skilled in the art. It is therefore to be understood that the present inventions may be practiced otherwise than specifically described without departing from the scope and spirit of the present inventions. Thus, embodiments of the present inventions should be considered in all respects as illustrative/exemplary and not restrictive.

The terms "comprises," "comprising," "includes," "including," "have," and "having" or any other variation thereof, are intended to cover a non-exclusive inclusion, such that a process, method, circuit, article, or apparatus that comprises a list of parts or elements does not include only those parts or elements but may include other parts or elements not expressly listed or inherent to such process, method, article, or apparatus. Further, use of the terms "connect", "connected", "connecting" or "connection" herein should be broadly interpreted to include direct or indirect (e.g., via one or more conductors and/or intermediate devices/elements (active or passive) and/or via inductive or capacitive coupling)) unless intended otherwise (e.g., use of the terms "directly connect" or "directly connected").

The terms "a" and "an" herein do not denote a limitation of quantity, but rather denote the presence of at least one of the referenced item. Further, the terms "first," "second," and the like, herein do not denote any order, quantity, or importance, but rather are used to distinguish one element/circuit/feature from another.

In addition, the term "integrated circuit" means, among other things, any integrated circuit including, for example, a generic or non-specific integrated circuit, processor, controller, state machine, gate array, SoC, PGA and/or FPGA. The term "integrated circuit" also means, for example, a processor, controller, state machine and SoC—including an embedded FPGA.

Further, the term "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like) or multiple bits (or the like).

Notably, the term "MAC circuit" means a multiplier-accumulator circuit of the multiplier-accumulator circuitry of the multiplier-accumulator pipeline. For example, a multiplier-accumulator circuit is described and illustrated in the exemplary embodiment of FIGS. 1A-1C of U.S. patent application Ser. No. 16/545,345, and the text associated therewith. In the claims, the term "MAC circuit" means a multiply-accumulator circuit, for example, like that described and illustrated in the exemplary embodiment of FIGS. 1A-1C, and the text associated therewith, of U.S. patent application Ser. No. 16/545,345. Notably, however, the term "MAC circuit" is not limited to the particular circuit, logical, block, functional and/or physical diagrams, block/data width, data path width, bandwidths, and processes illustrated and/or described in accordance with, for example, the exemplary embodiment of FIGS. 1A-1C of U.S. patent application Ser. No. 16/545,345.

In the claims, "row" means row, column, and/or row and column. For example, in the claims, a "row of MAC circuits" means (i) a row of MAC circuits, (ii) a column of MAC circuits and/or (iii) a row of MAC circuits and a column of MAC circuits—all of which are intended to fall within the meaning of row of MAC circuits in connection with the scope of the claim. In the claims, "column" means column, row, and/or column and row. For example, in the claims, a "column of control/configure circuits" means (i) a column of control/configure circuits, (ii) a row of control/configure circuits and/or (iii) a column of control/configure circuits and a row of control/configure circuits—all of which are intended to fall within the meaning of column of control/configure circuits in connection with the scope of the claim.

Notably, the limitations of the claims are not written in means-plus-function format or step-plus-function format. It is applicant's intention that none of the limitations be interpreted pursuant to 35 USC § 112, ¶6 or § 112(f), unless such claim limitations expressly use the phrase "means for" or "step for" followed by a statement of function and is void of any specific structure.

What is claimed is:

1. An integrated circuit comprising:
a plurality of multiplier-accumulator circuits connected in series in a linear pipeline to perform a plurality of concatenated multiply and accumulate operations, wherein each multiplier-accumulator circuit of the plurality of multiplier-accumulator circuits includes:
a multiplier to multiply first data by a multiplier weight data and generate a product data, and
an accumulator, coupled to the multiplier of the associated multiplier-accumulator circuit, to add second data and the product data of the associated multiplier to generate sum data; and
a plurality of granularity configuration circuits, wherein each granularity configuration circuit is associated with a different multiplier-accumulator circuit of the plurality of multiplier-accumulator circuits to operationally (i) disconnect the multiplier and accumulator of the associated multiplier-accumulator circuit from the linear pipeline during operation or (ii) connect the multiplier and accumulator of the associated multiplier-accumulator circuit to the linear pipeline during operation.

2. The integrated circuit of claim 1 wherein:
each granularity configuration circuit includes one or more multiplexers.

3. The integrated circuit of claim 2 wherein:
the one or more multiplexers of each granularity configuration circuit includes a first multiplexer disposed in an accumulation path of the associated multiplier-accumulator circuit to responsively output the second data to an output of the accumulation path of the associated multiplier-accumulator circuit when the associated multiplier-accumulator circuit is operationally disconnected from the linear pipeline during operation.

4. The integrated circuit of claim 3 wherein:
the one or more multiplexers of each granularity configuration circuit further includes a second multiplexer disposed in an output shift path of the associated multiplier-accumulator circuit to responsively output the sum data generated by a preceding multiplier-accumulator circuit when the associated multiplier-accumulator circuit is operationally disconnected from the linear pipeline during operation.

5. The integrated circuit of claim 2 wherein:
the one or more multiplexers of each granularity configuration circuit includes a first multiplexer disposed in a rotate data path of the associated multiplier-accumulator circuit to responsively output the first data to an output of the rotate data path of the associated multiplier-accumulator circuit when the associated multiplier-accumulator circuit is operationally disconnected from the linear pipeline during operation.

6. The integrated circuit of claim 5 wherein:
the one or more multiplexers of each granularity configuration circuit further includes a second multiplexer disposed in an output shift path of the associated multiplier-accumulator circuit to responsively output the sum data generated by a preceding multiplier-accumulator circuit when the associated multiplier-accumulator circuit is operationally disconnected from the linear pipeline during operation.

7. The integrated circuit of claim 5 wherein:
each granularity configuration circuit further includes a dual data registers circuit to concurrently receive the first data, and
the one or more multiplexers of each granularity configuration circuit includes a first multiplexer disposed between the dual data registers circuit of the associated granularity configuration circuit and an input to the multiplier of the associated multiplier-accumulator circuit.

8. An integrated circuit comprising:
a plurality of multiplier-accumulator circuits connected in series in a linear pipeline to perform a plurality of concatenated multiply and accumulate operations, wherein each multiplier-accumulator circuit of the plurality of multiplier-accumulator circuits includes:
a multiplier to multiply first data by a multiplier weight data and generate a product data, and
an accumulator, coupled to the multiplier of the associated multiplier-accumulator circuit, to add second data and the product data of the associated multiplier to generate sum data; and
a first plurality of granularity configuration circuits, wherein each granularity configuration circuit of the first plurality of granularity configuration circuits is associated with a different multiplier-accumulator circuit of a subset of the plurality of multiplier-accumulator circuits to operationally (i) disconnect the multiplier and accumulator of the associated multiplier-accumulator circuit from the linear pipeline during operation or (ii) connect the multiplier and accumulator of the associated multiplier-accumulator circuit to the linear pipeline during operation, wherein:
the first subset of the plurality of multiplier-accumulator circuits is associated with a portion of the plurality of multiplier-accumulator circuits that is less than all of the plurality of multiplier-accumulator circuits connected in series in a linear pipeline, and
the first plurality of granularity configuration circuits are responsive to a common granularity configuration control signal.

9. The integrated circuit of claim 8 wherein:
each granularity configuration circuit of the first plurality of granularity configuration circuits includes one or more multiplexers and wherein the one or more multiplexers of each granularity configuration circuit includes a first multiplexer disposed in an accumulation path of the associated multiplier-accumulator circuit to output the second data to an output of the accumulation path of the associated multiplier-accumulator circuit in response to the common granularity configuration control signal wherein, in response, the associated multiplier-accumulator circuit is operationally disconnected from the linear pipeline during operation.

10. The integrated circuit of claim 9 wherein:
the one or more multiplexers of each granularity configuration circuit of the first plurality of granularity configuration circuits further includes a second multiplexer disposed in an output shift path of the associated multiplier-accumulator circuit to responsively output the sum data generated by a preceding multiplier-accumulator circuit when the associated multiplier-accumulator circuit is operationally disconnected from the linear pipeline during operation.

11. The integrated circuit of claim 8 wherein:

each granularity configuration circuit of the first plurality of granularity configuration circuits includes one or more multiplexers and wherein the one or more multiplexers of each granularity configuration circuit of the first plurality of granularity configuration circuits includes a first multiplexer disposed in a rotate data path of the associated multiplier-accumulator circuit to output the first data to an output of the rotate data path of the associated multiplier-accumulator circuit in response to the common granularity configuration control signal wherein, in response, the associated multiplier-accumulator circuit is operationally disconnected from the linear pipeline during operation.

12. The integrated circuit of claim 11 wherein:

the one or more multiplexers of each granularity configuration circuit of the first plurality of granularity configuration circuits further includes a second multiplexer disposed in an output shift path of the associated multiplier-accumulator circuit to responsively output the sum data generated by a preceding multiplier-accumulator circuit when the associated multiplier-accumulator circuit is operationally disconnected from the linear pipeline during operation.

13. The integrated circuit of claim 8 wherein:

each granularity configuration circuit of the first plurality of granularity configuration circuits includes (i) a dual data registers circuit to concurrently receive the first data and (ii) a first multiplexer disposed between the dual data registers circuit and an input to the associated multiplier; and in response to the common granularity configuration control signal, the multiplexer of each granularity configuration circuit operationally disconnects the associated multiplier-accumulator circuit from the linear pipeline during operation.

14. An integrated circuit comprising:

a plurality of multiplier-accumulator circuits connected in series in a linear pipeline to perform a plurality of concatenated multiply and accumulate operations, wherein each multiplier-accumulator circuit of the plurality of multiplier-accumulator circuits includes:

a multiplier to multiply first data by a multiplier weight data and generate a product data, and an accumulator, coupled to the multiplier of the associated multiplier-accumulator circuit, to add second data and the product data of the associated multiplier to generate sum data;

wherein the plurality of multiplier-accumulator circuits is organized into a plurality of rows of serially connected multiplier-accumulator circuits including (i) a first row of serially connected multiplier-accumulator circuits and (ii) a second row of serially connected multiplier-accumulator circuits, wherein a last multiplier-accumulator circuit of the first row of serially connected multiplier-accumulator circuits is connected to a first multiplier-accumulator circuit of the second row of serially connected multiplier-accumulator circuits via one or more row interconnects; and granularity configuration circuitry, including one or more first multiplexers disposed in an accumulation path of the row interconnects, between the last multiplier-accumulator circuit of the first row of serially connected multiplier-accumulator circuits and the first multiplier-accumulator circuit of the second row of serially connected multiplier-accumulator circuits, wherein, in response to:

a first control signal, the one or more first multiplexers connect the last multiplier-accumulator circuit of the first row of serially connected multiplier-accumulator circuits to the first multiplier-accumulator circuit of the second row of associated serially connected multiplier-accumulator circuits to provide a first linear pipeline including the first and second rows of serially connected multiplier-accumulator circuits, and a second control signal, the one or more first multiplexers electrically separate the first row of serially connected multiplier-accumulator circuits and the second row of serially connected multiplier-accumulator circuits into (i) a second linear pipeline including the first row of serially connected multiplier-accumulator circuits, and (ii) a third linear pipeline including the second row of serially connected multiplier-accumulator circuits, wherein the second and the third linear pipelines are independent pipelines.

15. The integrated circuit of claim 14 wherein:

in response to the second control signal, the one or more first multiplexers connect an accumulation input of the last multiplier-accumulator circuit of the first row of associated serially connected multiplier-accumulator circuits to first circuitry external to the plurality of multiplier-accumulator circuits, in response to the second control signal, the one or more first multiplexers connect an accumulation input of the first multiplier-accumulator circuit of the second row of associated serially connected multiplier-accumulator circuits to second circuitry external to the plurality of multiplier-accumulator circuits.

16. The integrated circuit of claim 15 wherein:

the first and second circuitry external to the plurality of multiplier-accumulator circuits are memory.

17. The integrated circuit of claim 16 wherein:

the memory is L2 memory.

18. The integrated circuit of claim 14 wherein:

the granularity configuration circuitry further includes one or more second multiplexers disposed in an input data path of the row interconnect wherein, in response to a third control signal, the one or more second multiplexers connect an output of the input data of the last multiplier-accumulator circuit of the first row of serially connected multiplier-accumulator circuits to an input of the input data of the first multiplier-accumulator circuit of the second row of associated serially connected multiplier-accumulator circuits.

19. The integrated circuit of claim 18 wherein:

in response to a fourth control signal, the one or more second multiplexers connect an input of the input data of the first multiplier-accumulator circuit of the second row of associated serially connected multiplier-accumulator circuits to third circuitry external to the plurality of multiplier-accumulator circuits.

20. The integrated circuit of claim 19 wherein:
the third circuitry external to the plurality of multiplier-accumulator circuits is L2 memory.

* * * * *